United States Patent
Fujisawa

(10) Patent No.: US 7,190,336 B2
(45) Date of Patent: Mar. 13, 2007

(54) INFORMATION PROCESSING APPARATUS AND METHOD, RECORDING MEDIUM AND PROGRAM

(75) Inventor: Hirotoshi Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 10/659,723

(22) Filed: Sep. 10, 2003

(65) Prior Publication Data
US 2004/0125053 A1  Jul. 1, 2004

(30) Foreign Application Priority Data
Sep. 10, 2002 (JP) ............ 2002-263630
Jul. 29, 2003 (JP) ............ 2003-281480

(51) Int. Cl.
G09G 3/30 (2006.01)
G09G 3/32 (2006.01)
G09G 3/36 (2006.01)

(52) U.S. Cl. ............... 345/81; 345/82; 345/87
(58) Field of Classification Search ......... 345/76–82, 345/156, 55, 204, 168–169
See application file for complete search history.

(56) References Cited

U.S. PATENT DOCUMENTS

| | | | |
|---|---|---|---|
| 5,742,905 A * | 4/1998 | Pepe et al. ............. | 455/461 |
| 6,466,145 B2 * | 10/2002 | Fields ............. | 341/137 |
| 6,864,860 B1 * | 3/2005 | Zien ............. | 345/1.2 |
| 6,930,658 B2 * | 8/2005 | Lee et al. ............. | 345/77 |
| 2002/0069420 A1 * | 6/2002 | Russell et al. ............. | 725/92 |
| 2002/0175915 A1 * | 11/2002 | Lichtfuss ............. | 345/440 |
| 2002/0190920 A1 * | 12/2002 | Kung ............. | 345/3.1 |
| 2003/0187775 A1 * | 10/2003 | Du et al. ............. | 705/37 |
| 2004/0015708 A1 | 1/2004 | Obayashi | |

FOREIGN PATENT DOCUMENTS

| | | |
|---|---|---|
| JP | 07-175420 | 7/1995 |
| JP | 9-34722 A | 2/1997 |
| JP | 10-40095 A | 2/1998 |
| JP | 11-053111 | 2/1999 |
| JP | 2000-200193 A | 7/2000 |

* cited by examiner

Primary Examiner—Amr A. Awad
Assistant Examiner—Stephen Sherman
(74) Attorney, Agent, or Firm—Wolf, Greenfield & Sacks, P.C.

(57) ABSTRACT

An information processing apparatus and method disclosed herein allows information to be communicated intuitively and readily. The information processing apparatus including, production element for producing a plurality of first graphic images representative of output data to be outputted to a different information processing apparatus; display element for successively displaying the first graphic images produced by the production element; detection element for detecting a plurality of second graphic images representative of input data inputted from the different information processing apparatus in response to successive display of the second graphic images on the different information processing apparatus; and acquisition element for acquiring the input data based on the second graphic images detected by the detection element.

10 Claims, 51 Drawing Sheets

FIG. 11
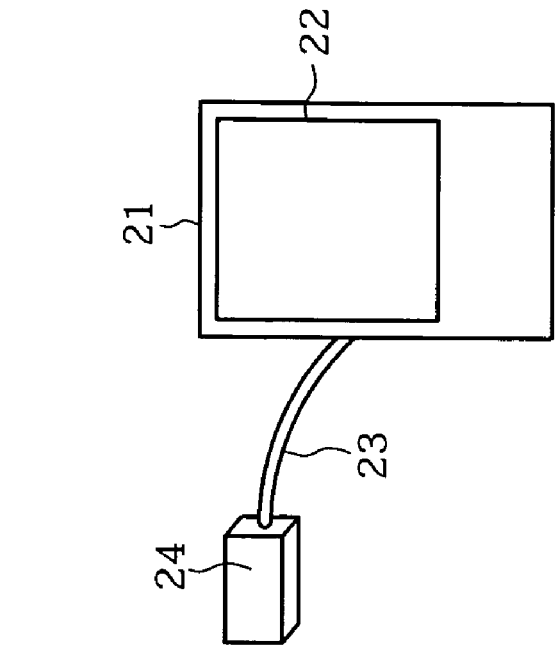
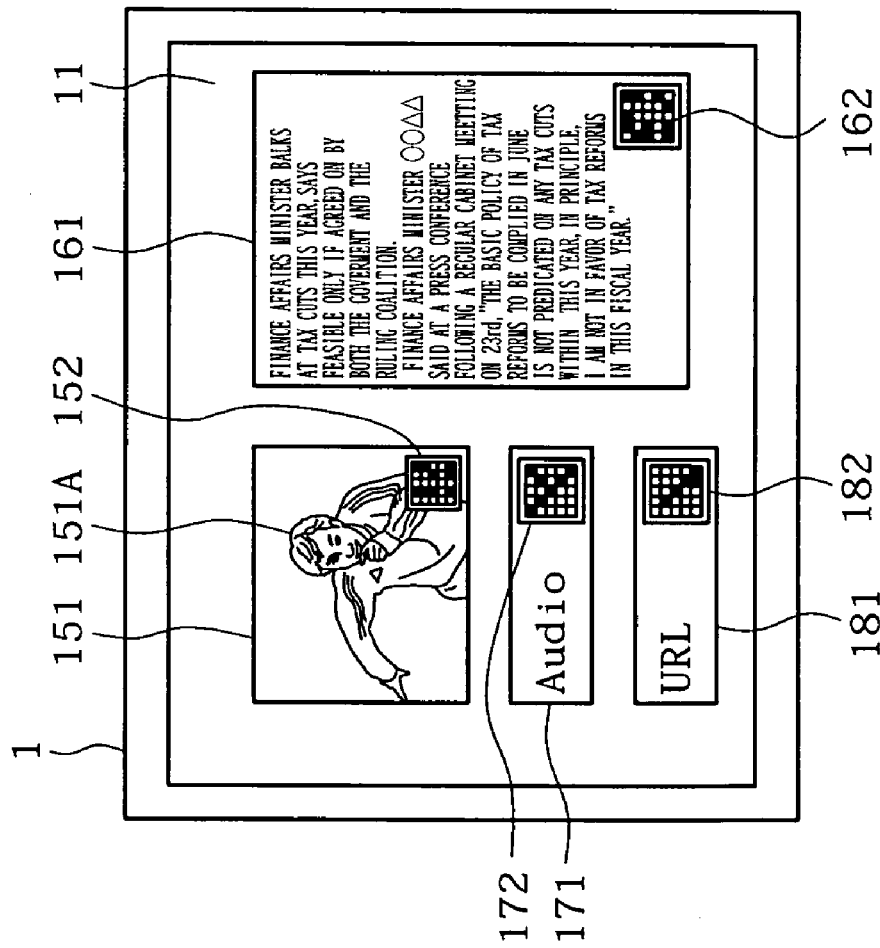

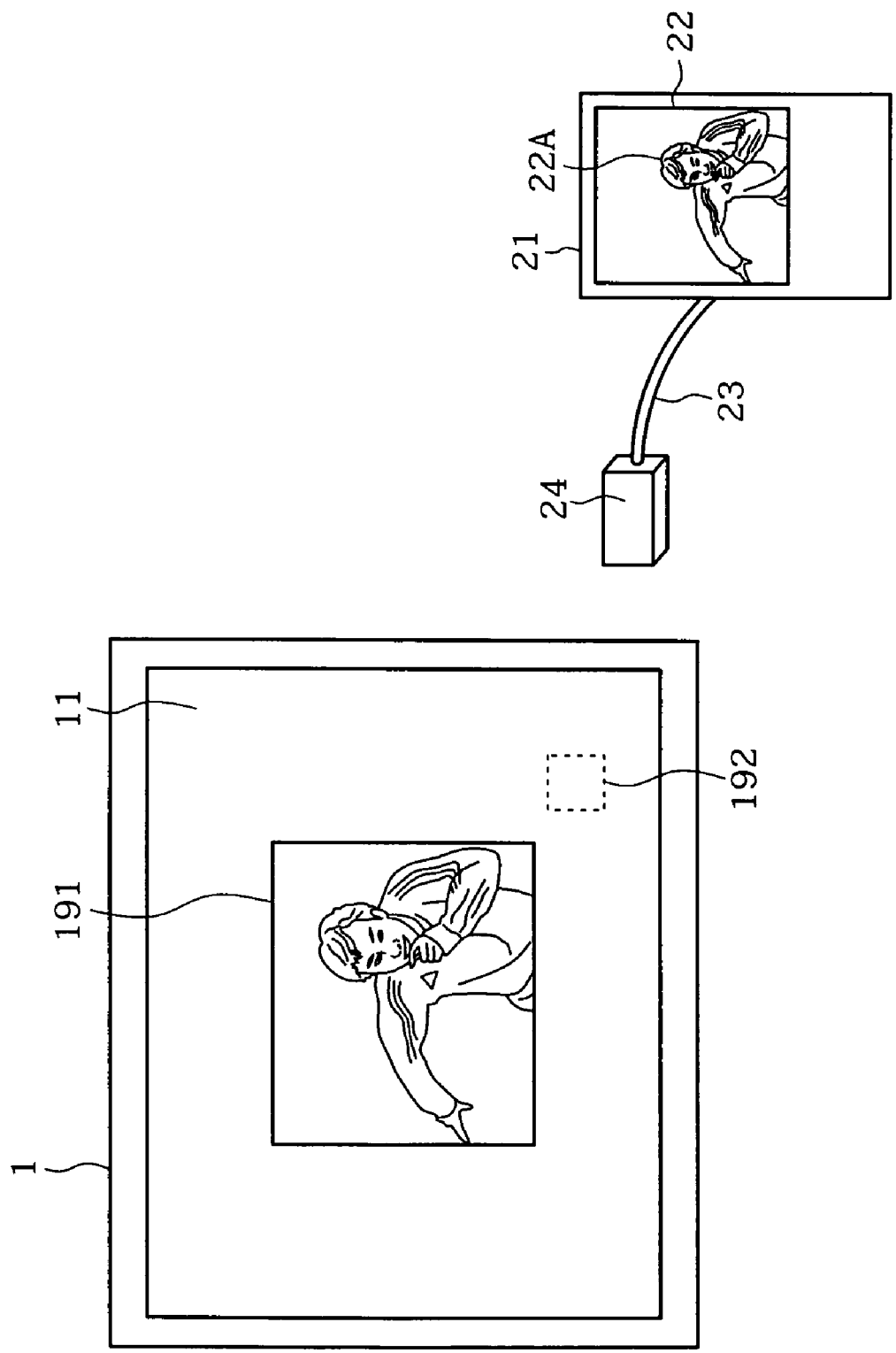

F I G. 1 5
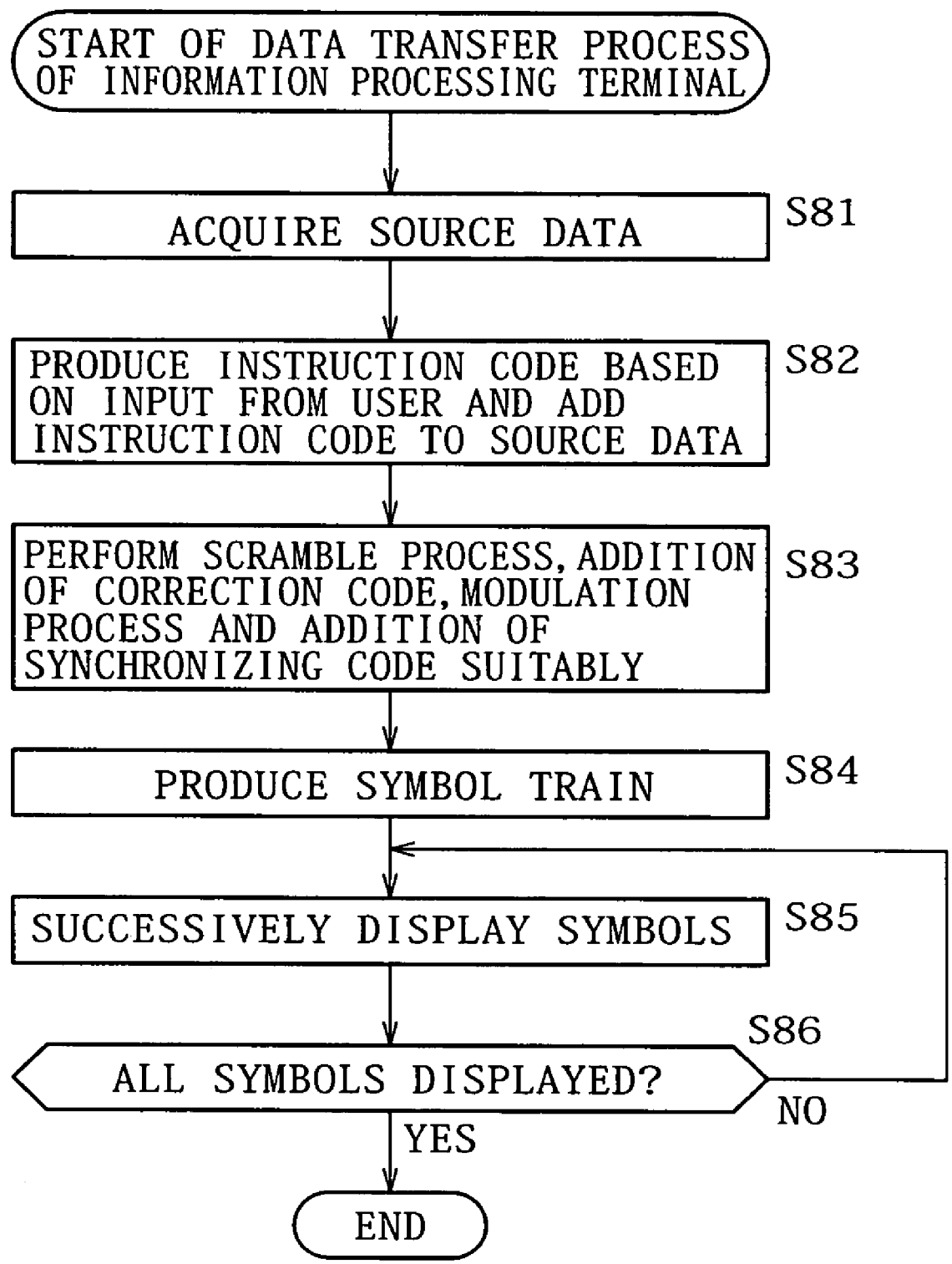

FIG. 20
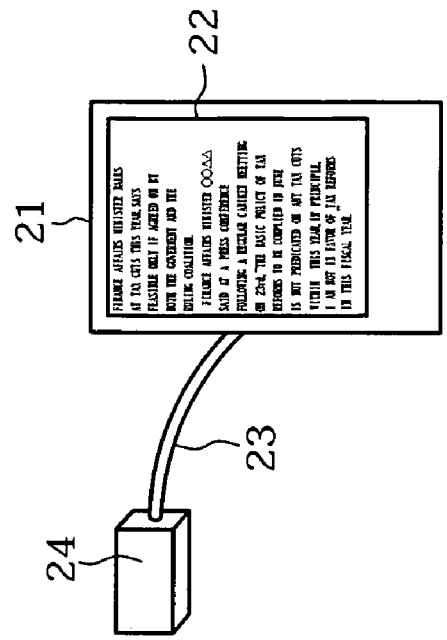
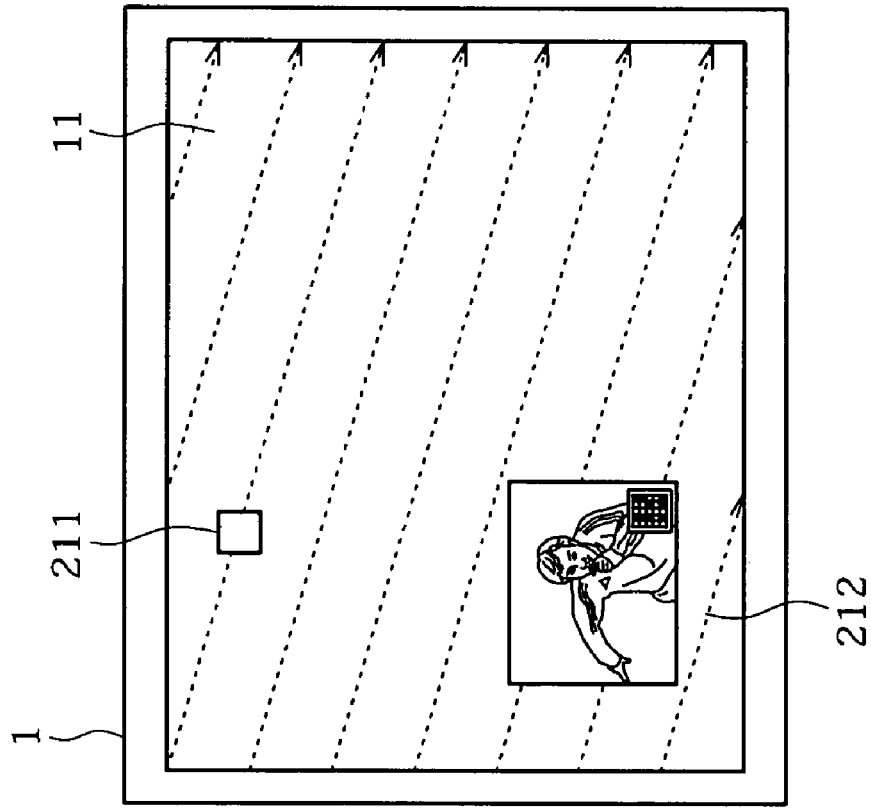

INFORMATION PROCESSING APPARATUS AND METHOD, RECORDING MEDIUM AND PROGRAM

BACKGROUND OF THE INVENTION

This invention relates to an information processing apparatus and method, a recording medium and a program.

In recent years, various proposals have been made for a technique for directly inputting various kinds of information to a display apparatus such as a television receiver without provision of a touch panel or the like in a superposed relationship on the display apparatus.

For example, Japanese Patent Laid-Open No. Hei 11-53111 (hereinafter referred to as document 1) discloses an information input/output apparatus in the form of a display apparatus which detects, based on a light amount of infrared rays emitted toward the outer side from the inner side of the display device and a light amount of reflected light originating from the emitted light, information regarding a motion of a user or information represented on a card presented by a user (refer particularly to paragraphs [0028] to [0030], pages 5 to 6). The user can input predetermined information to the display device without operating a mouse or a keyboard.

Meanwhile, Japanese Patent Laid-Open No. Hei 11-175420 (hereinafter referred to as document 2) discloses an organic EL element which is used to form a display device and can emit light in response to information written in accordance with a light inputting method.

However, where information regarding a motion of a user or information represented on a card presented by a user is detected to input information to a display device as disclosed in document 1 mentioned above, there is a subject to be solved in that there is a limitation to the amount of information which can be inputted within a predetermined period of time.

Meanwhile, it is a possible idea to provide, in order to input information to a display device, the display device with a module which performs communication utilizing a wireless LAN (Local Area Network) such as the IEEE (Institute of Electrical and Electronics Engineers) 802.11a or 802.11b or the Bluetooth (registered trademark) which have been widely spread rapidly in recent years. In this instance, information may be inputted (transmitted) to the display device by radio communication from another information terminal which incorporates a similar communication module. However, the possible arrangement described has a subject to be solved in that it requires complicated setting before communication is started and information cannot be inputted readily.

Further, a user issues an instruction to transmit data on a screen of the information terminal. Therefore, the user cannot input information intuitively when compared with an alternative arrangement wherein, for example, information is inputted directly to a display device on which a touch panel is provided, or in other words, a display section is depressed directly by the user.

SUMMARY OF THE INVENTION

It is an object of the present invention to provide an information processing apparatus and method, a recording medium and a program which allow information to be communicated intuitively and readily with a display apparatus.

In order to attain the object described above, according to an aspect of the present invention, there is provided an information processing apparatus, including production means for producing a plurality of first graphic images representative of output data to be outputted to a different information processing apparatus, display means for successively displaying the first graphic images produced by the production means, detection means for detecting a plurality of second graphic images representative of input data inputted from the different information processing apparatus in response to successive display of the second graphic images on the different information processing apparatus, and acquisition means for acquiring the input data based on the second graphic images detected by the detection means.

According to another aspect of the present invention, there is provided an information processing method, including a production step of producing a plurality of first graphic images representative of output data to be outputted to a different information processing apparatus, a display step of successively displaying the first graphic images produced by the process at the production step, a detection step of detecting a plurality of second graphic images representative of input data inputted from the different information processing apparatus in response to successive display of the second graphic images on the different information processing apparatus, and an acquisition step of acquiring the input data based on the second graphic images detected by the process at the detection step.

According to a further aspect of the present invention, there is provided a recording medium on which a computer-readable program is recorded, the program including a production step of producing a plurality of first graphic images representative of output data to be outputted to a different information processing apparatus, a display controlling step of controlling successive display of the first graphic images produced by the process at the production step, a detection controlling step of controlling detection of a plurality of second graphic images representative of input data inputted from the different information processing apparatus in response to successive display of the second graphic images on the different information processing apparatus, and an acquisition step of acquiring the input data based on the second graphic images detected by the process at the detection controlling step.

According to a still further aspect of the present invention, there is provided a program for causing a computer to execute a production step of producing a plurality of first graphic images representative of output data to be outputted to a different information processing apparatus, a display controlling step of controlling successive display of the first graphic images produced by the process at the production step, a detection controlling step of controlling detection of a plurality of second graphic images representative of input data inputted from the different information processing apparatus in response to successive display of the second graphic images on the different information processing apparatus, and an acquisition step of acquiring the input data based on the second graphic images detected by the process at the detection controlling step.

In the information processing apparatus and method, recording medium and program described above, a plurality of first graphic images representative of output data to be outputted to a different information processing apparatus are produced. The first graphic images produced in this manner are successively displayed. On the other hand, a plurality of second graphic images representative of input data inputted from the different information processing apparatus are detected in response to successive display of the second graphic images on the different information processing apparatus. Then, the input data are acquired based on the detected second graphic images.

With the information processing apparatus and method, recording medium and program, data can be fetched readily from an external apparatus through an intuitive operation. Further, data can be transferred readily to the external apparatus.

According to a yet further aspect of the present invention, there is provided an information processing apparatus, including production means for producing a plurality of graphic images representative of output data to be outputted to a different information processing apparatus, and display means for successively displaying the graphic images produced by the production means.

According to a yet further aspect of the present invention, there is provided an information processing method, including a production step of producing a plurality of graphic images representative of output data to be outputted to a different information processing apparatus, and a display step of successively displaying the graphic images produced by the process at the production step.

According to a yet further aspect of the present invention, there is provided a recording medium on which a computer-readable program is recorded, the program including a production step of producing a plurality of graphic images representative of output data to be outputted to a different information processing apparatus, and a display controlling step of controlling successive display of the graphic images produced by the process at the production step.

According to a yet further aspect of the present invention, there is provided a program for causing a computer to execute a production step of producing a plurality of graphic images representative of output data to be outputted to a different information processing apparatus, and a display controlling step of controlling successive display of the graphic images produced by the process at the production step.

In the information processing apparatus and method, recording medium and program described above, a plurality of graphic images representative of output data to be outputted to a different information processing apparatus are produced. Then, the produced graphic images are successively displayed.

With the information processing apparatus and method, recording medium and program, data can be transferred readily to an external apparatus though an intuitive operation.

According to a yet further aspect of the present invention, there is provided an information processing apparatus, including detection means for successively detecting a plurality of graphic images representative of input data inputted from a different information processing apparatus through successive display of the graphic images on the different information processing apparatus, and acquisition means for acquiring the input data based on the graphic images successively detected by the detection means.

According to a yet further aspect of the present invention, there is provided an information processing method, including a detection step of successively detecting a plurality of graphic images representative of input data inputted from a different information processing apparatus through successive display of the graphic images on the different information processing apparatus, and an acquisition step of acquiring the input data based on the graphic images successively detected by the process at the detection step.

According to a yet further aspect of the present invention, there is provided a recording medium on which a computer-readable program is recorded, the program including a detection controlling step of controlling successive detection of a plurality of graphic images representative of input data inputted from a different information processing apparatus through successive display of the graphic images on the different information processing apparatus, and an acquisition step of acquiring the input data based on the graphic images successively detected by the process at the detection controlling step.

According to a yet further aspect of the present invention, there is provided a program for causing a computer to execute a detection controlling step of controlling successive detection of a plurality of graphic images representative of input data inputted from a different information processing apparatus through successive display of the graphic images on the different information processing apparatus, and an acquisition step of acquiring the input data based on the graphic images successively detected by the process at the detection controlling step.

In the information processing apparatus and method, recording medium and program described above, a plurality of graphic images representative of input data inputted from a different information processing apparatus are successively detected through successive display of the graphic forms on the different information processing apparatus. Then, the input data are acquired based on the detected graphic images.

With the information processing apparatus and method, recording medium and program, data can be transferred readily to an external apparatus though an intuitive operation.

According to a yet further aspect of the present invention, there is provided an information processing apparatus, including a display section including a plurality of pixels each including an electroluminescent element for emitting light to display an image, changeover means for changing over the direction of a voltage to be applied to each of the electroluminescent elements to change over driving of the electroluminescent element between driving for light emission and driving for light reception, and detection means for detecting an input from the outside based on electric current generated in any of the electroluminescent elements driven for light reception as a result of the changeover by the changeover means when the electroluminescent element receives light.

According to a yet further aspect of the present invention, there is provided an information processing method for an information processing apparatus which includes a display section including a plurality of pixels each including an electroluminescent element for emitting light to display an image, including a changeover step of changing over the direction of a voltage to be applied to each of the electroluminescent elements to change over driving of the electroluminescent element between driving for light emission and driving for light reception, and a detection step of detecting an input from the outside based on electric current generated in any of the electroluminescent elements driven for light reception as a result of the changeover by the process at the changeover step when the electroluminescent element receives light.

According to the present invention, there is provided a recording medium on which a computer-readable program for causing a computer to perform an information process by an information processing apparatus which includes a display section including a plurality of pixels each including an electroluminescent element for emitting light to display an image is recorded, the program including a changeover step of changing over the direction of a voltage to be applied to each of the electroluminescent elements to change over driving of the electroluminescent element between driving for light emission and driving for light reception, and a detection step of detecting an input from the outside based on electric current generated in any of the electroluminescent elements driven for light reception as a result of the changeover by the process at the changeover step when the electroluminescent element receives light.

According to a yet further aspect of the present invention, there is provided a program for causing a computer to execute an information process by an information processing apparatus which includes a display section including a plurality of pixels each including an electroluminescent element for emitting light to display an image, the program including a changeover step of changing over the direction of a voltage to be applied to each of the electroluminescent elements to change over driving of the electroluminescent element between driving for light emission and driving for light reception, and a detection step of detecting an input from the outside based on electric current generated in any of the electroluminescent elements driven for light reception as a result of the changeover by the process at the changeover step when the electroluminescent element receives light.

In the information processing apparatus and method, recording medium and program described above, the direction of a voltage to be applied to each of the electroluminescent elements is changed over to change over driving of the electroluminescent element between driving for light emission and driving for light reception. Than, an input from the outside is detected based on electric current generated in any of the electroluminescent elements driven for light reception when the electroluminescent element receives light.

With the information processing apparatus and method, recording medium and program, both of display of an image and detection of an input from the outside can be achieved.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a schematic view illustrating an example of data transferred from the display apparatus to the information processing terminal;

FIG. 14 is a schematic view illustrating an example of data transferred from the information terminal to the display apparatus;

FIG. 15 is a flow chart illustrating a data transfer process of the information processing terminal;

FIG. 20 is a schematic view illustrating movement of a reading region;

DETAILED DESCRIPTION OF THE PREFERRED EMBODIMENTS

Before a preferred embodiment of the present invention is described, an exemplary corresponding relationship between various features set forth in claims and particulars of an embodiment of the present invention is described. It should be noted, however, that the description of the relationship is given merely in order to allow confirmation that the particulars which support the present invention are exemplified by the embodiment of the present invention.

Figure 1:
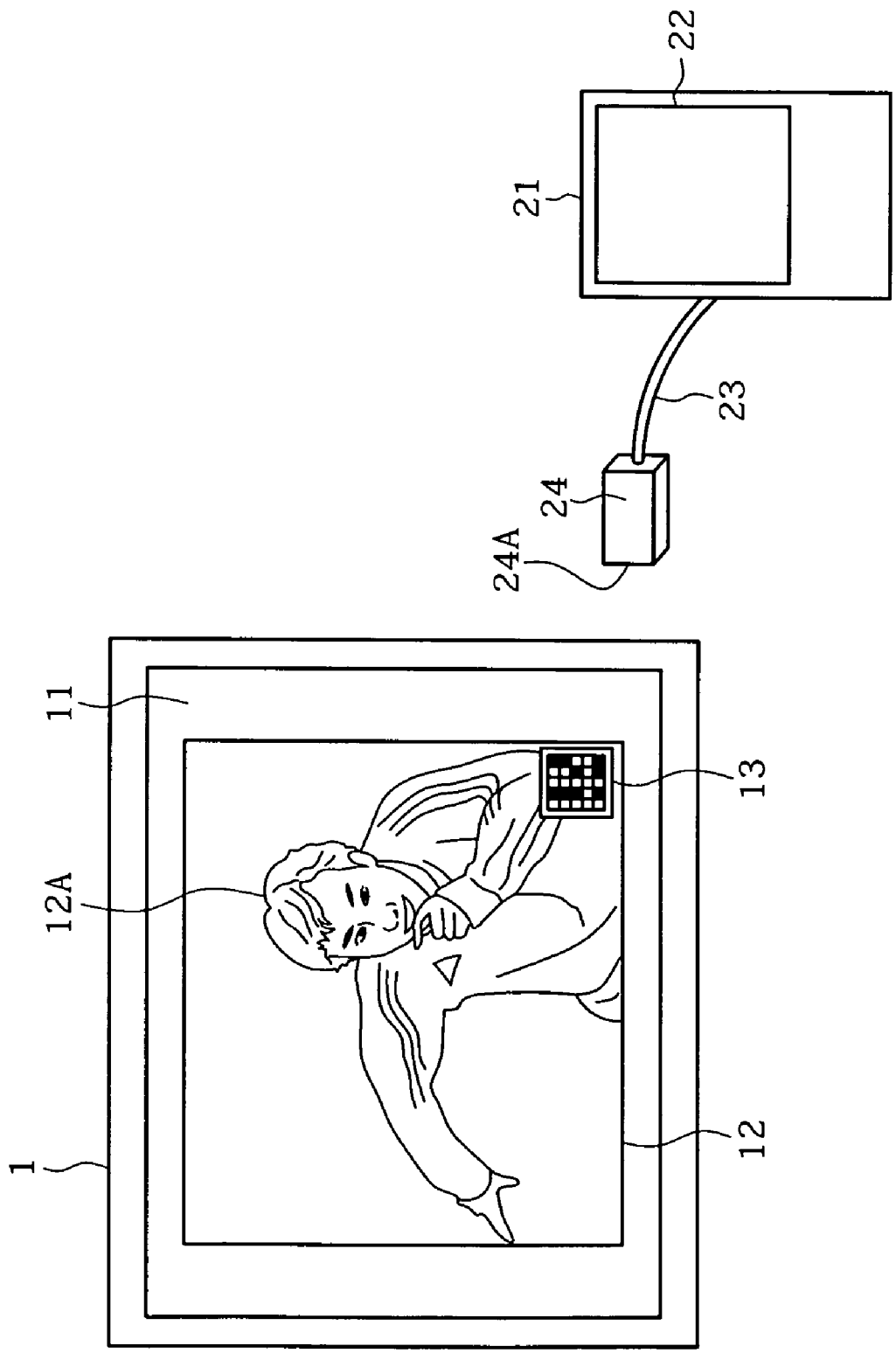
FIGS. 1 and 2 are schematic views showing an example of a configuration of an information processing system to which the present invention is applied.
Figure 7:
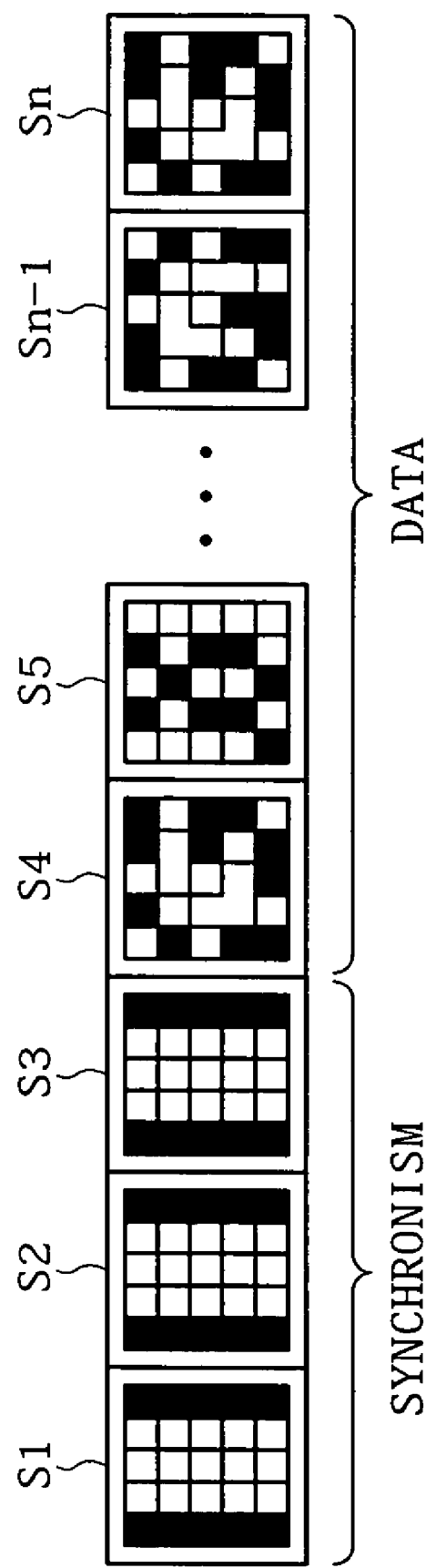
FIG. 7 is a schematic view showing an example of a symbol string.

An information processing apparatus (for example, a display apparatus of FIG. 1) as set forth in claim 1 includes production means (for example, a symbol processing section 52 of FIG. 3) for producing a plurality of first graphic images (for example, such two-dimensional codes as shown in FIG. 7) representative of output data (for example, data of an image displayed on a display section 11 of FIG. 1) to be outputted to a different information processing apparatus (for example, an information processing terminal 21 of FIG. 1), display means (for example, the display section 11 of FIG. 3) for successively displaying the first graphic images produced by the production means, detection means (for example, a detection section 52 of FIG. 3) for detecting a plurality of second graphic images representative of input data (for example, data selected by the information processing terminal 21 of FIG. 1) inputted from the different information processing apparatus in response to successive display of the second graphic images on the different information processing apparatus, and acquisition means (for example, a data processing section 51 of FIG. 3) for acquiring the input data based on the second graphic images detected by the detection means.

An information processing method as set forth in claim 2 includes a production step (for example, a step S3 of FIG. 9) of producing a plurality of first graphic images (for example, such two-dimensional codes as shown in FIG. 7) representative of output data (for example, data of an image displayed on the display section 11 of FIG. 1) to be outputted to a different information processing apparatus (for example, the information processing terminal 2 of FIG. 1), a display step (for example, a step S4 of FIG. 9) of successively displaying the first graphic images produced by the process at the production step, a detection step (for example, a step S62 of FIG. 13) of detecting a plurality of second graphic images representative of input data inputted from the different information processing apparatus in response to successive display of the second graphic images on the different information processing apparatus, and an acquisition step (for example, a step S65 of FIG. 13) of acquiring the input data based on the second graphic images detected by the process at the detection step.

Also in a program recorded on a recording medium as set forth in claim 3 and a program as set forth in claim 4, involved steps correspond to particulars of the embodiment same as those in the case of the information processing method of claim 2.

An information processing apparatus (for example, the display apparatus 1 of FIG. 1) as set forth in claim 5 includes production means (for example, a symbol processing section 52 of FIG. 3) for producing a plurality of graphic images (for example, such two-dimensional codes as shown in FIG. 7) representative of output data (for example, data of an image displayed on the display section of FIG. 1) to be outputted to a different information processing apparatus (for example, the information processing terminal 21 of FIG. 1), and display means (for example, the display section 11 of FIG. 3) for successively displaying the graphic images produced by the production means.

The graphic images handled by the information processing apparatus as set forth in claim 6 are two-dimensional codes (for example, FIG. 7) each of which represents data of a predetermined data amount.

In the information processing apparatus as set forth in claim 7, where an image of one frame is displayed by a single screen scanning operation (that is, in a progressive display system), the display means successively displays one of the graphic images every time one frame is displayed.

In the information processing apparatus as set forth in claim 8, where the output data are image data, the display means successively displays an image based on the image data and displays one of the graphic images in the proximity of the displayed image (for example, an image to be transferred and a symbol 13 representative of the image are displayed in the proximity of each other as seen in FIG. 1).

The information processing apparatus as set forth in claim 9 further includes outputting means (for example, a speaker) for outputting sound based on music data, and where the output data are music data, the display means successively displays the graphic images (graphic images representative of the music data) as the outputting means outputs sound based on the output data.

An information processing method as set forth in claim 10 includes a production step (for example, a step S3 of FIG. 9) of producing a plurality of graphic images (for example, such two-dimensional codes as shown in FIG. 7) representative of output data (for example, data of an image displayed on the display section 11 of FIG. 1) to be outputted to a different information processing apparatus (for example, the information processing terminal 21 of FIG. 1), and a display step (for example, a step S4 of FIG. 9) of successively displaying the graphic images produced by the process at the production step.

Also in a program recorded on a recording medium as set forth in claim 11 and a program as set forth in claim 12, involved steps correspond to particulars of the embodiment same as those in the case of the information processing method of claim 10.

An information processing apparatus as set forth in claim 13 includes detection means (for example, the detection section 52 of FIG. 3) for successively detecting a plurality of graphic images (for example, such two-dimensional codes as shown in FIG. 7) representative of input data inputted from a different information processing apparatus (for example, the information processing terminal 21 of FIG. 1) through successive display of the graphic images on the different information processing apparatus, and acquisition means (for example, the data processing section 51 of FIG. 3) for acquiring the input data based on the graphic images successively detected by the detection means.

The graphic images handled by the information processing apparatus as set forth in claim 14 are two-dimensional codes (for example, FIG. 7) each of which represents data of a predetermined data amount.

Figure 2:
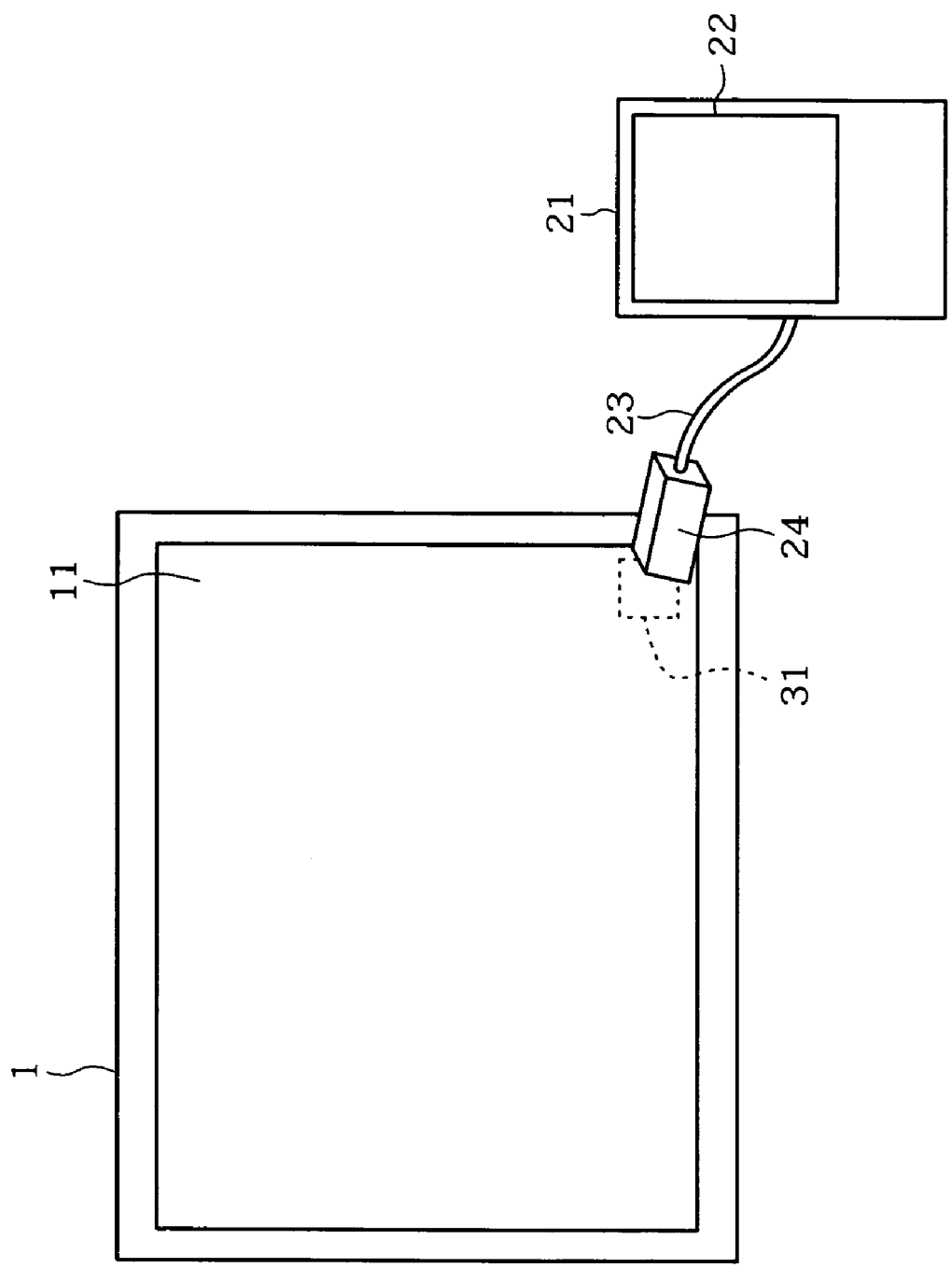

The information processing apparatus as set forth in claim 15 further includes display means (for example, the display section 11 of FIG. 1) for displaying a predetermined image, and formation means (for example, a controller 48 of FIG. 3 which forms a reading region 31 as seen in FIG. 2) for forming, at a portion of a display region of the display means in which the image is displayed, a detection region in which the graphic images are successively detected by the detection means.

In the information processing apparatus as set forth in claim 16, the formation means forms the detection region by applying, to each of pixels in the display region in which the detection region is formed, a voltage reverse to a voltage which is applied to each of pixels which display the image.

In the information processing apparatus as set forth in claim 17, the detection means detects electric current (leak current) generated in response to light from the outside in an active semiconductor layer of a transistor disposed in each of pixels which form the detection region to detect any of the graphic images.

In the information processing apparatus as set forth in claim 18, the detection mean detects electric current generated in response to light from the outside in an electroluminescent element (for example, an EL element of FIG. 4) disposed in each of pixels which form the detection region.

In the information processing apparatus as set forth in claim 19, the formation means forms the detection region (forms, for example, a reading region 211 of FIG. 20) such that the detection region is successively moved in synchronism with scanning of a screen by the display means.

The information processing apparatus as set forth in claim 20 further includes processing means (for example, a control section 45 of FIG. 3 which executes a process at step S147 of FIG. 19) for processing, when the acquisition acquires instruction information (an instruction code in the specification) associated with the input data and indicating a process of the input data, the input data in accordance with the instruction information.

In the information processing apparatus as set forth in claim 21, where the input image acquired by the acquisition means are image data, the processing means controls display of an image corresponding to the image data based on the instruction information.

In the information processing apparatus as set forth in claim 22, the processing means stores the input data acquired by the acquisition means in accordance with the instruction information.

In the information processing apparatus as set forth in claim 23, the processing means controls transmission of the input data acquired by the acquisition means to another apparatus in accordance with the instruction information.

An information processing method as set forth in claim 24 includes a detection step (for example, a step S62 of FIG. 13) of successively detecting a plurality of graphic images (for example, such two-dimensional codes as shown in FIG. 7) representative of input data inputted from a different information processing apparatus (for example, the information processing terminal 21 of FIG. 1) through successive display of the graphic images on the different information processing apparatus, and an acquisition step (for example, a step S65 of FIG. 13) of acquiring the input data based on the graphic images successively detected by the process at the detection step.

Also in a program recorded on a recording medium as set forth in claim 25 and a program as set forth in claim 26, involved steps correspond to particulars of the embodiment same as those in the case of the information processing method of claim 24.

An information processing apparatus (for example, the display apparatus 1 which has a configuration of FIG. 27) as set forth in claim 27 includes a display section (for example, the display section 11 of FIG. 27) including a plurality of pixels each including an electroluminescent element (for example, an EL element of FIG. 29) for emitting light to display an image, changeover means (for example, a switching section 301 of FIG. 27) for changing over the direction of a voltage to be applied to each of the electroluminescent elements to change over driving of the electroluminescent element between driving for light emission and driving for light reception, and detection means (for example, a detection section 53 of FIG. 27) for detecting an input from the outside based on electric current generated in any of the electroluminescent elements driven for light reception as a result of the changeover by the changeover means when the electroluminescent element receives light.

Figure 32:
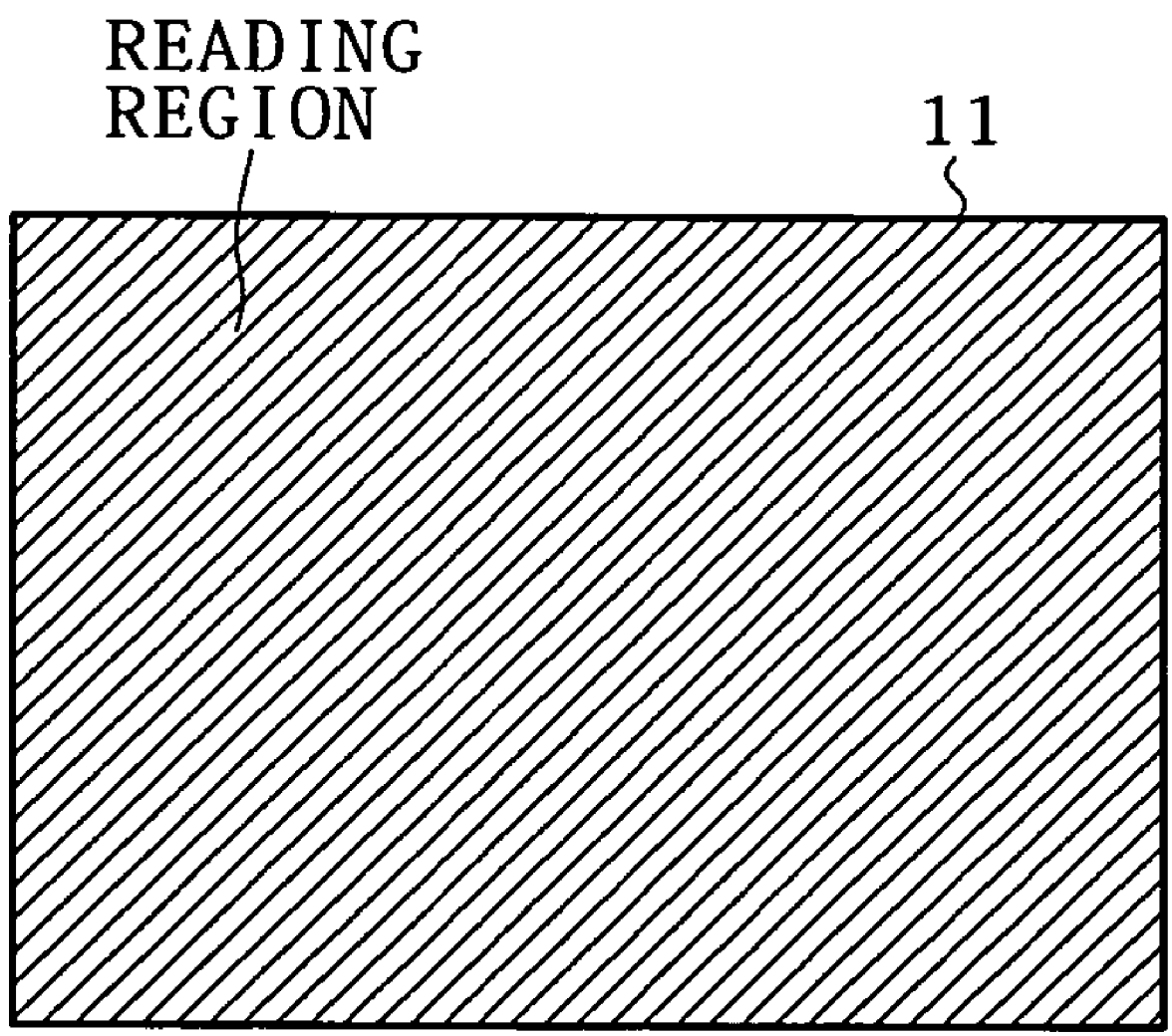
FIG. 32 is a schematic view showing a range of a reading region shown in FIGS. 31A to 31C.

In the information processing apparatus as set forth in claim 28, the changeover means forms a detection region (a reading region in the specification) including a plurality of ones of the pixels whose respective electroluminescent elements are driven for light reception in a predetermined region (for example, over an overall area of the display section of FIG. 32) of the display section.

In the information processing apparatus as set forth in claim 29, the changeover means forms a display region including a plurality of ones of the pixels whose respective electroluminescent elements are driven for light emission.

Figure 42:
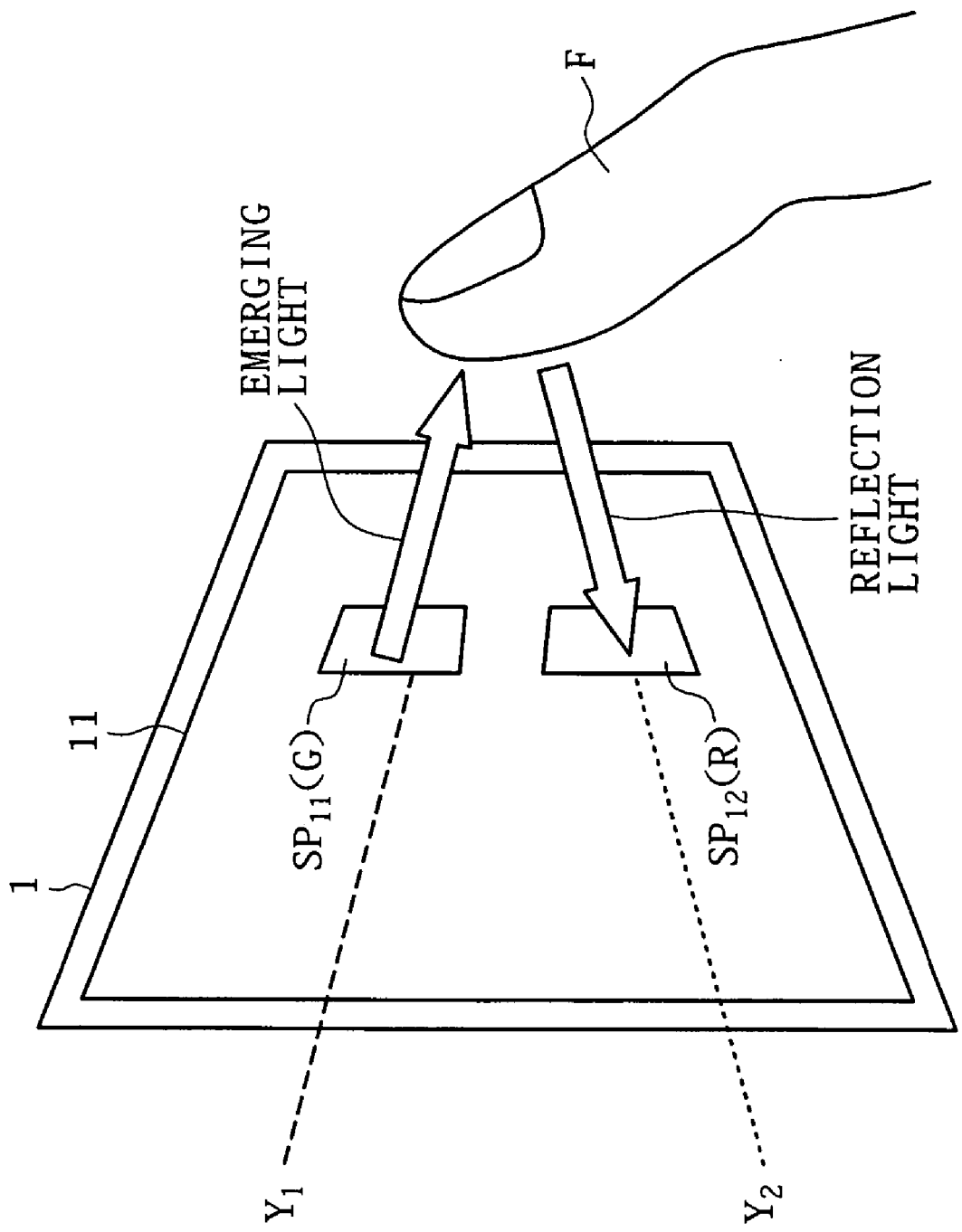
FIG. 42 is a schematic view illustrating an example of detection of an input.

In the information processing apparatus as set forth in claim 30, where the changeover means forms, in the proximity of a first pixel including a first electroluminescent element driven for light emission, a second pixel including a second electroluminescent element driven for light reception (for example, where a pixel driven for light emission and a pixel driven for light reception are formed as seen in FIG. 42), the detection means detects an input from the outside based on electric current generated when the second electroluminescent element receives reflected light originating from the light emitted from the first electroluminescent element.

In the information processing apparatus as set forth in claim 31, the detection means detects that a predetermined object (for example, a finger F of FIG. 42 or an object O of FIG. 44) is positioned in the proximity of a surface of the display section as an input from the outside.

In the information processing apparatus as set forth in claim 32, the detection means detects plane information (for example, information of a fingerprint) of an object which contacts with or is positioned in the proximity of a surface of the display section as an input from the outside based on electric current generated when the second electroluminescent element receives reflected light originating from the light emitted from the first electroluminescent element.

In the information processing apparatus as set forth in claim 33, the first electroluminescent element is an element (for example, an element which emits light of a wavelength in the proximity of green) which emits light of a predetermined wavelength, and the second electroluminescent element is an element (for example, an element which emits light of a wavelength in the proximity of red) which has a high light reception sensitivity to light of the predetermined wavelength.

The information processing apparatus as set forth in claim 34 further includes image formation means (for example, a lens of FIG. 50) for forming an image of an object positioned remotely from the display section, and the detection means detects an image of an object formed by the image formation means as an input from the outside based on electric current generated when any of the electroluminescent elements which is driven for light reception receives light.

An information processing method as set forth in claim 35 is an information processing method for an information processing apparatus which has a display section having a plurality of pixels each having an electroluminescent element for emitting light to display an image, including a changeover step (for example, steps S204 and S206 of FIG. 30) of changing over the direction of a voltage to be applied to each of the electroluminescent elements to change over driving of the electroluminescent element between driving for light emission and driving for light reception, and a detection step (for example, a step S207 of FIG. 30) of detecting an input from the outside based on electric current generated in any of the electroluminescent elements driven for light reception as a result of the changeover by the process at the changeover step when the electroluminescent element receives light.

Also in a program recorded on a recording medium as set forth in claim 36 and a program as set forth in claim 37, involved steps correspond to particulars of the embodiment same as those in the case of the information processing method of claim 10.

Referring to FIG. 1, there is shown an example of a configuration of an information processing system to which the present invention is applied.

A display section 11 is formed over an overall area of a front face of a display apparatus 1 (information processing apparatus). The display section 11 is formed, for example, from an organic or inorganic EL (Electroluminescence) display unit or an LCD (Liquid Crystal Display) unit wherein a TFT (Thin Film Transistor) is disposed for each pixel. The display section 11 displays an image of a predetermined graphic form or characters thereon by controlling driving of each pixel.

A moving picture 12A is displayed in a window 12 displayed on the display section 11, and a symbol 13 in the form a matrix type two-dimensional code is displayed at the right lower corner of the window 12. The symbol 13 is a graphic image representative of data of the moving picture 12A and has a white/black pattern which is changed over, for example, for each display of one frame by the display section 11. More particularly, when the display apparatus 1 acquires source data of the moving picture 12A, it produces a symbol string formed from a plurality of symbols (two-dimensional codes) representative of the source data and successively displays one of the symbols every time one frame is displayed.

Accordingly, any apparatus which includes a reader which can detect and analyze a symbol displayed thereon to discriminate the symbol can acquire source data through symbols successively displayed on the display section 11.

An information processing terminal 21 may be a PDA (Personal Digital Assistants), a personal computer, a portable telephone set or a like apparatus, and a reader/writer 24 which can read a symbol displayed on the display apparatus 1 is connected to the information processing terminal 21 through a cable 23. When an end face 24A of the reader/writer 24 is contacted with the symbol 13 displayed on the display section 11, the symbol 13 displayed on the display section 11 is read by the reader/writer 24.

In particular, the reader/writer 24 detects a pattern of the symbol 13 displayed on the display section 11 for a predetermined period of time in accordance with a display cycle of the display section 11. Data of the symbol detected by the reader/writer 24 is outputted to the information processing terminal 21 through the cable 23.

The information processing terminal 21 acquires a symbol string in which a plurality of symbols are arranged in a time series based on the data transferred thereto from the reader/writer 24 and acquires source data (source data of an image displayed on the display apparatus 1) from the acquired symbol string. Consequently, data corresponding to the image displayed on the display section 11 are transferred from the display apparatus 1 to the information processing terminal 21 through the symbol 13.

If, for example, symbols are successively displayed in accordance with the progressive system in a frequency of 60 Hz and data of 2 KB (kilobytes) is represented by one symbol, then data are transferred at a transfer rate of 960 Kbps (60 (times/sec)×2 (KB)×8 (bits)). A display unit which can display a video image of a high picture quality in a frequency of 400 Hz has been developed in recent years, and if symbols each representing data of 2 KB are successively displayed in such a very short cycle as in the display unit just mentioned, then data are transferred at a transfer rate of 6,400 Kbps (400 (times/sec)×2 (KB)×8 (bits)).

In other words, data can be communicated at a comparatively high transfer rate without using such a radio LAN (Local Area Network) as the IEEEE (Institute of Electrical and Electronics Engineers) 802.11a, 802.11b or such radio communication as the Bluetooth.

It is to be noted that the amount of data represented by one symbol can be changed suitably through a change of the size of the symbol or the error correction system. Also the transfer rate can be changed suitably by a change of the data amount represented by one symbol and the display frequency of the display section 11.

In the information processing terminal 21, the data transferred from the display apparatus 1 through the symbol 13 is stored into an internal storage section, or an image corresponding to the data transferred thereto is displayed on a display section 22.

Accordingly, a user can fetch data from the display apparatus 1 into the information processing terminal 21 by such a very intuitive operation as to contact the end face 24A of the reader/writer 24 with the symbol 13 displayed on the display section 11.

Further, the user can input data from the information processing terminal 21 to the display apparatus 1 conversely to that described above by contacting the end face 24A of the reader/writer 24 with a reading region formed at a predetermined position of the display section 11.

For example, a reading region 31 is formed at a right lower portion of the display section 11 by the display apparatus 1 as shown in FIG. 2, and transfer of data through a symbol is performed through the reader/writer 24 contacting with the reading region 31.

While detailed description is hereinafter given, to a TFT disposed for each pixel of the display section 11, a forward bias voltage is applied in order to cause the pixel to display part of a predetermined image, but a reverse bias voltage is applied in order to cause the pixel to detect a symbol outputted from the reader/writer 24. Accordingly, the reading region 31 is formed from a plurality of pixels wherein, for example, a reverse bias voltage is applied from among the pixels of the display section 11.

When light is inputted from the outside to each pixel (TFT) wherein a reverse bias voltage is applied in this manner (when light representative of a black/white pattern of a symbol is inputted from the reader/writer 24), leak current is generated in an active semiconductor layer of the TFT. Therefore, whether or not light is illuminated on each of the pixels included in the reading region 31 from the outside is detected based on whether or not leak current is detected in the pixel.

In particular, when a symbol is displayed on a symbol display section 104 (refer to FIG. 8) provided in the inside of the reader/writer 24 and light corresponding to the symbol is illuminated on the reading region 31, each of the pixels which form the reading region 31 detects whether or not light is present, in other words, white/black of the symbol.

More particularly, leak current is not generated in each of those pixels of the reading region 31 with which a black portion of the symbol displayed in the reader/writer 24 contacts. However, leak current is generated in each of those pixels with which a white portion of the symbol contacts, and the thus generated current is detected.

Then, results of such detection at the pixels of the reading region 31 are synthesized, and consequently, one symbol displayed in the reader/writer 24 is acquired by the display apparatus 1. Further, as the sequence of operations described is repeated for a predetermined period of time, a symbol string displayed in the reader/writer 24 (all symbols representative of the data transferred from the information processing apparatus 21) is fetched into the display apparatus 1. In the display apparatus 1, data selected so as to be transferred to the display apparatus 1 by the information processing terminal 21 are restored and acquired by an analysis of the symbol string.

Consequently, the user can fetch data from the display apparatus 1 into the information processing terminal 21 only by contacting the reader/writer 24 with the symbol 13 displayed on the display section 11. Further, the user can transfer data selected on the information processing terminal 21 to the display apparatus 1 only by contacting the reader/writer 24 with the reading region 31.

In other words, data can be communicated readily by an intuitive operation without complicated setting when compared with communication of data performed through a radio LAN or the Bluetooth between the display apparatus 1 and the information processing terminal 21.

It is to be noted that, while the reading region 31 formed on the display section 11 is indicated by a broken line in FIG. 2, alternatively a framework image of a predetermined size in which the reading region 31 is formed may be displayed such that the user can visually observe the same.

Further, while, in FIG. 2, no image is displayed in a region of the display section 11 other than the reading region 31, it is possible to display various kinds of images such as a video image of a television program in the region of the display section 11 other than the reading region 31 in which a reverse bias voltage is applied.

Communication of data performed between the display apparatus 1 and the information processing terminal 21 is hereinafter described in detail with reference to flow charts.

Figure 3:
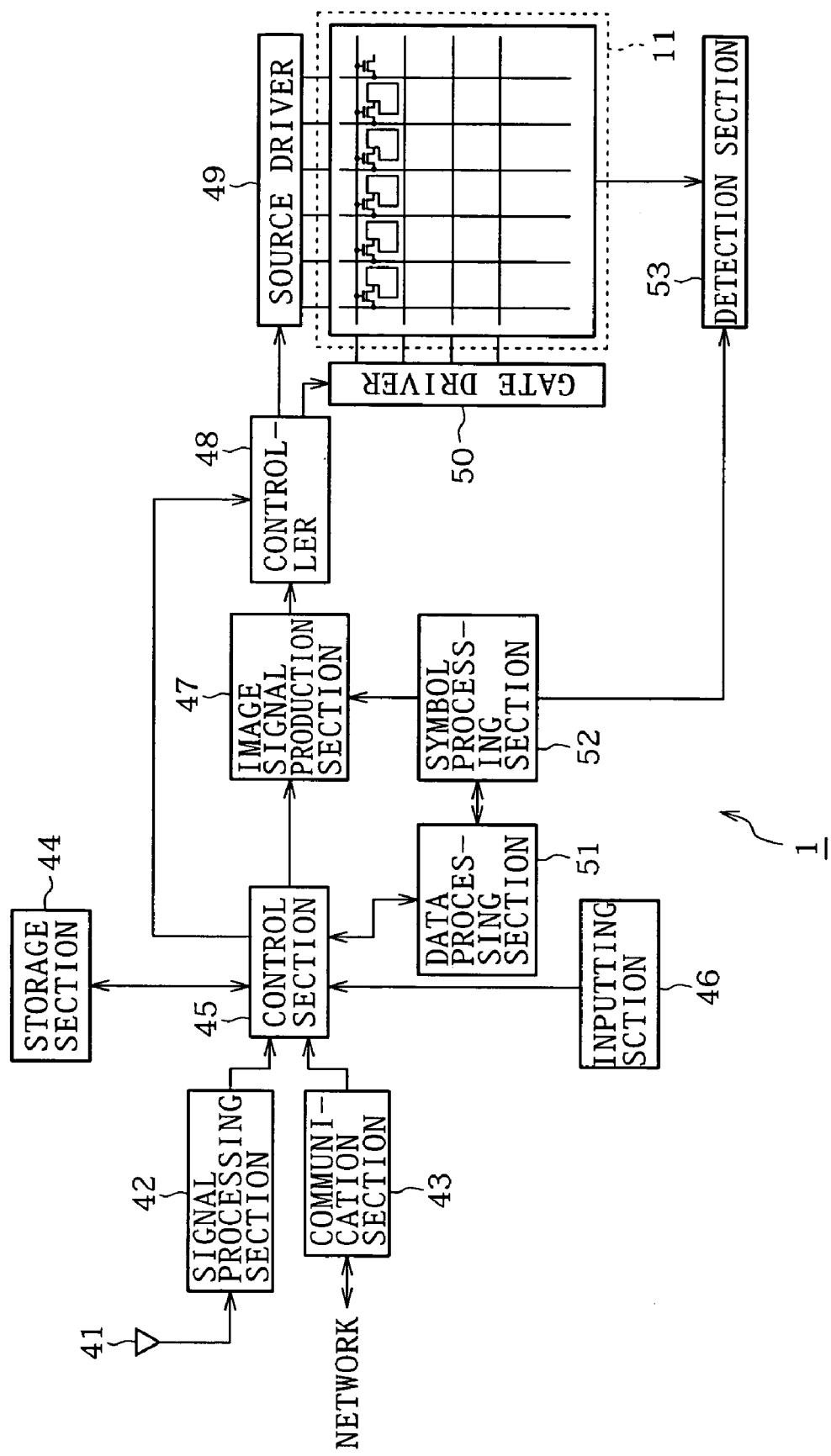
FIG. 3 is a block diagram showing an example of a configuration of a display apparatus shown in FIG. 1.

FIG. 3 is a block diagram showing an example of a configuration of the display apparatus 1 shown in FIG. 1.

A control section 45 controls operation of the entire display apparatus 1 based on a control program stored in a ROM (Read Only Memory) not shown or a like apparatus. The control section 45 thus executes a process corresponding to an instruction of the user from an inputting section 46, which may include a remote controller and so forth, so that, for example, a video image of a program of a predetermined channel is displayed or the display apparatus 1 accesses a predetermined site to display a screen of the site and so forth.

A signal processing section 42 acquires a signal of a predetermined channel from among television broadcasting waves received by an antenna 41 under the control of the control section 45 and outputs data of a program broadcast through the channel to the control section 45. A communication section 43 communicates with various apparatus by wire communication or wireless communication through a network such as the Internet and outputs data acquired through the communication to the control section 45.

A storage section 44 is formed from a hard disk or the like and stores various data such as data transferred from the information processing terminal 21, program data of a television program and data acquired through the communication section 43.

An image signal production section 47 produces an image signal for displaying an image corresponding to data supplied from the control section 45 and outputs the thus produced image signal to a controller 48 for controlling driving of the display section 11.

The image signal production section 47 further produces an image signal for causing one symbol to be displayed, for example, for each one screen (for each display of one frame) based on data produced by and supplied from a symbol processing section 52, and outputs the image signal to the controller 48.

The controller 48 controls driving of a gate driver 50 for controlling the voltage to be applied to the gate electrode of a TFT disposed for each pixel of the display section 11. The controller 48 further controls driving of a source driver 49 for controlling the voltage between the source electrode and the drain electrode of the TFT in an interlocking relationship with the driving of the gate driver 50.

For example, if an instruction to form a reading region at a predetermined position of the display section 11 is received from the control section 45, then the controller 48 controls the gate driver 50 so that a reverse bias voltage may be applied to each pixel (the TFT of each pixel) which forms the reading region but controls the gate driver 50 so that a forward bias voltage may be applied in any other region than the reading region.

Consequently, the gate of each pixel which forms the reading region is placed into an off state, and therefore, the pixels in the reading region can detect a pattern of a symbol outputted from the reader/writer 24 based on whether or not leak current caused by light illuminated from the outside is present. On the other hand, the gate of any other pixel is placed into an on state, and an EL element connected to the pixel electrode emits light with current corresponding to a voltage supplied thereto from the source driver 49 thereby to display part of an image.

Here, operation of a TFT disposed for each pixel of the display section 11 is described in more detail with reference to FIGS. 4 and 5.

Figure 4:
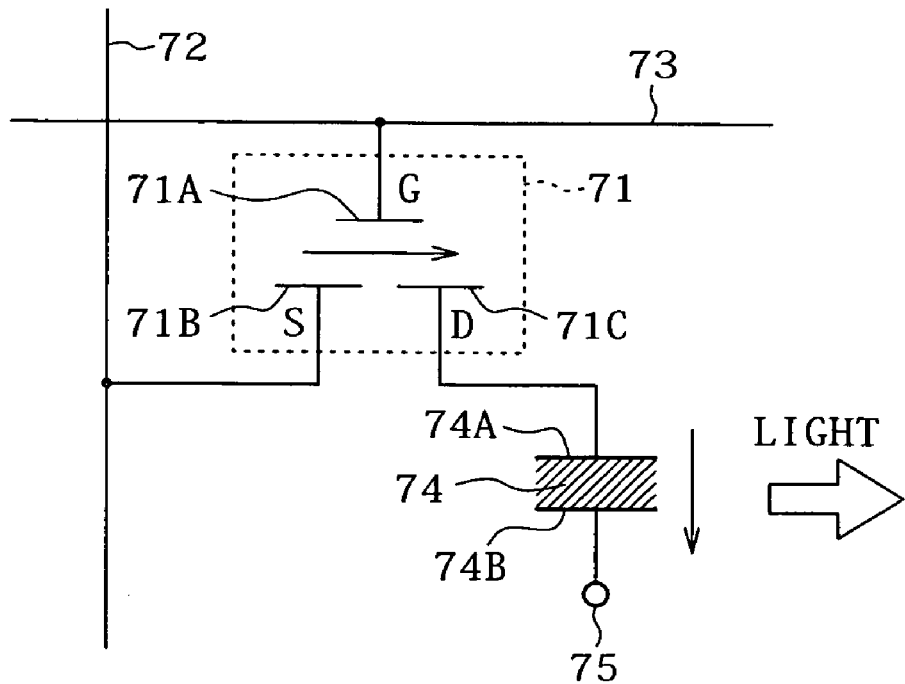
FIGS. 4 and 5 are diagrammatic views showing details of a form of a pixel which forms the display section of FIG. 3.

FIG. 4 shows a pixel of the display section 11 controlled by the controller 48 as a pixel which is to display an image, that is, a pixel which does not form a reading region for a symbol.

For example, if a forward voltage is applied to a gate electrode 71A (G) of a TFT 71 from the gate driver 50 to turn on the TFT 71, then current flows in a direction from a source electrode 71B (S) to a drain electrode 71C (D) through an active semiconductor layer (channel) formed from amorphous silicon or polycrystalline silicon in response to a voltage applied from the source driver 49.

An anode electrode 74A of an EL element 74 is connected to the drain electrode 71C of the TFT 71, and when current supplied from the drain electrode 71C flows through the EL element 74, the EL element 74 which is an electroluminescence element emits light in accordance with the current.

The light emitted in this manner passes through the surface of the display section 11 and goes out to the outside of the display apparatus 1 so that part of an image is displayed by the pixel of FIG. 4. It is to be noted that, while light is shown going out in the rightward direction in FIG. 4 as indicated by a blank arrow mark for the convenience of illustration, actually one of the anode electrode 74A and the cathode electrode 74B is formed from a transparent electrode, and the light emitted from the EL element 74 goes out to the outside through the transparent electrode.

On the other hand, if a reverse voltage is applied to the gate electrode 71A (G) of the TFT 71 from the gate driver 50 thereby to turn off the gate, then even if a voltage is applied from the source driver 49, no current flows in the active semiconductor layer. As a result, no current flows through the EL element 74, and no light is emitted from the EL element 74. If, in this state, light is illuminated from the outside as indicated by a blank arrow mark in FIG. 5, then leak current (off current) flows in a direction from the drain electrode 71C to the source electrode 71B due to the photoconductivity of the active semiconductor layer of the TFT 71 although the amount of the leak current is small. When light is illuminated on the EL element 74 in a state wherein a voltage in the reverse direction is applied to the EL element 74, also the EL element 74 generates current in the reverse direction without emitting light therefrom.

Figure 5:
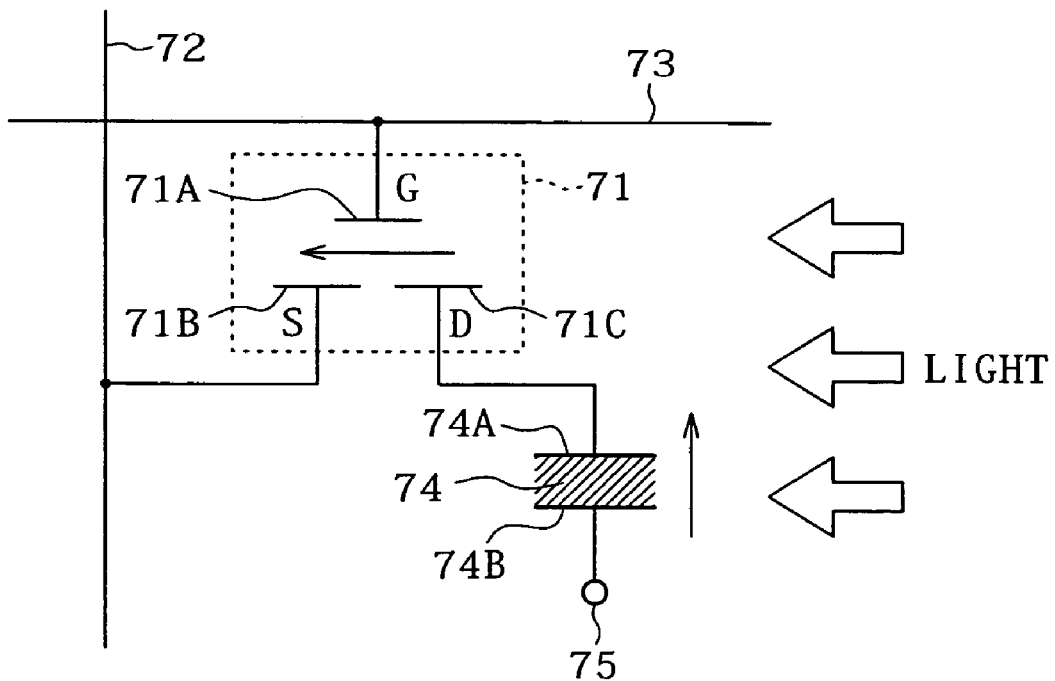

The current generated in this manner is detected, and it is detected thereby that light is illuminated from the outside upon the pixel of FIG. 5, that is, that a white region of a symbol is displayed at the position of the symbol display section 104 (FIG. 8) of the reader/writer 24 corresponding to the pixel of FIG. 5, that is, at a position in front of the pixel of FIG. 5.

Figure 6:
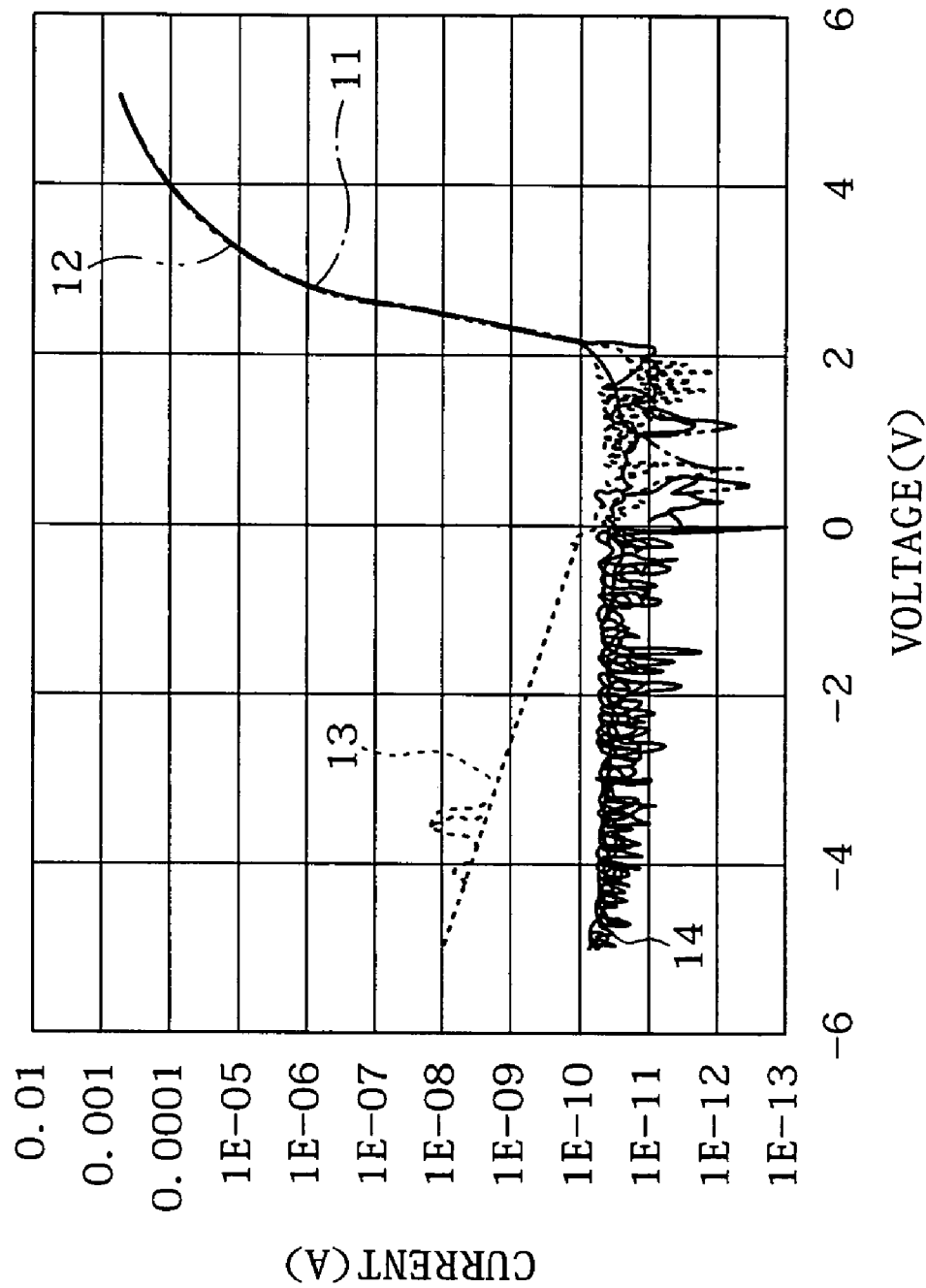
FIG. 6 is a diagram illustrating an example of a result of measurement of a current value detected on the pixel of FIGS. 4 and 5.

FIG. 6 illustrates results of a measurement of current generated in the pixels shown in FIGS. 4 and 5. Referring to FIG. 6, the axis of abscissa indicates the voltage applied to the gate electrode 71A, and the axis of ordinate indicates the current in the pixel.

The measurement result I1 indicates the value of current flowing in the channel when light is illuminated while a forward voltage is applied. The measurement result I2 indicates the value of current flowing in the channel when no light is illuminated while a forward voltage is applied.

It can be recognized from the measurement results I1 and I2 that, when a forward voltage is applied, current corresponding to the voltage applied from the source driver 49 flows irrespective of whether or not light is illuminated from the outside. In particular, in this instance, part of an image is displayed by a pixel of the object of measurement.

Meanwhile, the measurement result I3 of FIG. 6 indicates the value of leak current generated in the pixel when light is illuminated on the pixel from the outside while a reverse voltage is applied. It can be seen apparently from comparison with the measurement result I4 obtained where no light is illuminated from the outside that the current generated is different.

For example, if a predetermined amount of light is illuminated from the outside while a voltage of approximately −5 V (a reverse voltage) is applied, then current (current generated in the active semiconductor layer of the TFT and current generated in the EL element) of approximately "1E−8 (A)" is generated.

Accordingly, whether or not light is illuminated on a pixel is detected depending upon whether or not the current detected at the pixel assumes a value higher than a predetermined threshold value while a reverse bias voltage is applied to the pixel. It is to be noted that the signals illustrated in FIG. 6 are amplified actually, and it is detected from the amplified signals whether or not the pixel is illuminated with light.

In FIG. 6, it can be seen from the measurement result I4 that, even when light is not illuminated from the outside, very low current of approximately "1E−10 (A)" is generated. However, this originates from noise during the measurement. It is to be noted that substantially same measurement results as those illustrated in FIG. 6 are obtained from different EL elements irrespective of light of which one of the colors of R, G and B they emit.

While, in the examples shown in FIGS. 4 and 5, a single TFT is provided for one pixel, also in the case of a pixel of the 2-TFT type which includes two TFTs and a pixel of the 4-TFT type which includes four TFTs, an input of a symbol from the outside can be detected based on leak current generated in the TFTs.

Meanwhile, where the display section 11 is an LCD unit, that is, where the display section 11 is not a self light emitting display unit which includes EL element 74, a liquid crystal element is provided at the position of the EL element 74 in FIGS. 4 and 5 to form a pixel. In this instance, even when a reverse bias voltage is applied and light is illuminated from the outside, since the liquid crystal does not generate current different from the EL element 74, a white/black pattern of a symbol is detected based only on leak current generated in the TFT disposed in the pixel.

Referring back to FIG. 3, a detection section 53 detects current generated in each pixel to which a reverse bias voltage is applied as described above and outputs a result of the detection to the symbol processing section 52.

The symbol processing section 52 synthesizes detection results of those pixels which form the reading region based on the output of the detection section 53 to acquire a symbol outputted from the reader/writer 24.

The process of detecting a symbol is executed repetitively for a predetermined period of time necessary to transfer source data. Consequently, such a symbol string as shown in FIG. 7 is acquired by the symbol processing section 52.

Referring to FIG. 7, in the example shown, symbols S1 to S3 are used for establishing synchronism upon detection, and a symbol having a simple pattern repetitively appears as the symbols S1 to S3. Then, various source data such as, for example, image data, music data and text data are represented by succeeding symbols S4 to Sn.

Referring back to FIG. 3, such a symbol string as shown in FIG. 7 is acquired by the symbol processing section 52 and then outputted to a data processing section 51.

The symbol processing section 52 further displays a symbol at a predetermined position on the display section 11, and when it transfers data to the information processing terminal 21, it produces a symbol based on data supplied thereto from the data processing section 51. Data of the symbol string produced by the symbol processing section 52 are outputted to the image signal production section 47. For example, if the symbol string of FIG. 7 is produced by the symbol processing section 52, then the symbols S1 to Sn are successively displayed on the display section 11 every time one frame is displayed.

The data processing section 51 suitably performs scrambling, addition of an error correction block, a modulation process and other necessary processes for source data (data to be transferred to the information processing terminal 21) supplied thereto from the control section 45 when a symbol is displayed on the display section 11. Then, the data processing section 51 outputs resulting data to the symbol processing section 52.

Further, when a symbol is detected in the reading region formed on the display section 11 and data representative of the symbol is supplied from the symbol processing section 52, the data processing section 51 suitably performs a demodulation process, an error correction process, a descrambling process and other necessary processes for the data supplied thereto. Then, the data processing section 51 supplies source data obtained by the processes (data transferred from the information processing terminal 21) to the control section 45.

The data transferred from the information processing terminal 21 and supplied to the control section 45 are stored into the storage section 44 or processed by the image signal production section 47 or the controller 48 so that a corresponding image is displayed on the display section 11.

Figure 8:
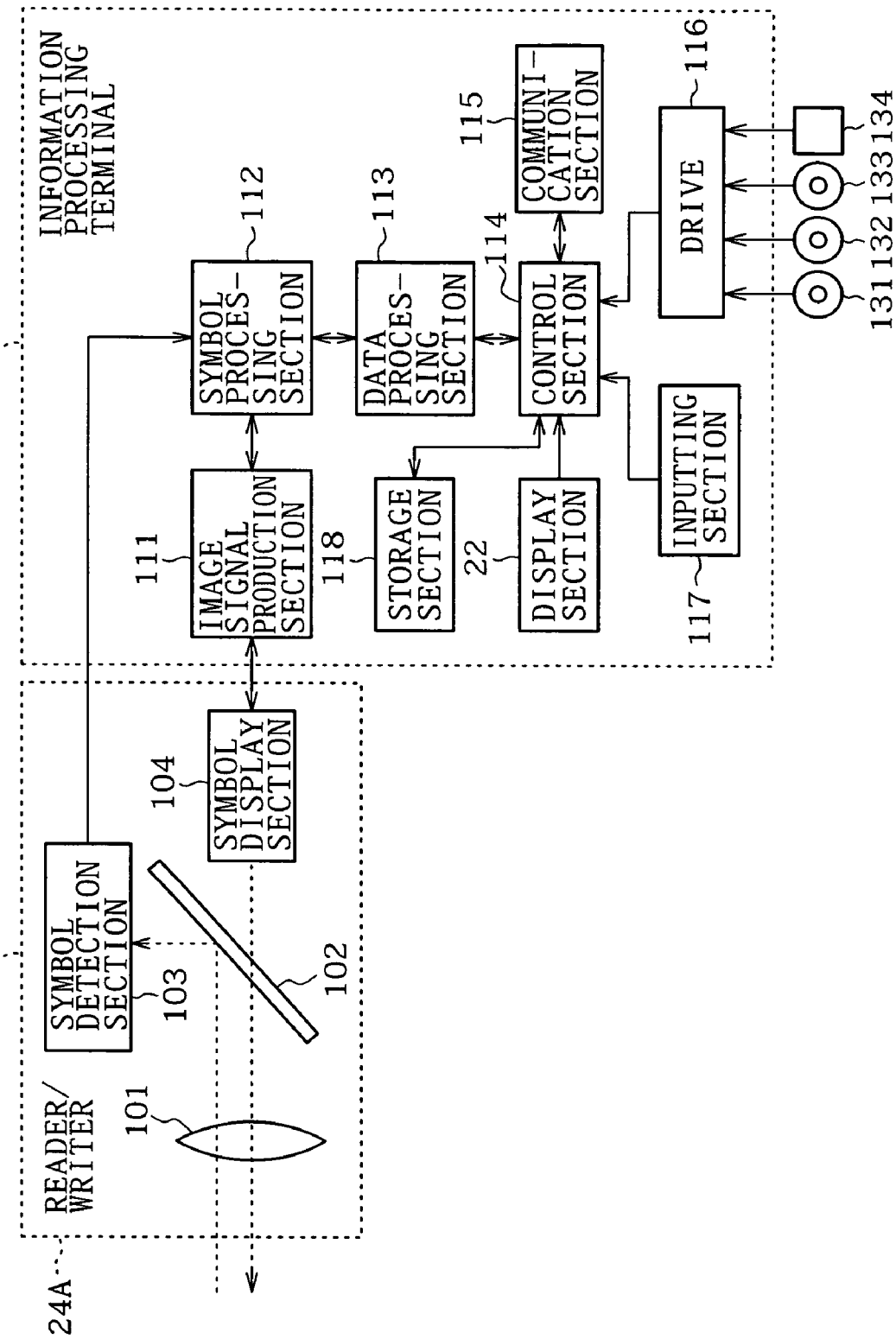
FIG. 8 is a block diagram showing an example of a configuration of a reader/writer shown in FIG. 1.

FIG. 8 is a block diagram showing an example of a configuration of the information processing terminal 21 and the reader/writer 24.

A lens 101 is disposed on the end face 24A of the reader/writer 24. For example, when the end face 24A is contacted with or moved to the proximity of a symbol displayed on the display section 11, light emitted from the display section 11 and representative of a pattern of a symbol is introduced into the inside of the reader/writer 24 through the lens 101. The incoming light is reflected by a half mirror 102 and received by a symbol detection section 103.

The symbol detection section 103 includes photo-sensors arranged in an array on the symbol detection section 103 for detecting light and detects a symbol currently displayed on the display section 11 from the light reflected by the half mirror 102 and received by the photo-sensors. Results of the detection of the symbol detection section 103 are outputted to a symbol processing section 112 of the information processing terminal 21 through the cable 23.

The symbol display section 104 is formed from an LCD unit or the like which can display in accordance with the progressive system, and displays a symbol in a frequency equal to that of the display section 11. For example, when data are transferred to the display apparatus 1, the symbol display section 104 successively displays a symbol representative of the transferred data based on a signal supplied thereto from an image signal production section 111 and illuminates light representative of the symbol on a reading region formed on the display section 11. For the illumination of the light representative of the symbol, the symbol display section 104 makes use of light from a light source (not shown) provided in an opposing relationship to the half mirror 102 across the symbol display section 104 itself. The illuminating light is emitted outwardly from the end face 24A of the reader/writer 24 through the half mirror 102 and the lens 101.

A control section 114 controls operation of the entire information processing terminal 21 based on a control program stored in a storage section 118 formed from a ROM (not shown) or a hard disk. A communication section 115 communicates with various apparatus by wire communication or wireless communication through a network such as the Internet.

An inputting section 117 outputs an instruction from the user inputted to predetermined inputting buttons or a touch panel, which is disposed in an overlapping relationship with the display section 22, to the control section 114.

The image signal production section 111 produces an image signal for causing the symbol display section 104 to display a symbol based on data of a symbol string produced by and supplied thereto from the symbol processing section 112, and outputs the image signal to the symbol display section 104 through the cable 23.

The symbol processing section 112 regenerates a symbol based on a result of detection by the symbol detection section 103 to acquire a symbol string displayed on the display section 11 when data are acquired from the display apparatus 1. In other words, the symbol processing section 112 repetitively executes a process for detecting a symbol for a predetermined period of time. Consequently, such a symbol string as shown in FIG. 7 is acquired by the symbol processing section 112.

Further, when a symbol is to be displayed on the symbol display section 104 and data are to be transferred to the display apparatus 1, the symbol processing section 112 produces a symbol based on the data supplied thereto from a data processing section 113. Data of the symbol produced by the symbol processing section 112 is outputted to the image signal production section 111.

When a symbol is to be displayed on the symbol display section 104, the data processing section 113 suitably performs scrambling, addition of an error correction block, a modulation process and other necessary processes for source data (data to be transferred to the display apparatus 1) supplied thereto from the control section 114. Then, the data processing section 113 outputs resulting data to the symbol processing section 112. Further, when data representative of a detected symbol is supplied from the symbol processing section 112, the data processing section 113 suitably performs a demodulation process, an error correction process, a descrambling process and other necessary processes for the received data. Then, the data processing section 113 supplies resulting source data (data transferred thereto from the display apparatus 1) to the control section 114.

It is to be noted that a drive 116 is connected to the control section 114 as the need arises. A magnetic disk 131, an optical disk 132, a magneto-optical disk 133 or a semiconductor memory 134 is suitably loaded into the drive 116, and a computer program read out from the thus loaded medium is installed into the storage section 118 as the need arises.

Now, operation of the information processing system of FIG. 1 is described with reference to flow charts.

First, a process of the display apparatus 1 when it transfers data to the information processing terminal 21 is described with reference to a flow chart of FIG. 9.

First at step S1, the control section 45 acquires source data to be transferred to the information processing terminal 21. For example, while a predetermined television program is displayed on the display section 11, if an instruction to transfer data of the program is issued by the user, then the control section 45 acquires the program data as source data. Or, while image data acquired through a network is displayed on the display section 11, if an instruction to transfer the image data is issued, then the control section 45 acquires the image data as source data.

Naturally, the user can issue an instruction to the display apparatus 1 to transfer various kinds of data such as music data or text data stored in the storage section 44 of the display apparatus 1 to the information processing terminal 21.

The source data acquired by the control section 45 is outputted, for example, to the image signal production section 47 and the data processing section 51.

At step S2, the data processing section 51 suitably performs a scrambling process, addition of an error correction code, a modulation process, addition of a synchronizing code and other necessary processes for the source data supplied thereto from the control section 45 for each predetermined data unit so that the source data can be represented by a symbol string.

Further, the data processing section 51 suitably adds information representative of a title or a category of the data to be transferred or information representative of a data amount or a format of the data as sub data. The data to which the various processes have been performed by the data processing section 51 are supplied to the symbol processing section 52.

At step S3, the symbol processing section 52 refers to, for example, a conversion table prepared in advance to produce a symbol corresponding to the data supplied thereto from the data processing section 51. The symbol produced may be a symbol of the matrix type including cells each coded to black or white or a symbol of the stack type wherein bar codes are stacked into a code.

A predetermined number of symbols corresponding to the data amount of the source data are produced by the symbol processing section 52 and, for example, such a symbol string as seen in FIG. 7 is outputted to the image signal production section 47.

At step S4, the image signal production section 47 superposes the image signal supplied thereto from the control section 45 for displaying an image corresponding to the source data and the image signal supplied from the symbol processing section 52 for displaying a symbol string to obtain an image signal. Then, the image signal production section 47 supplies the thus obtained image signal to the controller 48 so that the symbols are successively displayed together with an image corresponding to the source data.

Consequently, a symbol corresponding to the image displayed, that is, a symbol for transferring the displayed image, is displayed at a predetermined position of the display section 11 such as, for example, a position in the proximity of the displayed image.

At step S5, the controller 48 discriminates whether or not all of the symbols representative of the data to be transferred are displayed. Then, the processing returns to step S4 to successively repeat a display of a symbol until after the controller 48 discriminates that all symbols are displayed. Then, when it is discriminated at step S5 that all symbols are displayed, the processing is ended.

It is to be noted that a symbol string may otherwise be displayed repetitively only for a period of time for which an image based on data to be transferred is displayed so that the user can recognize that, if a symbol displayed currently is fetched, then image data of the image currently displayed on the display section 11 can be fetched into the information processing terminal 21. For example, if moving pictures for 10 minutes are displayed on the display section 11, then a symbol string produced from the data of the moving pictures is displayed repetitively for 10 minutes in accordance with the display of the images.

The user can fetch data from the display apparatus 1 into the information processing terminal 21 by reading a symbol displayed at a predetermined position of the display section 11 using the reader/writer 24 in this manner.

Figure 9:
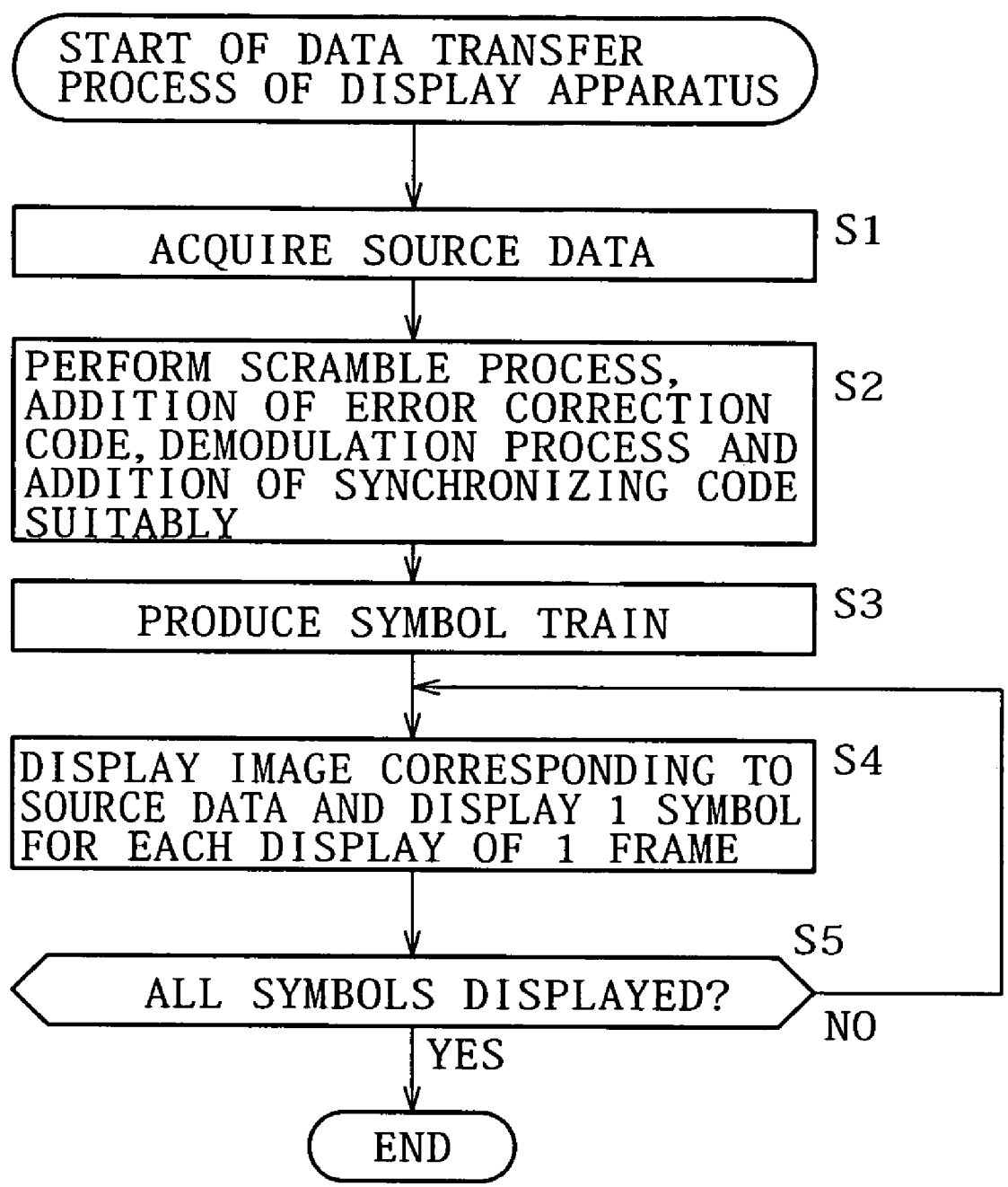
FIG. 9 is a flow chart illustrating a data transfer process of the display apparatus.

Subsequently, a data acquisition process of the information processing terminal 21 executed corresponding to the process of FIG. 9 is described with reference to a flow chart of FIG. 10.

When the end face 24A of the reader/writer 24 is contacted with the display section 11, after one of the synchronizing codes (FIG. 7) displayed at the contacting position is detected, the symbol detection section 103 reads a symbol displayed at the contacting position at step S21.

At step S22, the symbol detection section 103 discriminates whether or not all symbols are read. If the symbol detection section 103 discriminates that all symbols are not read, then the processing returns to step S21 so that a symbol displayed at the contacting position is successively read. Information of the symbol read by the symbol detection section 103 is successively outputted, for example, to the symbol processing section 112.

For example, when the symbol detection section 103 detects a symbol representing that the symbol is the last symbol of a symbol string, it discriminates at step S22 that all symbols representative of data to be transferred are read.

At step S23, the symbol processing section 112 decodes the symbol string and outputs resulting data to the data processing section 113. The data processing section 113 suitably performs a demodulation process, an error correction process, a descrambling process and other necessary processes for the data supplied thereto from the symbol processing section 112 to acquire source data at step S24. Consequently, the source data selected so as to be transferred to the information processing terminal 21 on the display apparatus 1 are acquired by the information processing terminal 21.

At step S25, the control section 114 performs a process corresponding to the source data acquired by the data processing section 113.

Figure 10:
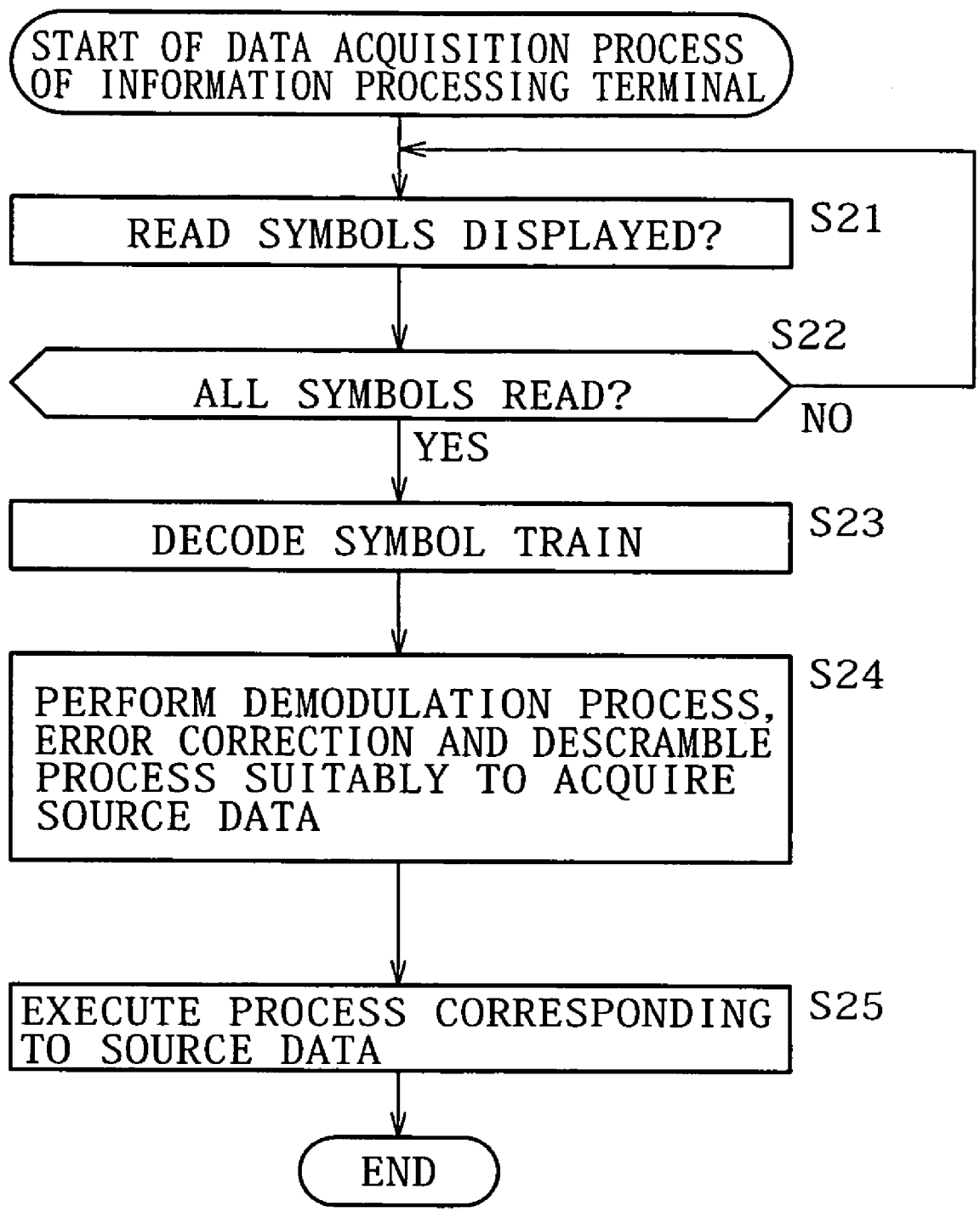
FIG. 10 is a flow chart illustrating a data acquisition process of an information processing terminal executed in a corresponding relationship to the process illustrated in FIG. 9.

For example, if a moving picture 151A and a symbol 152 representative of data of the moving picture 151A are displayed in a window 151 (processing of FIG. 9) as seen in FIG. 11 and the user uses the reader/writer 24 to read the symbol 152, then source data of the moving picture 151A are transferred to the information processing terminal 21 (processing at steps S21 to S24 of FIG. 10). The control section 114 thus controls the display section 22 to display a moving picture at step S25 based on the source data transferred thereto.

Consequently, the user can cause an image same as that displayed in the window 151 to be displayed on the display section 22, and can confirm contents of the moving picture 151A using the information processing terminal 21 even at a place spaced away from the display apparatus 1.

Further, the source data transferred to the information processing terminal 21 are stored into the storage section 118, transmitted to another apparatus through the communication section 115 or recorded onto a recording medium loaded in the drive 116 at step S25.

Further, if a text image 161A acquired, for example, through a network is displayed (processing of FIG. 9) in a window 161 of FIG. 11 and the user causes the reader/writer 24 to read a symbol 162 displayed at the right corner of the window 161, then the text data (source data) are transferred to the information processing terminal 21 (processing at steps S21 to S24 of FIG. 10).

The control section 114 stores the text data transferred thereto into the storage section 118 or controls the display section 22 to display an image (text image) corresponding to the text data at step S25.

A symbol 172 displayed in a window 171 of FIG. 11 is produced from music data as source data and displayed (processing of FIG. 9). Then, when the reader/writer 24 is held in contact with the symbol 172 for a predetermined period of time, that is, for a period of time for which symbols corresponding to the data amount of the music data are displayed, the music data are fetched by the information processing terminal 21 (processing at steps S21 to S24 of FIG. 10). The thus fetched data are, for example, reproduced at step S25 of FIG. 10 and outputted from a speaker not shown of the information processing terminal 21.

It is to be noted that sub data such as information regarding a title or an artist of music which can be fetched into the information processing terminal 21 may be displayed in the window 171.

For example, if music is played in a television program and simultaneously the window 171 and the symbol 172 are displayed at predetermined positions of the display section 11, then the user can fetch the music data into the information processing terminal 21 by reading the displayed symbol 172 by means of the reader/writer 24.

On the other hand, if a URL for accessing a predetermined site is acquired as source data, then a symbol 182 representative of the URL is displayed in a window 181 (processing of FIG. 9). If the reader/writer 24 is contacted with the symbol 182 and the URL is acquired by the control section 114, then the control section 114 controls the communication section 115 to access a site designated by the acquired URL and cause the display section 22 to display a screen of the accessed site at step S25.

Naturally, the screen of the site is displayed in the window 181 together with the symbol 182, and the screen of the site may be confirmed also on the information processing terminal 21 by reading the symbol 182.

Since it is necessary for the user to only use the reader/writer 24 to read a symbol displayed, various kinds of data can be fetched into the information processing terminal 21 by an intuitive and easy operation.

Now, operation of the information processing system when data is transferred from the information processing terminal 21 to the display apparatus 1 conversely to that described hereinabove with reference to FIGS. 9 and 10 is described with reference to flow charts of FIGS. 12 and 13.

First, a process of the information processing terminal 21 for transferring data to the display apparatus 1 is described with reference to the flow chart of FIG. 12.

Figure 12:
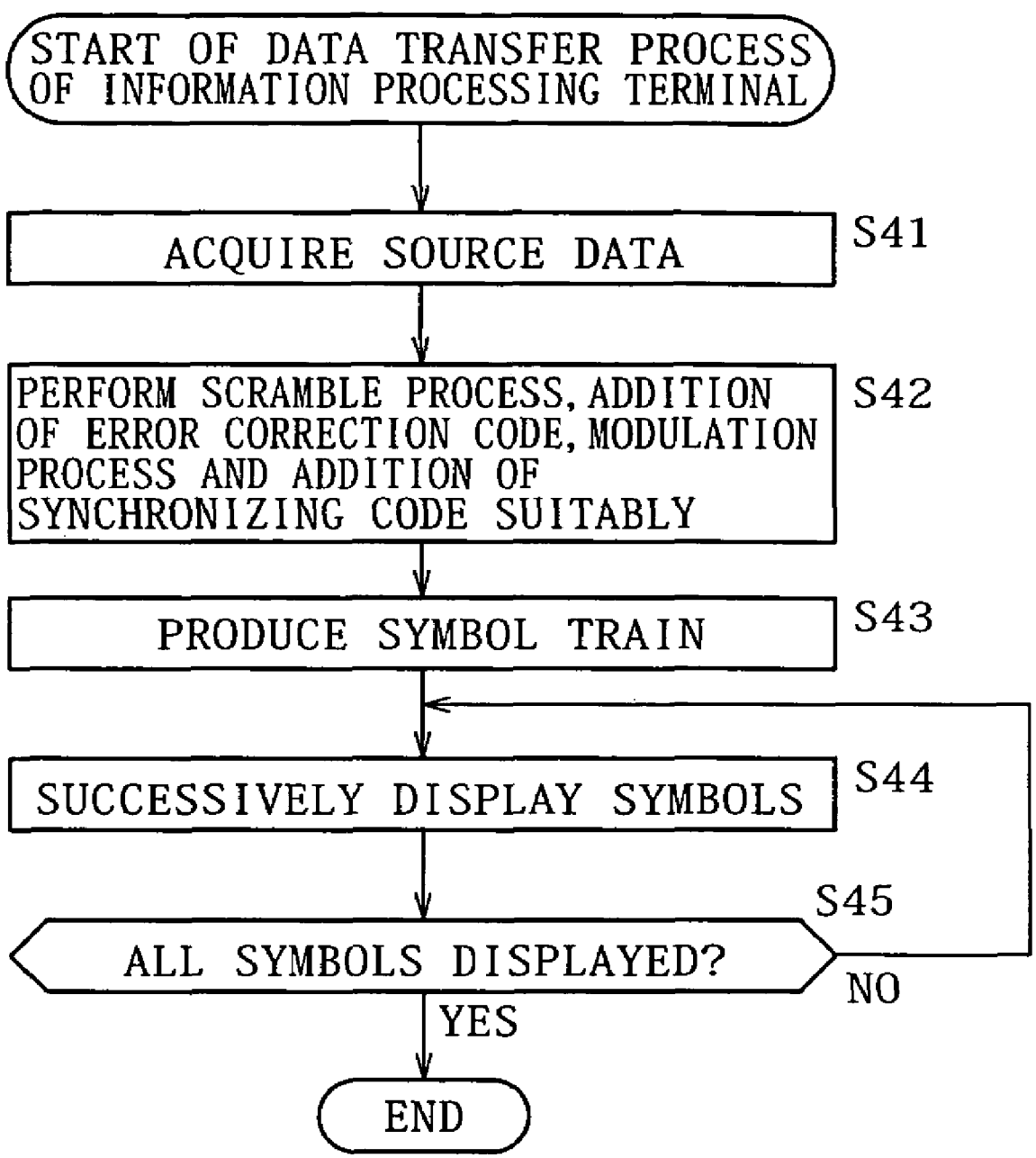
FIG. 12 is a flow chart illustrating a data transfer process of the information processing terminal.

The process illustrated in FIG. 12 is basically similar to the process of the display apparatus 1 described hereinabove with reference to FIG. 9. In particular, first at step S41, the control section 114 acquires source data to be transferred to the display apparatus 1. For example, if an instruction to transfer predetermined data stored in the storage section 118 is issued by an input to the inputting section 117 by the user, then the control section 114 acquires the source data in accordance with the instruction. Or, while image data acquired through a network is displayed on the display section 22, if an instruction to transfer the image data is issued, then the control section 114 acquires the source data in accordance with the instruction.

At step S42, the data processing section 113 suitably performs a scrambling process, addition of an error correction code, a modulation process, addition of a synchronizing code and other necessary processes for the source data supplied thereto from the control section 114 for each predetermined data unit so that the source data can be represented by a symbol string.

At step S43, the symbol processing section 112 refers to, for example, a conversion table prepared in advance to produce a symbol corresponding to the data supplied thereto from the data processing section 113. A symbol string produced in this manner by the symbol processing section 112 is outputted to the image signal production section 111.

At step S44, the image signal production section 111 superposes an image signal for displaying a symbol based on data of the symbol string supplied thereto from the symbol processing section 112 so that the image signal is successively displayed on the symbol display section 104.

The symbol display section 104 successively displays the symbols of the symbol string in a frequency, for example, equal to that of the display section 11 of the display apparatus 1, whereupon light representing the symbols is successively emitted to the outside of the reader/writer 24 through the half mirror 102 and the lens 101.

As hereinafter described, when the end face 24A of the reader/writer 24 is held in contact with a reading region formed on the display section 11, a symbol displayed at step S44 (light representing a symbol emitted from the reader/writer 24) is read through the reading region (step S62 of FIG. 13).

The image signal production section 111 discriminates at step S45 whether or not all of the symbols of the symbol string representative of the data to be transferred are displayed on the symbol display section 104. If it is discriminated that all of the symbols are not displayed, then the processing returns to step S44 to repeat displaying of a symbol. If the image signal production section 111 discriminates at step S45 that all of the symbols are displayed, then it ends the processing.

Now, a data acquisition process of the display apparatus 1 executed in a corresponding relationship to the process of FIG. 12 is described with reference to the flow chart of FIG. 13.

First at step S61, the control section 45 sets a reading region at a predetermined position of the display apparatus 1. In particular, the control section 45 applies a reverse bias voltage to predetermined pixels (TFTs) to form a reading region on the display section 11.

The reading region may be formed normally and fixedly at a predetermined position or may be formed at a position at which a forward bias voltage has been applied till then and a symbol has been displayed.

When the end face 24A of the reader/writer 24 is contacted with the thus formed reading region and is illuminated with light representative of a symbol displayed on the symbol display section 104 of the reader/writer 24, the symbol processing section 52 reads the symbol based on a result of detection by the detection section 53 at step S62.

As described hereinabove, if leak current is detected at any of the pixels which form the reading region, then the symbol processing section 52 discriminates that a white region of the symbol is present in front of the pixel. However, if no leak current is detected, then the symbol processing section 52 discriminates that a black region of the symbol is present in front of the pixel. Thus, the symbol processing section 52 synthesizes results of the detection of the pixels which form the reading region to read one symbol.

The symbol processing section 52 discriminates at step S63 whether or not all symbols are read. If it is discriminated that all symbols are not read, then the processing returns to step S62 to repetitively read a symbol outputted from the reader/writer 24. Information of the symbols successively read by the detection section 53 is successively outputted to the symbol processing section 52.

If the symbol processing section 52 detects a symbol representative of the last end of the symbol string at step S63, then it discriminates that all symbols representative of the data to be transferred are read. Thus, the processing advances to step S64.

At step S64, the symbol processing section 52 refers to a correspondence table between patterns of a two-dimensional code and data to decode the symbol string and outputs resulting data to the data processing section 51.

At step S65, the data processing section 51 suitably performs a demodulation process, an error correction process, a descrambling process and other necessary processes for the data supplied thereto from the symbol processing section 52 to acquire source data. Consequently, the source data selected on the information processing terminal 21 are acquired by the display apparatus 1.

At step S66, the control section 45 performs a process corresponding to the source data acquired by the data processing section 51.

For example, if a moving picture 22A displayed on the display section 22 of the information processing terminal 21 as shown in FIG. 14 is selected as data to be transferred to the display apparatus 1, then a symbol string representative of the moving picture 22A is produced and light representative of symbols of the symbol string is successively emitted from the reader/writer 24 (step S44 of FIG. 12).

Figure 13:
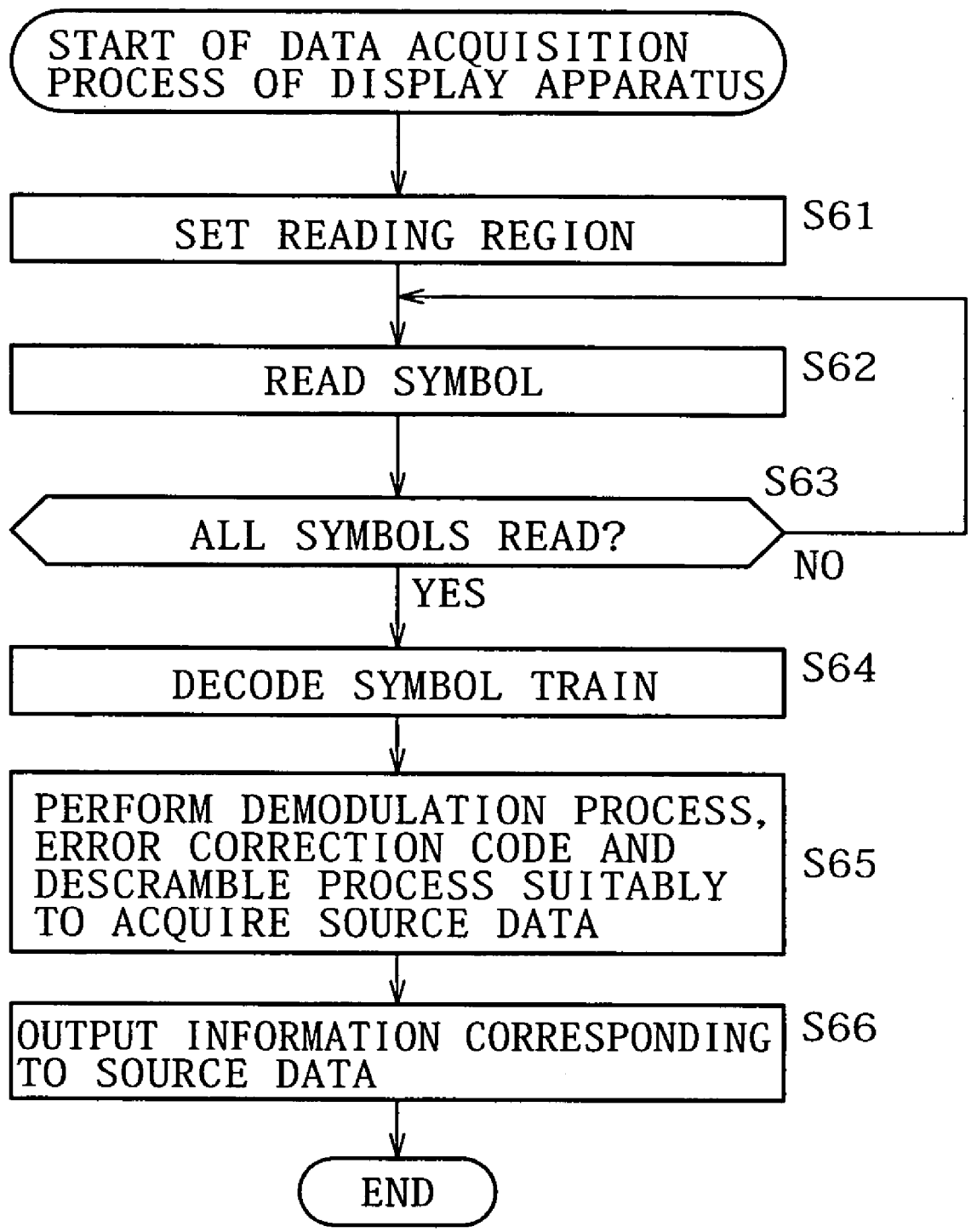
FIG. 13 is a flow chart illustrating a data acquisition process of the display apparatus executed in a corresponding relationship to the process illustrated in FIG. 12.

Then, if the symbol string emitted from the reader/writer 24 is read from a reading region 192 formed at a right lower portion of the display section 11 (step S62 of FIG. 13), then a window 191 is displayed on the display section 11 and a moving picture corresponding to the source data acquired from the read symbol string (that is, the data of the moving picture 22A) is displayed in the window 191 (step S66 of FIG. 13).

In this manner, only if the user designates an image on the information processing terminal 21 and contacts the reader/writer 24 with the reading region 192, then the designated image can be displayed in an enlarged scale on the display section 11. For example, where the information processing terminal 21 is a terminal such as a PDA, since the size of the display section 22 is restricted, it is sometimes difficult to confirm particulars of an image. However, if data are transferred from the information processing terminal 21 to the display apparatus 1 so that an image of the data is displayed in an enlarged scale on the display section 11 in such a manner as described above, then particulars of the image can be confirmed readily.

Similarly, when music data selected on the information processing terminal 21 are transferred to the display apparatus 1, the music data are reproduced by the display apparatus 1 and reproduced sound is outputted from the speaker.

On the other hand, when a URL designated on the information processing terminal 21 is transferred to the display apparatus 1, the display apparatus 1 accesses a site designated by the URL through the communication section 43, and a screen of the accessed site is displayed on the display section 11.

In the foregoing description, it is described that only data are communicated. However, where a symbol string includes an instruction code (instruction information) indicating contents of a process to be performed for the acquired data, an apparatus which reads the symbol string may execute various processes in accordance with the instruction code.

Subsequently, a process of the information processing terminal 21 for displaying a symbol string including an instruction code and transferring data to the display apparatus 1 is described with reference to a flow chart of FIG. 15.

The process illustrated in FIG. 15 is basically similar to the process at steps S41 to S45 of FIG. 12 except that a process of producing an instruction code based on an input from a user and adding the instruction code to source data is performed. Thus, overlapping detailed description of the common processes is omitted herein to avoid redundancy.

In particular, the control section 114 acquires source data at step S81 and then adds an instruction code to the acquired source data at step S82. For example, the control section 114 adds a code indicating a size, a display position, display time and so forth of a window for displaying an image of source data transferred together with an instruction code, another code indicating that a key with which only a transferring person (user) can reproduce transferred source data only on the display apparatus 1 should be set to the source data transferred together with the instruction code or a like code as an instruction code to the acquired source data in accordance with an instruction from the user.

At step S83, the data processing section 113 performs various processes for the source data to which the instruction code has been added. Further, at step S84, the symbol processing section 112 produces a symbol string based on the data obtained through the various processes performed therefor.

Then, the symbols of the symbol string are successively displayed on the symbol display section 104 at step S85. When all of the symbols are displayed, the processing is ended.

Now, a data acquisition process of the display apparatus 1 executed in a corresponding relationship to the process of FIG. 15 is described with reference to a flow chart of FIG. 16.

Processes at steps S101 to S105 are similar to those at steps S61 to S65 of FIG. 13, respectively, and therefore, overlapping description of them is omitted herein to avoid redundancy. In particular, when a symbol string is read from a reading region formed on the display section 11 to acquire source data, the control section 45 of the display apparatus 1 extracts an instruction code from the acquired data at step S106.

At step S107, the control section 45 controls the image signal production section 47 based on the extracted instruction code to control the display of an image corresponding to the source data.

For example, if a code indicating that a window should be displayed at a predetermined position of the display section 11 and an image corresponding to source data should be displayed in the window is extracted as the instruction code, then the control section 45 determines a display position of a window in accordance with the code. Further, if also a code indicating a size of the window is included in the instruction code, then the control section 45 displays a window of the indicated size and displays an image corresponding to source data in the window.

Furthermore, if the control section 45 extracts a code indicating a period for which an image corresponding to source data should be displayed as the instruction code, then it continues to display an image corresponding to source data till a point of time designated by the extracted code.

In this manner, the user can perform setting of a display on the information processing terminal 21 and cause the display apparatus 1 to display an image in accordance with the setting.

Similarly, when the data to be transferred are music data, a code indicating the sound volume when the music data is to be reproduced and/or another code indicating a reproduction mode such as repeat reproduction or shuffle reproduction are included as an instruction code. Thus, the music data is reproduced on the display apparatus 1 in accordance with the instruction code.

Figure 17:
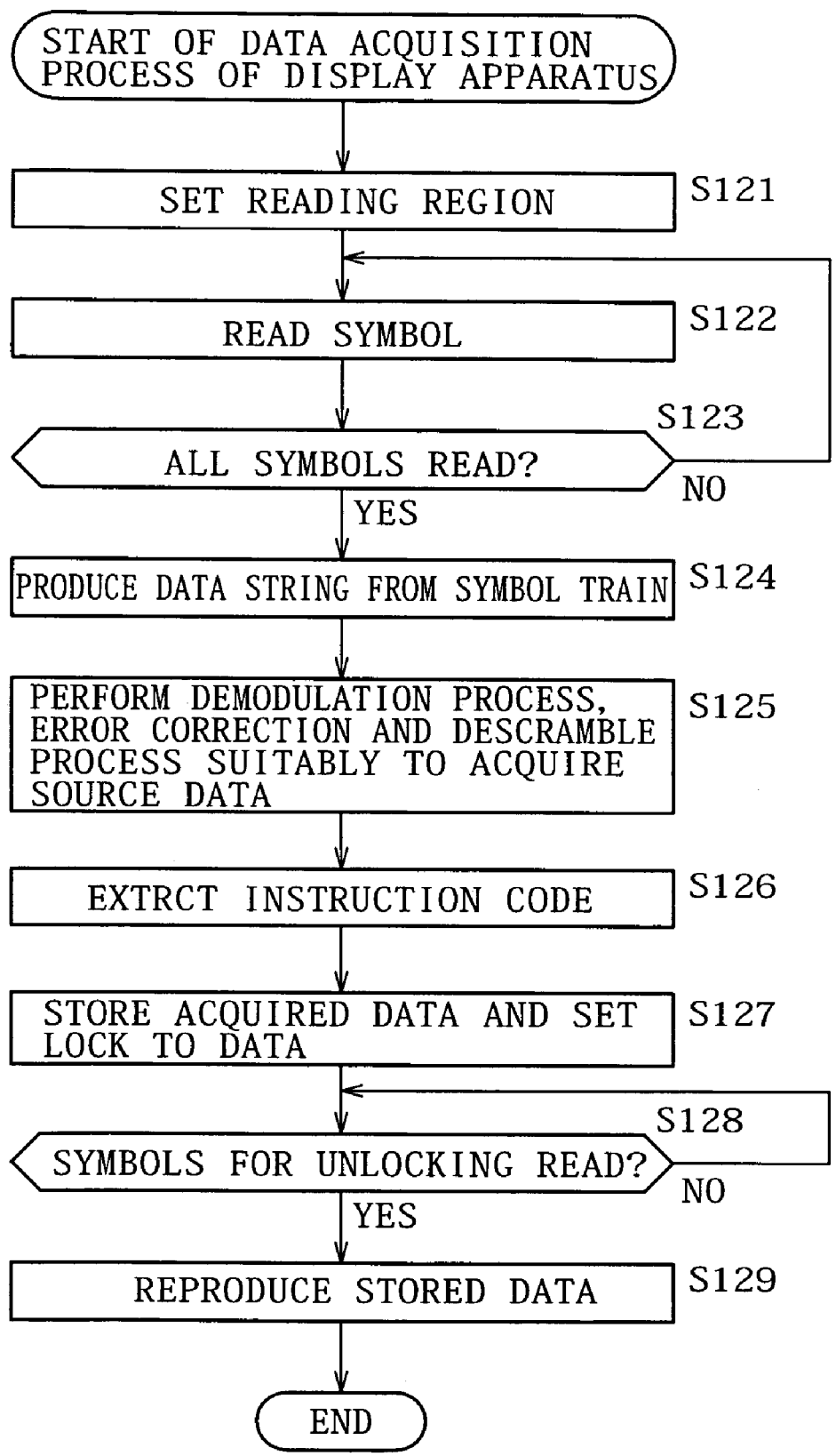
FIG. 17 is a flow chart illustrating another data acquisition process of the display apparatus executed in a corresponding relationship to the process illustrated in FIG. 15.

FIG. 17 is a flow chart illustrating another data acquisition process of the display apparatus 1 executed in a corresponding relationship to the process of FIG. 15.

In the process illustrated in FIG. 17, a code indicating that only a person itself who transfers source data to the display apparatus 1 should be permitted to reproduce the source data on the display apparatus 1 is transferred as an instruction code from the information processing terminal 21 to the display apparatus 1 together with source data.

Figure 16:
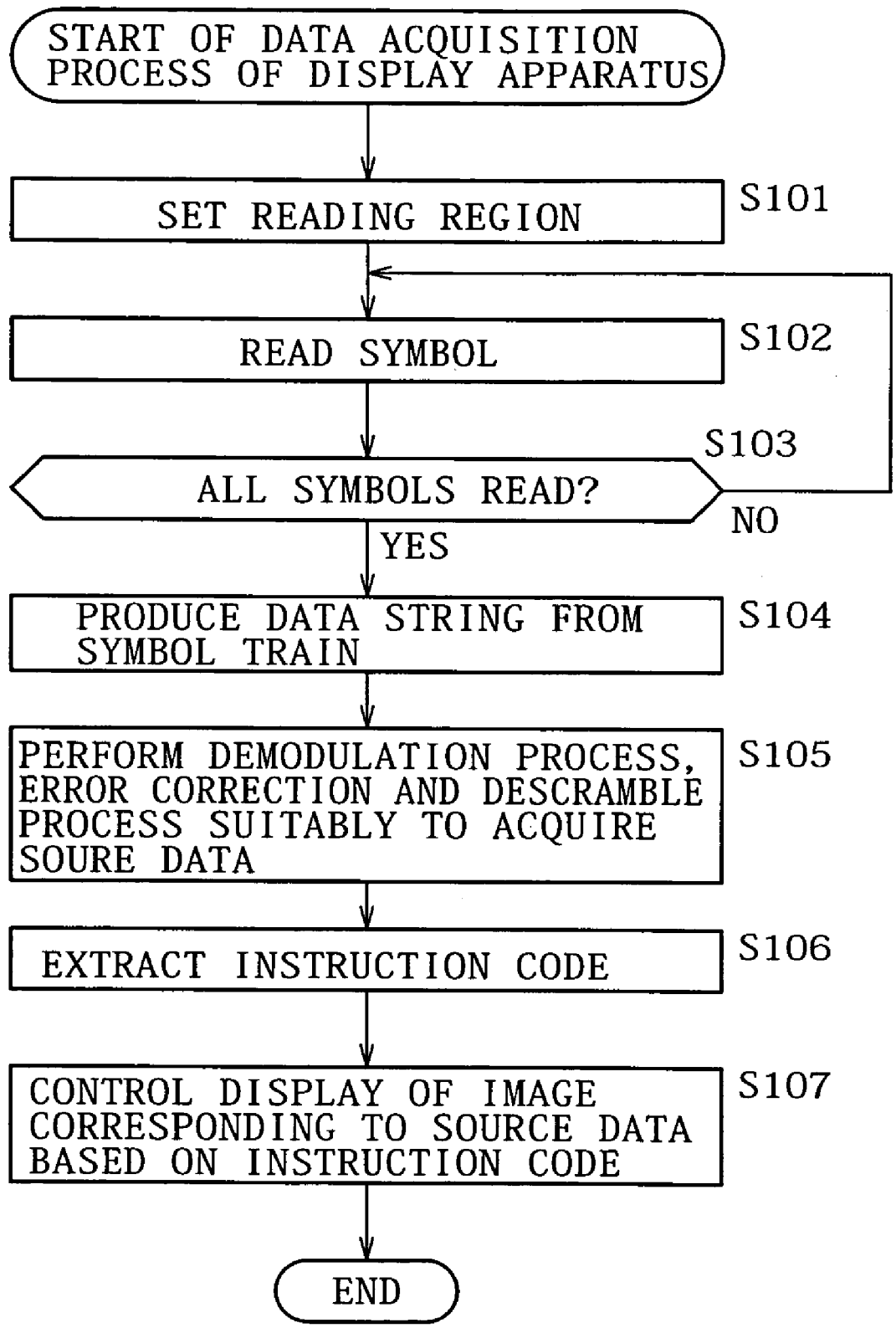
FIG. 16 is a flow chart illustrating a data acquisition process of the display apparatus executed in a corresponding relationship to the process illustrated in FIG. 15.

Processes at steps S121 to S126 are similar to those at steps S101 to S106 of FIG. 16, respectively, and overlapping description of them is omitted herein to avoid redundancy. In particular, when source data are acquired from a symbol string read from a reading region to extract an instruction, the control section 45 of the display apparatus 1 stores the acquired data into the storage section 44 and sets a key to the stored data at step S127.

For example, an instruction code from the information processing terminal 21 includes identification information set as unique information to the information processing terminal 21, and the control section 45 produces a symbol with which the key can be canceled in combination with the identification information and controls the display section 11 to display the symbol. The symbol for decryption which can be produced by combination of the symbol displayed on the display section 11 and the identification information of the information processing terminal 21 is stored in a coordinated relationship with data whose storage is indicated into the storage section 44.

Figure 18:
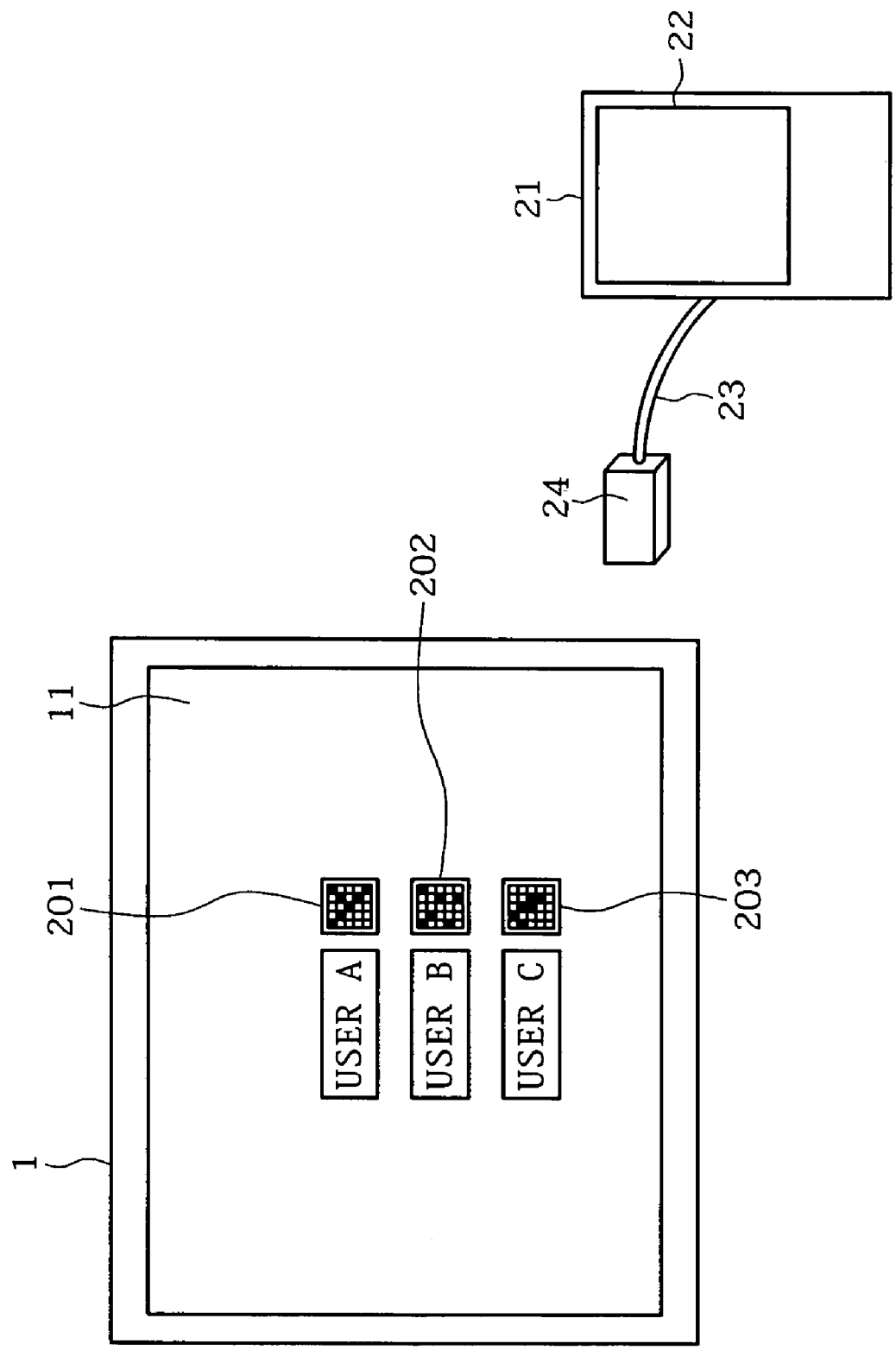
FIG. 18 is a schematic view showing an example of a display when data is transferred from the information processing terminal to the display apparatus.

When a key is set to the data transferred from the information processing terminal 21, such a screen as shown in FIG. 18 is displayed on the display section 11.

For example, if data are transferred from the information processing terminal 21 utilized by a user A and an instruction code indicates that a key should be set to the data, then the control section 45 controls the information processing terminal 21 to display a symbol 201, with which an symbol for decryption can be produced by combining the same with the identification information of the information processing terminal 21, at a position immediately rightwardly of a display of the user name (user A). It is to be noted that the user name is displayed based on information included in the instruction code.

Accordingly, when a user tries to reproduce data transferred to and stored in the display apparatus 1, it uses the reader/writer 24 to read the symbol 201 so that the information processing terminal 21 may produce an symbol for decryption to decrypt the key.

For example, since a reading region is set in a predetermined cycle at a position at which the symbol 201 is displayed (since the polarity of the bias voltage applied to the pixels which display the symbol 201 is changed over in a predetermined cycle), the user would input the symbol for decryption produced by the information processing terminal 21 from the reader/writer 24 so that the stored data is reproduced (outputted).

It is to be noted that displaying of a symbol and formation of a reading region may not be changed over periodically, but, for example, a reading region may normally set in the proximity of the symbol 201 of FIG. 18.

Referring back to FIG. 17, at step S128, the control section 45 discriminates whether or not the symbol for decryption is read through the reading region based on an output of the data processing section 51. The control section 45 thus waits until it is discriminated that the symbol for decryption is read. Then, when the symbol for decryption produced on the information processing terminal 21 is inputted to the reading region in such a manner as described above, data representative of the symbol for decryption detected by the detection section 53 are supplied to the control section 45 through the symbol processing section 52 and the data processing section 51.

When the control section 45 discriminates at step S128 that the symbol for decryption is supplied thereto, the processing advances to step S129, at which the control section 45 reads out the data stored in a coordinated relationship with the symbol for decryption supplied thereto from the storage section 44 and reproduces the data. For example, if the data stored in the storage section 44 are image data, then a corresponding image is displayed on the display section 11, but if the stored data are music data, then the music data are reproduced.

Since stored data can be reproduced using the reader/writer 24 to read a symbol in the proximity of a display of the name of the user itself and inputting an symbol for decryption produced in response to the displayed symbol to the display apparatus 1, the user can store data and issue an instruction to reproduce the data through intuitive operations.

It is to be noted that, in the example of FIG. 18, it can be seen that a key is set also to data transferred from another terminal used by another user B and data transferred from a further terminal used by a further user C.

Even if the user A uses the reader/writer 24 of the information processing terminal 21 to read a symbol 202, with which an symbol for decryption can be produced in combination with identification information of the terminal used by the user B, since identification information of the terminal of the user B is not prepared in the information processing terminal 21, the user A cannot reproduced the data stored and set key by the user B.

Accordingly, data stored by any user can be prevented from being utilized by a third party. It is to be noted that, while it is described in the foregoing description that an symbol for decryption is produced based on identification information of a terminal and a symbol displayed and can be used to decrypt data, the algorithm for setting and canceling a key can be modified suitably.

Subsequently, a further data acquisition process of the display apparatus 1 executed in a corresponding relationship to the process of FIG. 15 is described with reference to a flow chart of FIG. 19.

Figure 19:
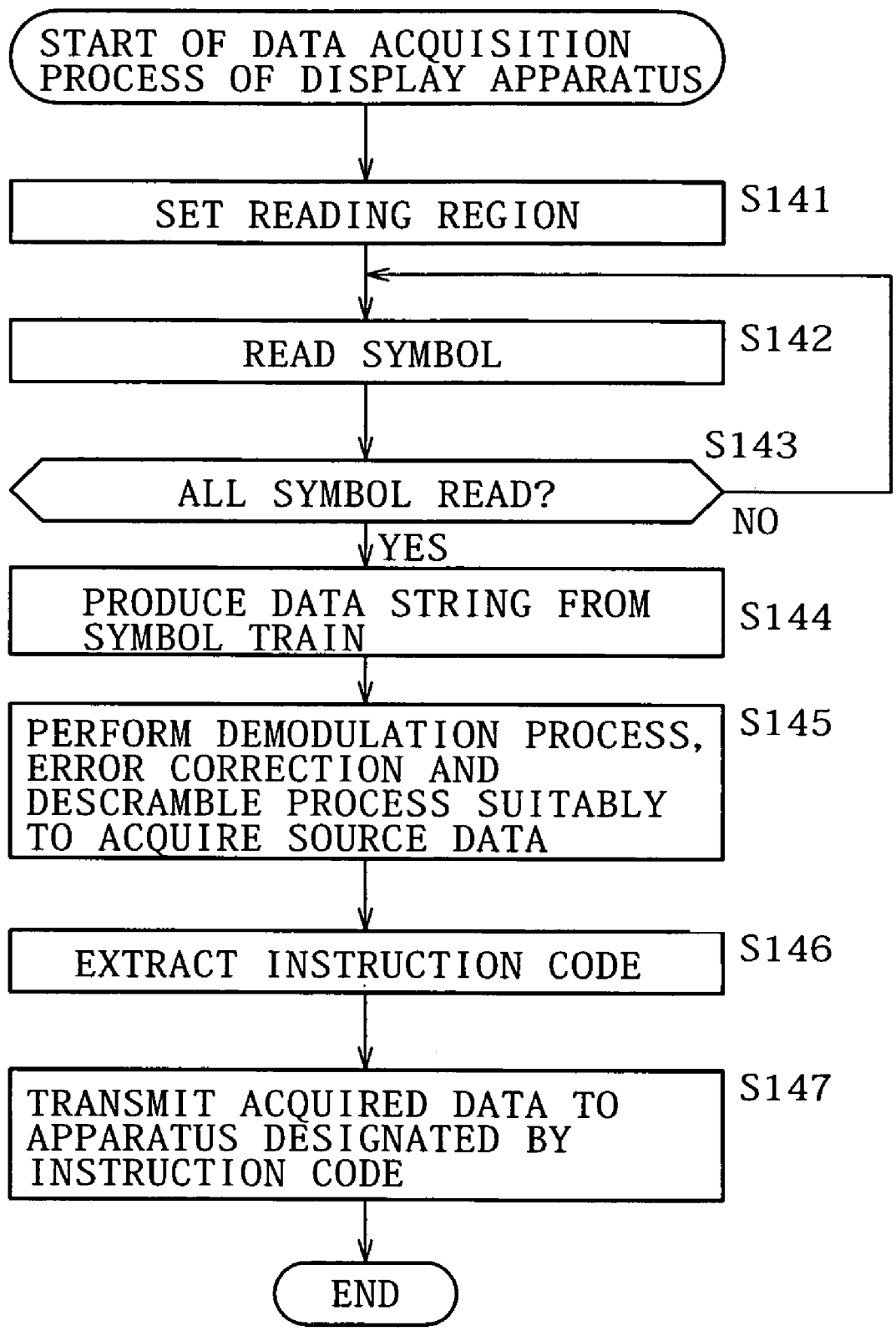
FIG. 19 is a flow chart illustrating a further data acquisition process of the display apparatus executed in a corresponding relationship to the process of FIG. 15.

In the data acquisition process of FIG. 19, a code indicating that data should be transmitted to a designated apparatus is transferred as an instruction code from the information processing terminal 21 to the display apparatus 1. For example, an address or like information which designates an apparatus is included in an instruction code, and the instruction code is transferred together with data to be transmitted to the apparatus designated by the address.

Processes at steps S141 to S146 are similar to those at steps S101 to S106 of FIG. 16, respectively, and overlapping description of them is omitted herein to avoid redundancy. In particular, when source data are acquired from a symbol string read from a reading region to extract an instruction, the control section 45 of the display apparatus 1 transmits the acquired data to an apparatus designated by the instruction code at step S147.

For example, if an address of an apparatus connected through a network is inputted to the information processing terminal 21 and included in an instruction code, then the control section 45 controls the communication section 43 to transmit the data transferred thereto from the information processing terminal 21 to the apparatus designated by the address.

Consequently, even where the information processing terminal 21 does not include the communication section 115, only if the user designates an apparatus of a transmission designation on the information processing terminal 21 and contacts the reader/writer 24 with the display section 11, then data can be can transmitted to the different apparatus.

In the foregoing description, it is described that information for controlling display of an image, information indicating that a key should be set to data to be transmitted or information indicating a transmission destination of data may be included in an instruction code. However, various other kinds of information may be included in an instruction code.

For example, information representative of an attribute of data may be transferred together with data, and an apparatus which acquires the instruction code may perform a process corresponding to the instruction code. Where priorities of different data are included as information representative of attributes of the data, the order in which the data are displayed may be controlled in accordance with the priorities of the data or the display sizes of the individual data may be controlled. Where taste information of a user (viewing history information) is included as information representative of attributes of individual data, the order of the data to be displayed or the display positions of the data may be controlled in accordance with the taste of the user.

In the foregoing description, a reading region is formed fixedly at a predetermined position of the display section 11 or is formed periodically at a position at which a symbol is displayed. However, the reading region may otherwise be moved in accordance with scanning of the display section 11.

For example, where screen scanning of the display section 11 is performed in a cycle of 1/60 second beginning with the left upper end of the screen of the display section 11 as indicated by broken line arrow marks in FIG. 20, a reading region 211 may be moved by changing over those pixels to which a reverse voltage is applied in accordance with the scanning. Consequently, whether or not the reader/writer 24 is contacted with the display section 11 is detected by scanning in a cycle of 1/60 second.

It is to be noted that, when a window 212 is displayed already on the display section 11, one pixel (a pixel in the window 212) cannot function both as a pixel for displaying an image and as a pixel for a reading region. Therefore, scanning by the reading region 211 is performed in a region of the display section 11 other than the region in which the window 212 is displayed.

Figure 21:
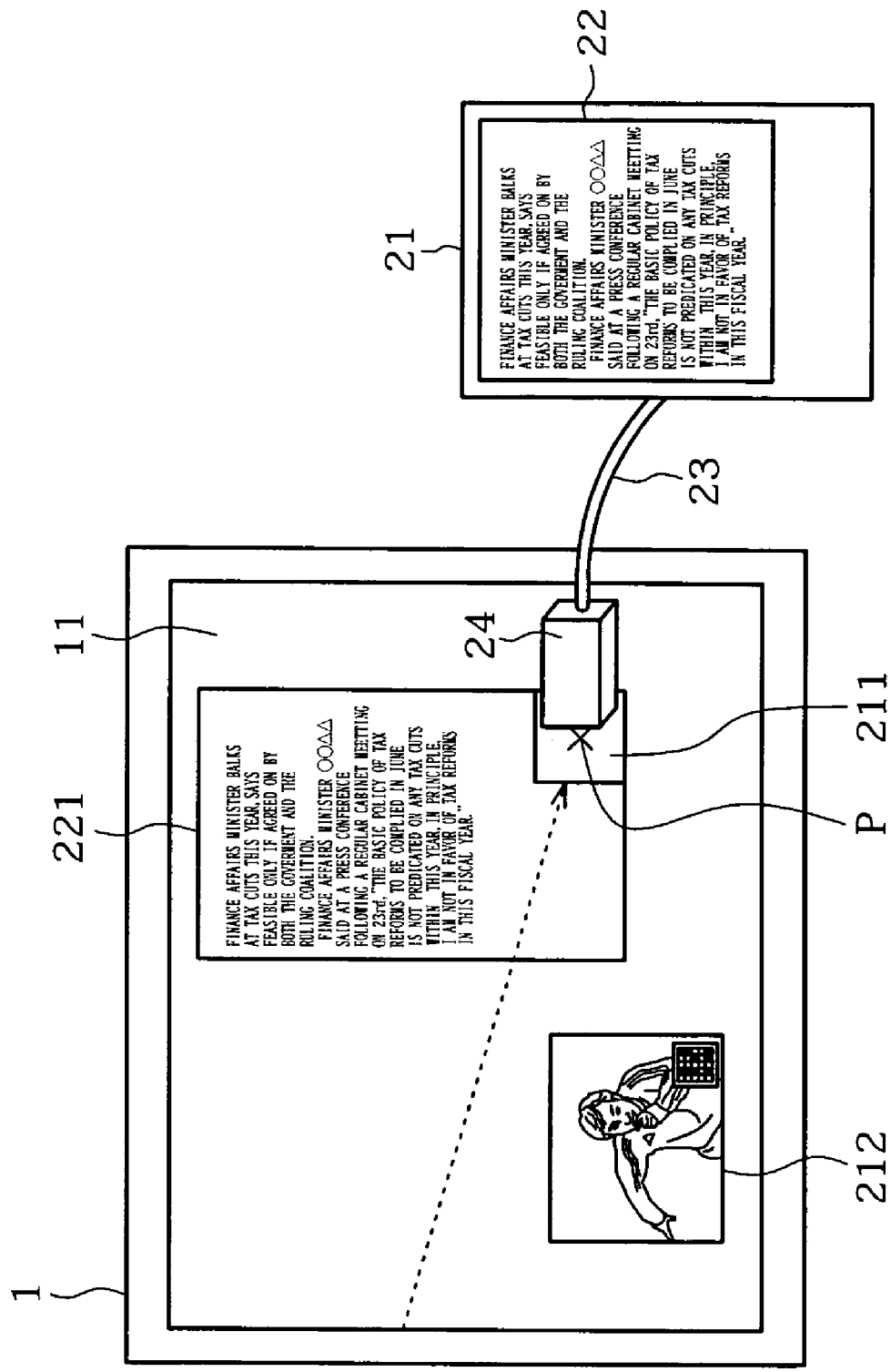
FIG. 21 is a schematic view showing an example of a display when data is transferred to the reading region shown in FIG. 20.

For example, if a position P of the display section 11 shown in FIG. 21 is scanned by the reading region 211 while the user contacts the reader/writer 24 with the position P, then a symbol outputted from the reader/writer 24 is read through the reading region 211 and data selected by the information processing terminal 21 are transferred to the display apparatus 1.

When the data are transferred to the display apparatus 1, a window 221 is displayed such that, for example, the reading region 211 is positioned at the right corner, and an image corresponding to the fetched data is displayed in the window 221.

In this manner, periodically scanning to discriminate whether or not the reader/writer 24 is contacted with the surface of the display section 11 (whether or not transfer of data is performed) is performed, and a window is displayed with reference to the contacted position. Therefore, the user can transfer data to the display apparatus 1 by contacting the reader/writer 24 with an arbitrary position of the display section 11 such as a position to which the reader/writer 24 can be moved readily or a position at which the user wants to display a window only if the position is within a region of the display section 11 in which an image is not displayed.

Figure 22:
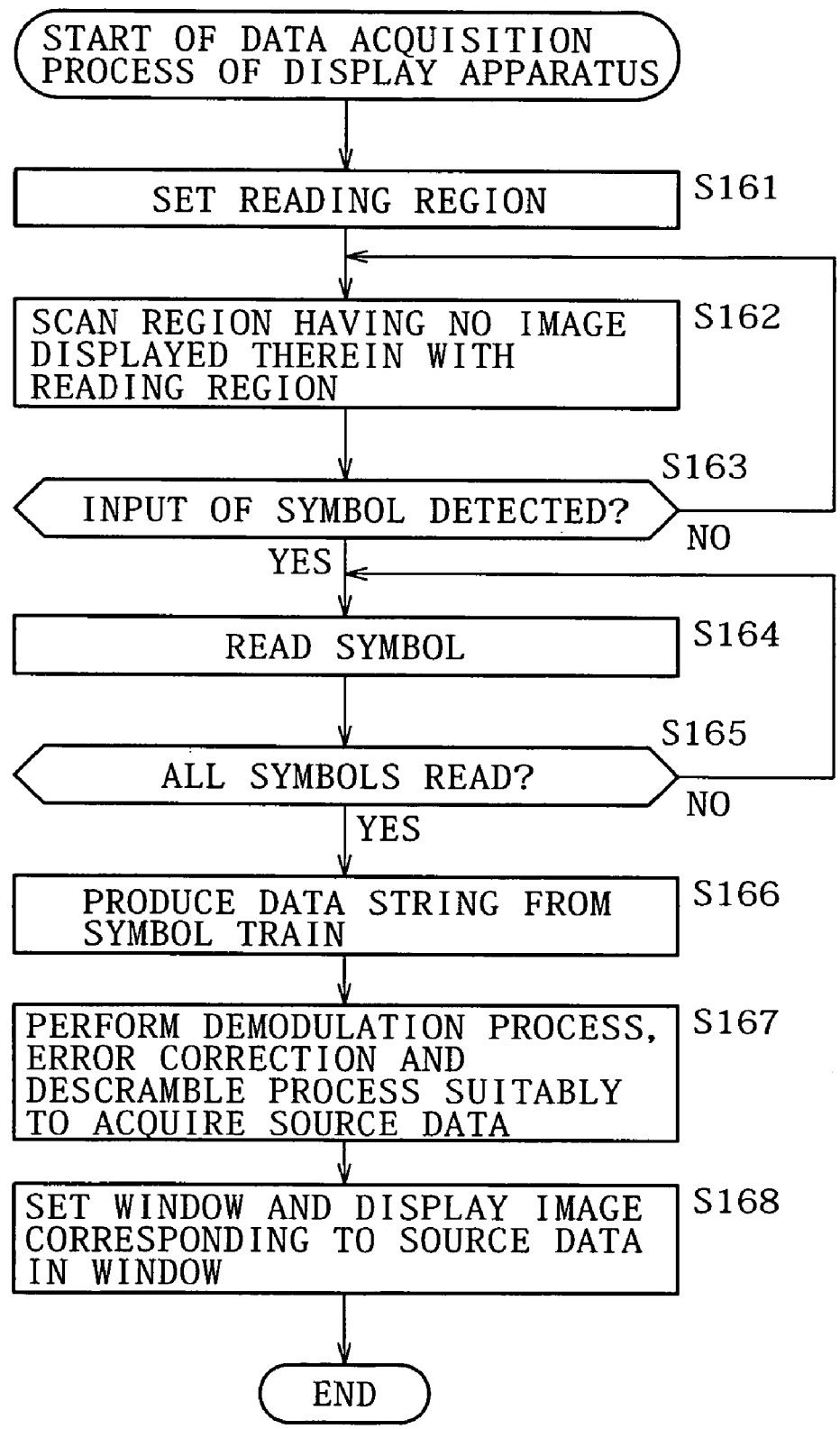
FIG. 22 is a flow chart illustrating a data acquisition process of the display apparatus shown in FIG. 20.

Subsequently, a process of the display apparatus 1 when scanning of a reading region is performed to detect whether or not there is an input from the reader/writer 24 and then acquires data from the information processing terminal 21 when the reader/writer 24 is contacted with the display apparatus 1 as seen in FIGS. 20 and 21 is described with reference to a flow chart of FIG. 22.

At step S161, the control section 45 applies a reverse bias voltage to predetermined pixels to set a reading region. Then at step S162, the control section 45 scans a region in which an image is not displayed with the thus set reading region.

At step S163, the control section 45 discriminates whether or not the reader/writer 24 is contacted with the surface of the display section 11 and an input of a symbol is detected in the reading region. If it is discriminated that an input of a symbol is not detected, then the processing returns to step S162 to repeat the scanning.

On the other hand, if it is discriminated at step S163 that generation of leak current is detected in the reading region and therefore a symbol is inputted, then the control section 45 stops the movement of the reading region. Then, the processing advances to step S164, at which the control section 45 reads the symbol.

Than at steps S164 to S167, a reading process of the symbol similar to the process described hereinabove is executed to acquire source data. When source data are acquired, the control section 45 controls the display apparatus 1 to display a window with reference to the position at which the reader/writer 24 contacts and display an image corresponding to data transferred thereto in the window.

Through the processing described above, the user can transfer data readily to a preferred position of the display apparatus 1 without contacting the reader/writer 24 with the reading region set fixedly at a predetermined position.

It is to be noted that, in the example shown in FIGS. 20 and 21, a reading region is formed and moved within a comparatively wide range for the convenience of illustration. However, the scanning may be performed successively with a reading region which includes a single pixel.

In this instance, when an input of a symbol is detected at one pixel at which scanning is performed, a reading region is set in an enlarged scale over a predetermined range around the detected position, that is, the polarity of pixels around the detected position is changed over. Then, a symbol emitted from the reader/writer 24 is read from the thus set reading region.

Since the smallest number of pixels necessitated for detection of presence or absence of an input from a user is 1, an image can be displayed using all of the other pixels than the one pixel. Accordingly, even when an input from a user is successively scanned, a maximized wide region can be assured as a displaying region.

In the foregoing description, the reader/writer 24 which performs only reading and writing of a symbol is connected to the information processing terminal 21 through the cable 23. However, where the display section 22 is formed from a display device wherein a TFT is disposed for each pixel similarly as in the display section 11 and can be driven not to drive an image but also as a sensor (reading region) capable of detecting light from the outside by controlling the polarity of each of the TFTs, the reader/writer 24 need not necessarily be provided for the information processing terminal 21.

Figure 23:
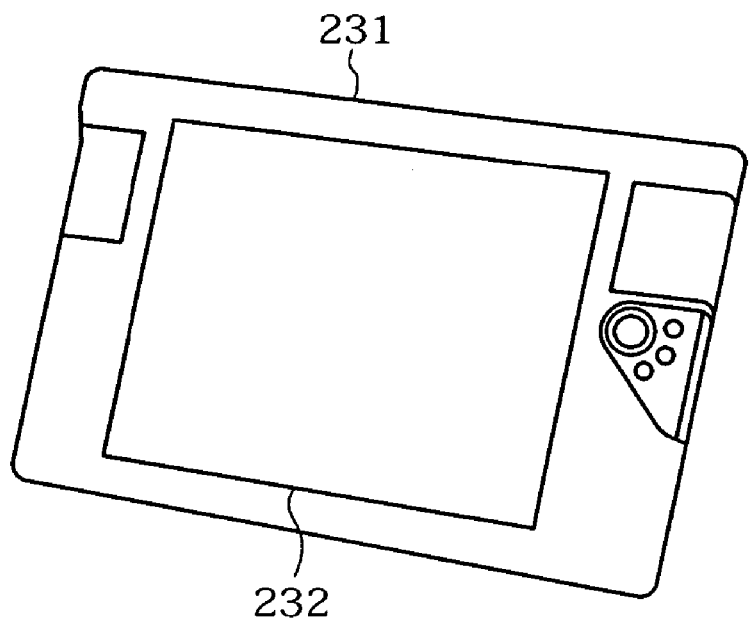
FIG. 23 is a schematic view showing an example of a configuration of an appearance of the information processing terminal.

FIG. 23 shows an appearance of an information processing terminal 231 which includes a display device wherein a TFT is disposed for each pixel similarly to the display section 11 of the display apparatus 1. Also where a reader/writer is not provided in this manner, by contacting or positioning a display section 232 of the information processing terminal 231 with or in the proximity of the display section 11 of the display apparatus 1, communication of data can be executed between the display apparatus 1 and the information processing terminal 231 in such a manner as described hereinabove.

In particular, the user can transfer data from the information processing terminal 231 to the display apparatus 1 by operating the display apparatus 1 to allow a reading region formed on the display section 11 to read a symbol displayed on the display section 232 of the information processing terminal 231.

On the other hand, where a reading region of the display section 232 is formed conversely such that a reverse bias voltage is applied so that it acts as a sensor for detecting light from the outside, the user can transfer data from the display apparatus 1 to the information processing terminal 231 by operating the information processing terminal 231 to allow the reading region of the display section 232 thereof to read a symbol displayed on the display section 11 of the display apparatus 1.

Accordingly, the information processing terminal 231 is formed as a terminal of a size with which the position or the direction thereof can be changed readily by its user.

Figure 24:
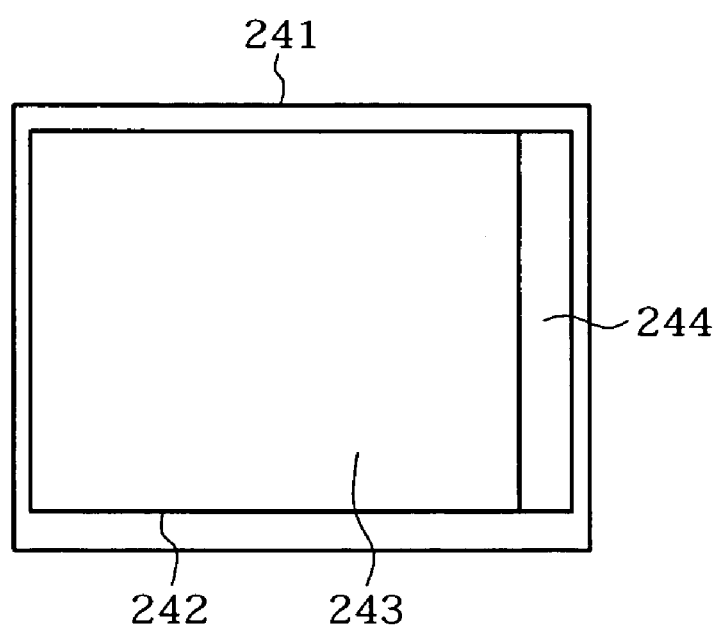
FIG. 24 is a schematic view showing an example of a configuration of an appearance of the display apparatus.

In the foregoing description, the display section 11 of the display apparatus 1 is an EL display section or an LCD section wherein a TFT is disposed for each pixel. However, it may otherwise be formed as such a hybrid display section as shown in FIG. 24. Referring to FIG. 24, a display apparatus 241 shown has a display section 242 which has a region 243 formed as a PDP (Plasma Display Panel) and another region 244 formed as an LCD section wherein a TFT is disposed for each pixel.

When the display apparatus 241 is used to display only an image but not to perform detection of a symbol inputted from the outside, an image is displayed in the region 243 formed from a PDP and the region 244 formed from an LCD section, that is, on the entire display section 242. On the other hand, when it is necessary to form a reading region for detecting a symbol inputted from the outside, a reverse bias voltage is applied to pixels in a predetermined region of the region 244 to form a reading region.

Consequently, when compared with an alternative arrangement wherein the entire display section 242 is formed from an EL display section or an LCD section wherein a TFT is disposed for each pixel, the size of the screen of a display apparatus which can transmit and receive various kinds of data in such a manner as described above can be increased readily.

Alternatively, the display apparatus may be configured such that an image is displayed only in the region 243 formed from a PDP while an array of photo-sensors for detecting light from the outside is normally disposed in the overall region 244. In this instance, naturally no image is displayed in the region 244.

Figure 25:
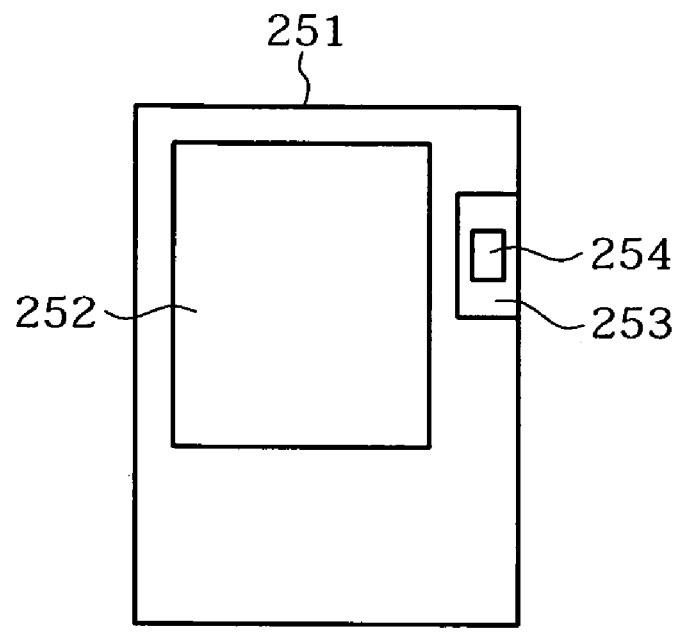
FIG. 25 is a schematic view showing another example of a configuration of an appearance of the information processing terminal.

Further, photo-sensors may be provided at a predetermined position of a display apparatus such as, for example, an edge portion (where a display section is not formed) or a side face such that a symbol may be detected there. Or, a small size TFT display section which is an EL display section or an LCD section wherein a TFT is disposed for each pixel for reading or writing a symbol may be provided such that display and detection of a symbol may be performed there.

Where a small side TFT display section for reading and writing a symbol is provided on an information processing terminal, the information processing terminal may have such an appearance configuration as shown, for example, in FIG. 25.

Referring to FIG. 25, the information processing terminal 251 shown includes a display section 252 provided on the front of a housing. A reader/writer section 253 is disposed at a position on the housing immediately rightwardly of the display section 252 such that it can be turned around an axis extending in a vertical direction in FIG. 25. A TFT display unit 254 is provided on the reader/writer section 253.

For example, in order to transfer data to an external apparatus through a symbol, symbols are successively displayed on the TFT display unit 254, and light corresponding to the symbols is successively illuminated to the outside. On the other hand, in order to detect a symbol displayed on an external apparatus, a reverse bias voltage is applied to the pixels of the TFT display unit 254 so that they are driven as photo-sensors.

Where the reader/writer section 253 is mounted for turning motion with respect to the housing of the information processing terminal 251 in this manner, since the display section 252 and the TFT display unit 254 can be positioned so that the front faces thereof may be directed in different directions, the user can select data to be transferred while confirming the display of the display section 252 and transfer the data through a display of the TFT display unit 254 directed in the opposite direction to the display section 252.

Figure 26:
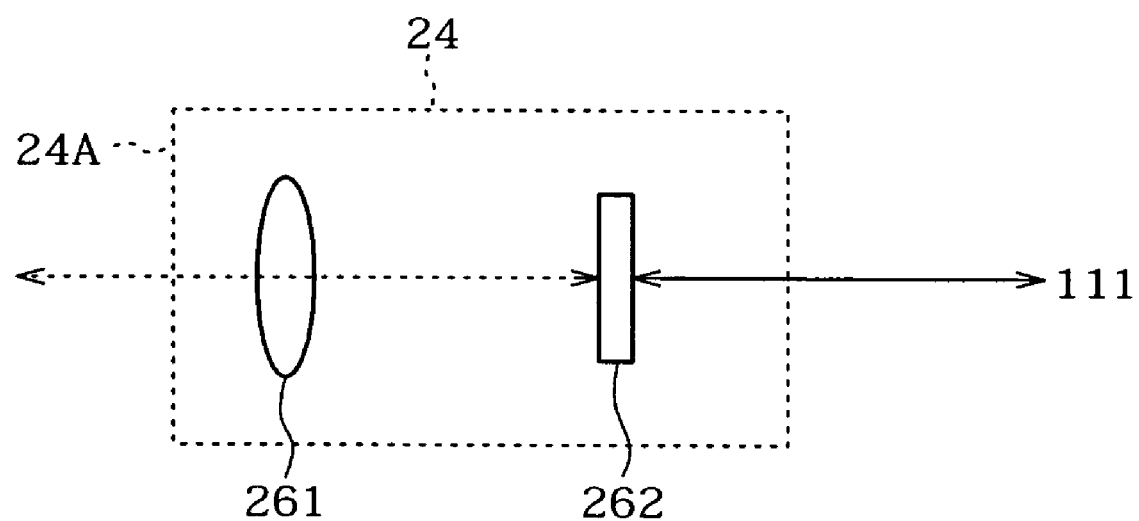
FIG. 26 is a schematic view showing another example of a configuration of the reader/writer shown in FIG. 1.

Also it is possible to dispose a small size TFT display unit 262 in the inside of the reader/writer 24 of FIG. 1 as shown in FIG. 26 such that display and detection of a symbol may be performed by the TFT display unit 262.

In the foregoing description, it is described that, even with an LCD section wherein a TFT is disposed for each pixel, the TFTs can be driven as sensors capable of detecting light from the outside by applying a reverse bias voltage to the TFTs. However, if there is the possibility that backlight may cause a detection error upon detection or if a symbol illuminated from the outside cannot be detected, then the backlight output may be turned off only when light from the outside is to be detected.

In this instance, even where the LCD section includes a TFT disposed for each pixel, the TFTs can be driven as sensors capable of detecting light from the outside without being influenced by the backlight, and the LCD section can transmit and receive various kinds of data through a symbol.

The transmission and reception of data performed in such a manner as described above can be executed by various information processing apparatus which include a display section such as, for example, a personal computer, a portable telephone set, a PDA, a television receiver, a music reproducer, a digital camera and a video camera.

Here, a changeover action between display of an image and detection of an input from the outside is described more particularly.

Figure 27:
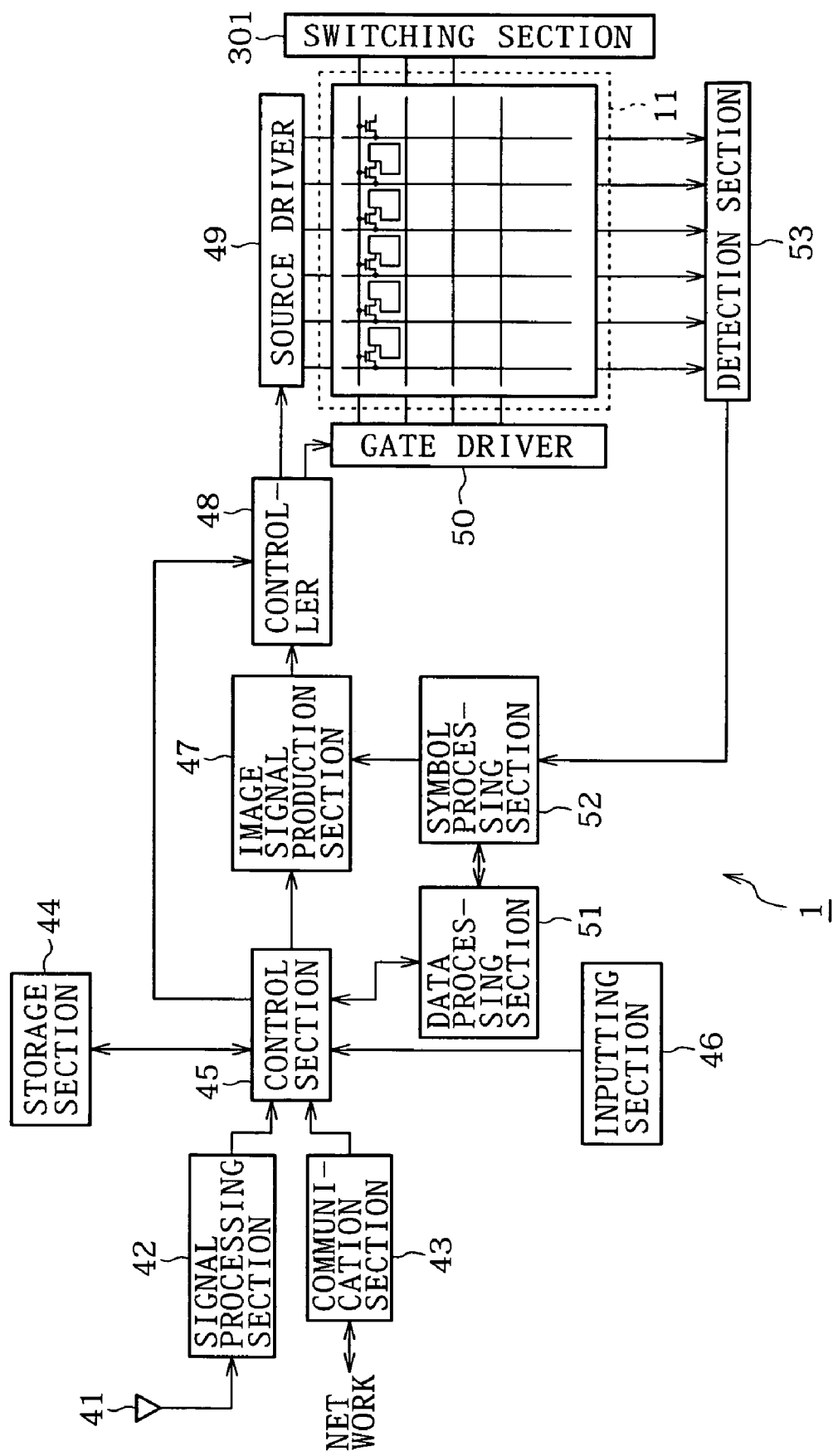
FIG. 27 is a block diagram showing another example of a configuration of the display apparatus.

FIG. 27 is a block diagram showing another example of a configuration of the display apparatus 1. Referring to FIG. 27, the display apparatus 1 shown includes several common components to those of FIG. 3, and overlapping description of such common components is omitted herein to avoid redundancy.

Figure 29:
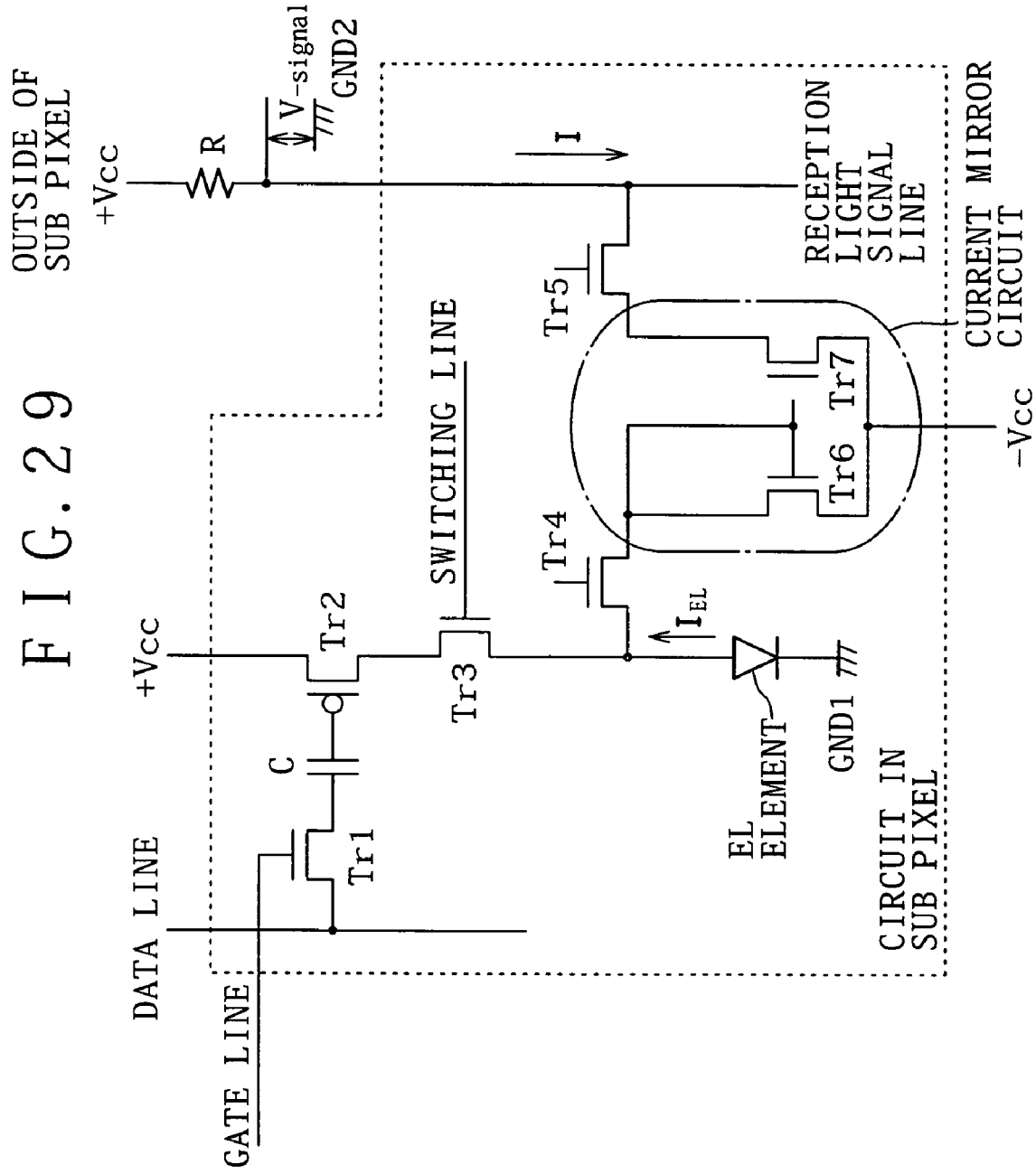
FIG. 29 is a circuit diagram showing an example of a circuit disposed for a sub pixel which forms the display section of FIG. 27.

A switching section 301 changes over a switch (TFT) provided for each pixel between on and off under the control of the controller 48 to drive the pixel as a pixel for displaying an image or a pixel for detecting an input from the outside. In particular, in the display apparatus 1 of the configuration shown in FIG. 3, changeover of whether each pixel is driven as a pixel for displaying an image or as a pixel for detecting an input from the outside is performed by changeover of the direction of the voltage to be applied to the gate electrode of the TFT of the pixel. In the display apparatus 1 of the configuration shown in FIG. 27, however, such changeover is performed by changeover of the switch by the switching section 301. The direction of the voltage to be applied to the EL element provided for each pixel is changed over in an interlocking relationship with the switch of the pixel by the switching section 301 (FIG. 29).

In the following description, a pixel including a set of pixels for R, G and B is referred to as "pixel", and each of the pixels for R, G, and B, which form one pixel, is referred to as "sub pixel".

Figure 28:
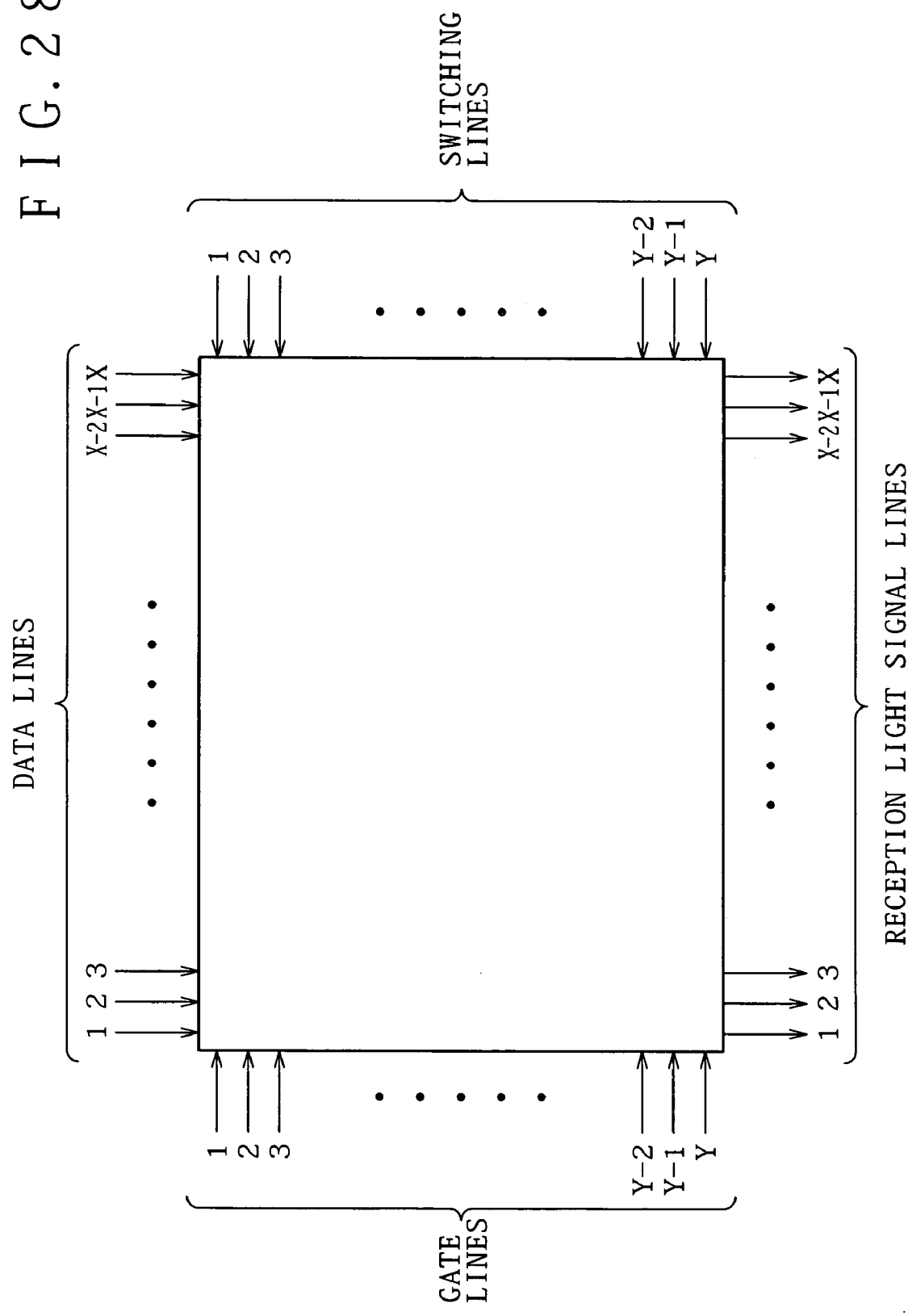
FIG. 28 is a schematic view showing an example of signal lines connected to a display section shown in FIG. 27.

FIG. 28 shows an example of signal lines connected to the display section 11 of FIG. 27. Here, X data lines and X reception light signal lines individually numbered as 1 to X from the left in FIG. 28 are disposed while Y gate lines and Y switching lines individually numbered as 1 to Y from the top in FIG. 28 are disposed. Where the display section 11 has, for example, the XGA (extended Graphics Array) size, the value of X is 1024×3 (RGB) and the value of Y is 768.

The source driver 49 of FIG. 27 supplies a signal corresponding to an image to be displayed to each sub pixel through a data line (source line), and the gate driver 50 controls on/off of the TFTs of pixels of each row through a gate line. The detection section 53 detects reception light signals representative of leak current generated in sub pixels, which are driven as sub pixels for detecting an input from the outside through the reception light signal lines. The switching section 301 switchably drives each sub pixel as a sub pixel for displaying an image or as a sub pixel for detecting an input from the outside through a switching line.

It is to be noted that, where not all of three sub pixels, which form a pixel, can detect an input from the outside but only one of the three sub pixels such as, for example, a sub pixel for red (R) can detect an input from the outside, the number of reception light signal lines is reduced to X because one reception light signal line is provided for each pixel. Since the sub pixels for R, G, and B have different light reception characteristics from one another, the display section 11 may be configured such that only those sub pixels, which use an EL element having a good light reception characteristic, are driven not only as sub pixels for displaying an image but also as sub pixels for detecting an input from the outside.

FIG. 29 shows an example of a circuit (circuit surrounded by a broken line framework) formed as a sub pixel, which can be driven not only as a sub pixel for displaying an image but also as a sub pixel for detecting an input from the outside. In the following description, driving of a sub pixel for displaying an image is suitably referred to as light emission driving or driving for light emission whereas driving of a sub pixel for detecting an input from the outside is suitably referred to as light reception driving or driving for light reception.

When the sub pixel shown in FIG. 29 is to be driven for light emission, a transistor Tr3 is switched on (into a connecting state) through a pertaining switching line by the switching section 301 so that current based on a signal from a data line may be supplied to the EL element. Further, transistors Tr4 and Tr5 are switched off (into a disconnecting state) in response to the operation of the transistor Tr3. It is to be noted that a switching line (not shown) for controlling on/off of the transistors Tr4 and Tr5 from the switching section 301 is connected to the transistors Tr4 and Tr5.

If a pertaining gate line is placed into an active state (a voltage is applied to the gate terminal of a transistor Tr1) while the transistor Tr3 is on, the transistor Tr1 is switched on, and charge supplied through a pertaining data line charges a capacitor C. Then, a transistor Tr2 is opened in response to a potential difference generated across the capacitor C as the capacitor C is charged, and consequently, current (based on a power supply voltage+Vcc) flows through the transistor Tr2. Thereupon, the transistor Tr3 is turned on. Since the cathode of the EL element is grounded to the ground GND1, current produced by the transistor Tr2 is supplied to the anode of the EL element thereby to cause the EL element to emit light.

On the other hand, when the sub pixel of FIG. 29 is to be driven for light reception, the transistor Tr3 is turned off through the switching line by the switching section 301, and in response to the turning off of the transistor Tr3, the transistors Tr4 and Tr5 are turned on. If light is inputted to the EL element while the transistor Tr3 is off, then a high potential is applied to the cathode of the EL element from the ground GND1 and a low potential is applied to the anode of the EL element from another power supply −Vcc. Consequently, leak current $I_{EL}$ is generated in the EL element in accordance with the amount of incoming light as described above. The leak current $I_{EL}$ is supplied to the source terminal of a transistor Tr6 and the gate terminals of the transistors Tr6 and Tr7 through the transistor Tr4. At this time, since a current mirror circuit is formed from the transistors Tr6 and Tr7, current I (current I supplied from the outside of the sub pixel) of an amount, which increases in proportion to the current inputted to the source terminal of the transistor Tr6, is supplied to the transistor Tr7 through the transistor Tr5. Thereupon, a potential difference $V_{-signal}$ appears across a resistor R connected to the transistor Tr7. Thus, the potential difference $V_{-signal}$ is extracted as a reception light signal.

In this manner, changeover between light emission driving and light reception driving of a sub pixel is performed by changing over a circuit, which should be operative then, between a circuit for performing light emission driving (a circuit including the transistors Tr1 and Tr2 and the capacitor C) and a circuit for performing light reception driving (a circuit including the transistors Tr4, Tr5, Tr6, and Tr7) through a switching line.

At least one sub pixel having such a circuit as shown in FIG. 29 is provided for each of the pixels, which form the display section 11, and each of the pixels individually performs display of an image and detection of an input from the outside.

A process of the display apparatus 1 when it displays an image on the display section 11 and forms, in a region different from the region in which the image is displayed, a reading region for detecting an input from the outside thereby to perform both of display of an image and detection of an input from the outside is described with reference to a flow chart of FIG. 30.

At step S201, the control section 45 sets a range, a position, and so forth for forming a reading region, for example, in accordance with an instruction from the user or an application being currently executed. Here, various settings of a reading region can be performed such as, for example, to set the overall area of the display section 11 as a reading region, to set only a predetermined range of the display section 11 as a reading region, to set a position of a reading region when only a predetermined range of the display section 11 is set as a reading region, and to set a reading region as a movable reading region as described hereinabove with reference to FIG. 20. Information of a range, a position, and so forth for forming a reading region is outputted to the controller 48.

At step S202, the controller 48 selects, from among all rows of the display section 11, a predetermined number of rows wherein light emission driving should be performed and a predetermined number of rows wherein light reception driving should be performed based on the range, position, and so forth for forming a reading region set by the control section 45 and an image signal of a television program or the like supplied thereto from the image signal production section 47. In an EL display apparatus, a predetermined number of rows are driven collectively to emit light and a successive movement of the range of such rows from above to below in a display frequency of, for example, 1/60 second is repeated to display an image. Therefore, such a predetermined number of rows are selected as rows for light emission driving also in the present display apparatus 1.

At step S203, the controller 48 discriminates whether or not a row of an object of processing is a row for which light emission driving should be performed. If the row of the processing object is a row for which light emission driving should be performed, then the processing advances to step S204. On the other hand, if the row of the processing object is a row for which light reception driving should be performed, then the processing advances to step S206.

At step S204, the controller 48 controls the switching section 301 to turn on the transistors Tr3 (FIG. 29) of the sub pixels of the row for which light emission driving should be performed and turn off the transistors Tr4 and Tr5. Consequently, in each of the pixels of the row, the circuit for performing light reception driving (circuit including the transistors Tr4, Tr5, Tr6, and Tr7) and the EL element are disconnected from each other.

At step S205, the controller 48 controls the gate driver 50 to render the gate lines active and controls the source driver 49 to send signals corresponding to an image to be displayed to those sub pixels, which should be driven for light emission through the gate lines. Consequently, in each of the sub pixels, which are driven for light emission, the transistor Tr1 is turned on, and consequently, charge supplied through the pertaining data line charges the capacitor C. Further, the transistor Tr2 is opened in response to a potential difference caused by the charge accumulated in the capacitor C, and consequently, the EL element is driven to emit light with current produced by the transistor Tr2.

Such processing as described above is performed in all of the sub pixels of the rows selected for light emission driving, and an image is displayed in the display image thus formed.

On the other hand, at step S206, the controller 48 controls the switching section 301 to turn off the transistor Tr3 of each of those sub pixels, which form a reading region in the rows for which light reception driving should be performed. In response to the turning off of the transistor Tr3, the transistors Tr4 and Tr5 are turned on. If light is introduced to the EL element of the sub pixel in this state, then the detection section 53 detects a potential difference $V_{-signal}$ appearing across the resistor R due to leak current $I_{EL}$ produced in response to the amount of incoming light as a reception light signal at step S207. The detected reception light signal is outputted to the symbol processing section 52, and detection, which may use, for example, such a symbol as described hereinabove, of an input from the outside is performed.

After the light emission driving at step S205 or the light reception driving at step S207 is performed, the processing advances to step S208. At step S208, it is discriminated whether not the display should be ended. Then, the processes at steps S202 et seq. are repeated until after it is discriminated at step S208 that the display should be ended. Thus, when it is discriminated at step S208 that the display should be ended, then the processing is ended.

Operation of the circuit of FIG. 29 is controlled to perform display of an image and detection of an input from the outside in such a manner as described above.

Figure 31A:
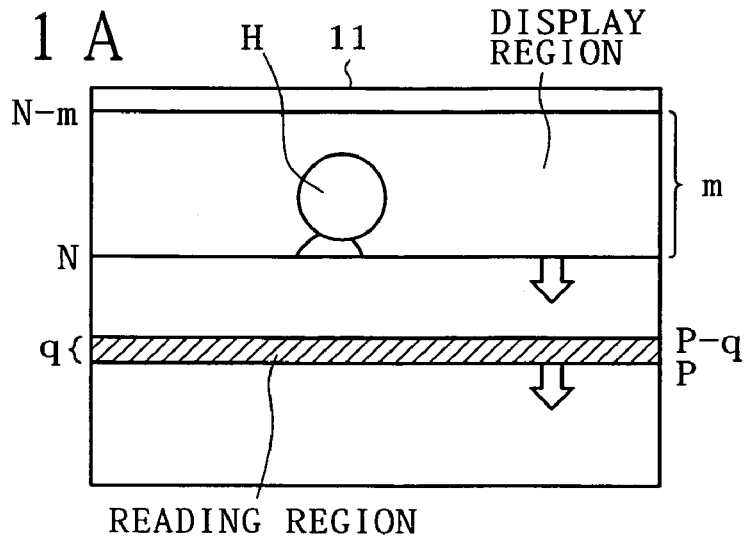
FIGS. 31A, 31B and 31C are schematic views showing an example of regions formed by the process illustrated in FIG. 30.
Figure 31B:
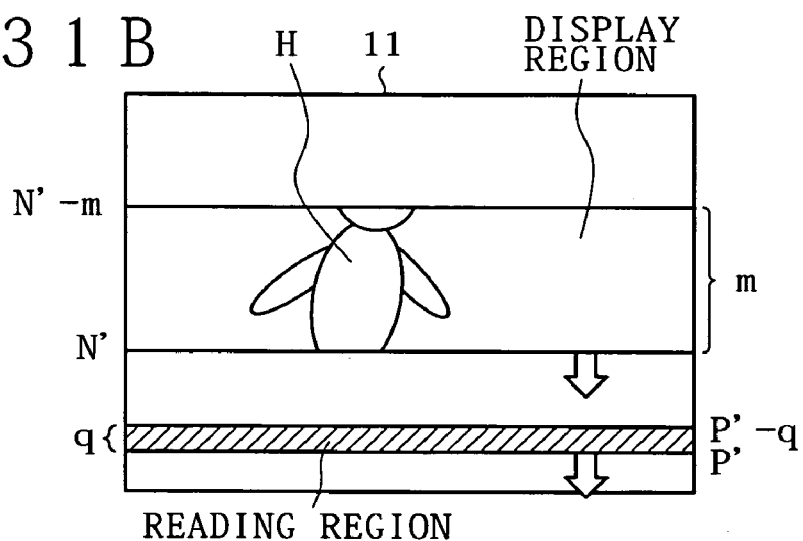
Figure 31C:
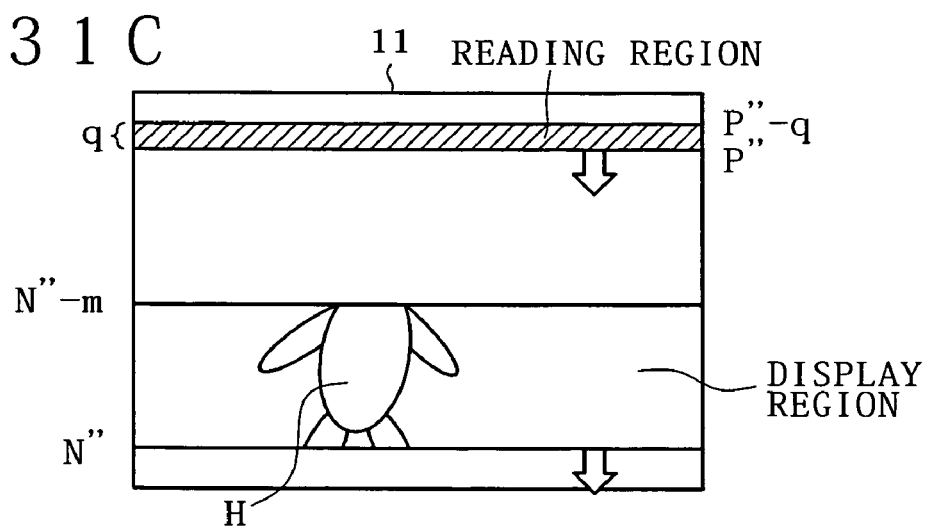

FIGS. 31A to 31C illustrate an example of a display region (region formed from those pixels (sub pixels), which are driven for light emission) and a reading region (region formed from those pixels (sub pixels), which are driven for light reception) formed on the display section 11 through the process described above. It is to be noted that each of FIGS. 31A to 31C illustrates an example of a display region and a reading region for a certain period of 1/60 second corresponding to the display frequency of the display section 11. This similarly applies to examples hereinafter described with reference to FIGS. 33A to 33C, 35A to 35C, and 37A to 37C.

FIGS. 31A to 31C illustrate that both of the top (Nth row) of a display region and the top (Pth row) of a reading region successively move downwardly from above as indicated by void arrow marks while the distance therebetween is maintained and, after any of them comes to the lowermost Yth row, it repeats such downward movement beginning with the first row. Such movements of the tops of the display region and the reading region are repeated.

In FIG. 31A, the reading region begins with the Pth row from above in the vertical direction, which is the top of the reading region in the moving direction, and ranges from the Pth row to the P-qth row. Meanwhile, in the horizontal direction, the reading region ranges over the overall horizontal width of the display section 11. It is to be noted that, while the reading region is indicated by slanting lines for the convenience of illustration, since it is a region formed from those sub pixels, which are not driven for light emission, actually no image including slanting lines is displayed in the reading region.

On the other hand, the display region begins with the Nth row from above in the vertical direction, which is the top of the display region, and ranges from the Nth row to the N-mth row. Meanwhile, in the horizontal direction, the display region ranges over the overall horizontal width of the display section 11. As described hereinabove, in an EL display apparatus, a predetermined number of rows are driven collectively to emit light and a successive movement of the range of such rows from above to below is repeated to display an image in accordance with a display frequency. In the present example, the number of rows for which light emission driving is performed at a timing, for example, for 1/60 second is m. The display region is successively moved in accordance with the display frequency to display an image of one frame.

In this manner, within a certain period of 1/60 second, for example, part of a person H (a portion centered at the face) is displayed in the display region, which is currently driven for light emission, as seen in FIG. 31A. It is to be noted that, since no light emission driving is performed for the other region than the display region, the black is displayed instantaneously in the region other than the display region.

FIG. 31B shows an example of the display region and the reading region within another certain period of 1/60 after the operation illustrated in FIG. 31A is performed.

In FIG. 31B, the reading region begins with the P'th row below the Pth row (FIG. 31A) from above in the vertical direction, which is the top of the reading region in the moving direction, and ranges from the P'th row to the P'-qth row. Meanwhile, in the horizontal direction, the reading region ranges over the overall horizontal width of the display section 11. On the other hand, the display region begins with the N'th row below the Nth row from above in the vertical direction, which is the top of the display region, and ranges from the N'th row to the N'-mth row. Meanwhile, in the horizontal direction, the display region ranges over the overall horizontal width of the display section 11. In the display region of FIG. 31B, the person H is displayed such that a portion thereof lower than that thereof shown in FIG. 31A is displayed in the display region.

FIG. 31C shows an example of the display region and the reading region within a further certain period of 1/60 after the operation illustrated in FIG. 31B is performed.

In FIG. 31C, the reading region begins with the P''th row from above in the vertical direction, which is the top of the reading region, and ranges from the P''th row to the P''-qth row. Meanwhile, in the horizontal direction, the reading region ranges over the overall horizontal width of the display section 11. On the other hand, the display region begins with the N''th row from above in the vertical direction, which is the top of the display region, and ranges from the N''th row to the N''-mth row. Meanwhile, in the horizontal direction, the display region ranges over the overall horizontal width of the display section 11. In the display region of FIG. 31C, the person H is displayed such that a portion thereof lower than that thereof shown in FIG. 31B is displayed in the display region.

Where the reading region has a horizontal width equal to the overall horizontal width of the display section 11 and the position thereof is successively changed over (successively moved) in accordance with the display frequency in this manner, the entire display section 11 is scanned by the reading region. Accordingly, in this instance, the user can input predetermined information to the display apparatus 1 by illuminating light on any place of the display section 11 from the outside. In other words, when not a certain period of 1/60 second but predetermined periods are considered as a whole, a reading region is formed equivalently over an overall area of the display section 11.

Also in this instance, within a certain period of 1/60 second, a display region is always formed at a position different from a reading region, and therefore, naturally the user can observe the entire image including the person H.

Figure 30:
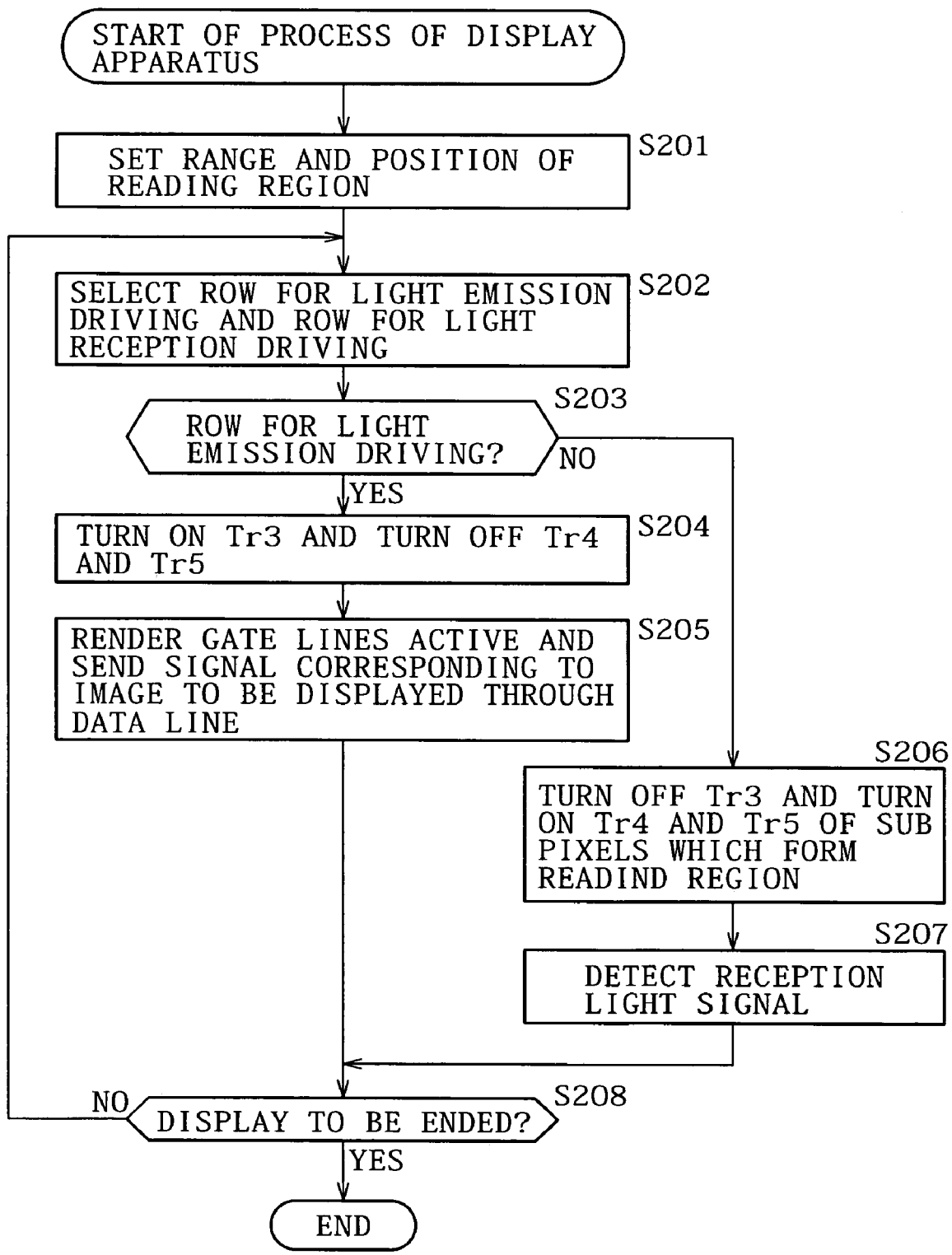
FIG. 30 is a flow chart illustrating a process of the display apparatus.
Figure 33A:
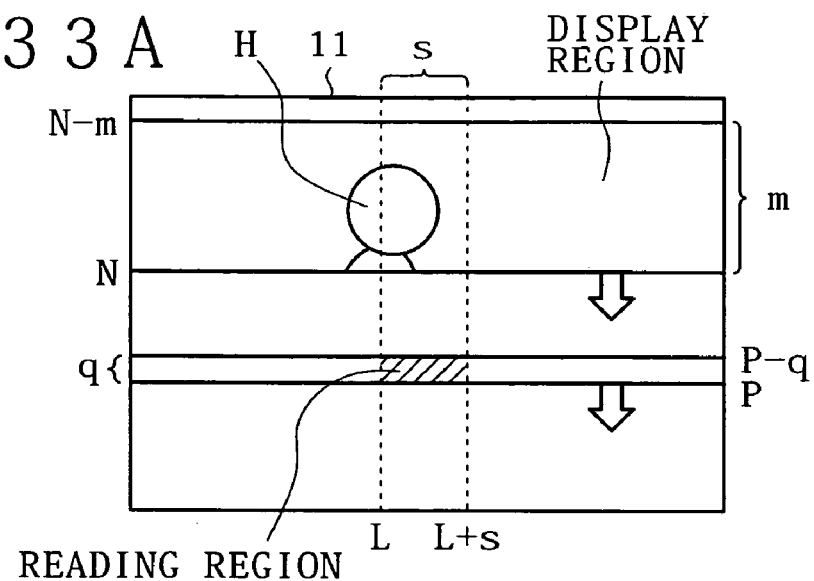
FIGS. 33A, 33B and 33C are schematic views showing another example of regions formed by the process illustrated in FIG. 30.
Figure 33B:
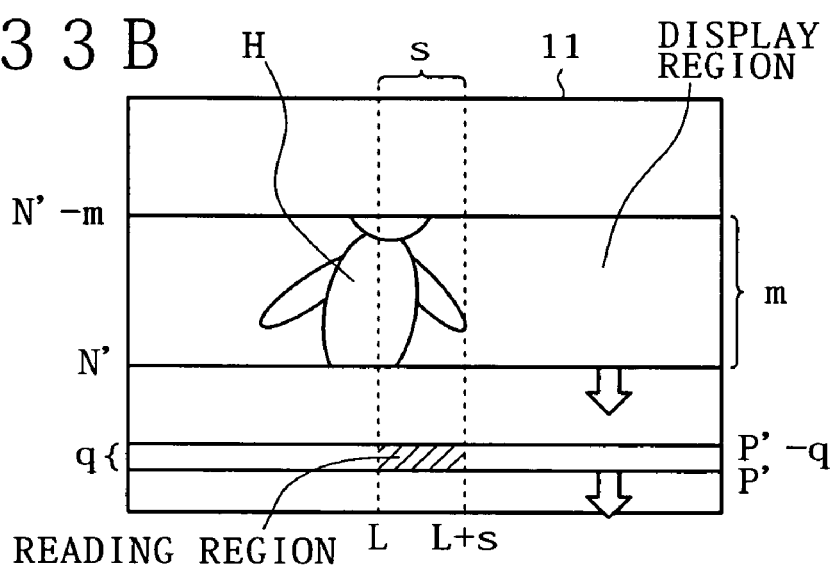
Figure 33C:
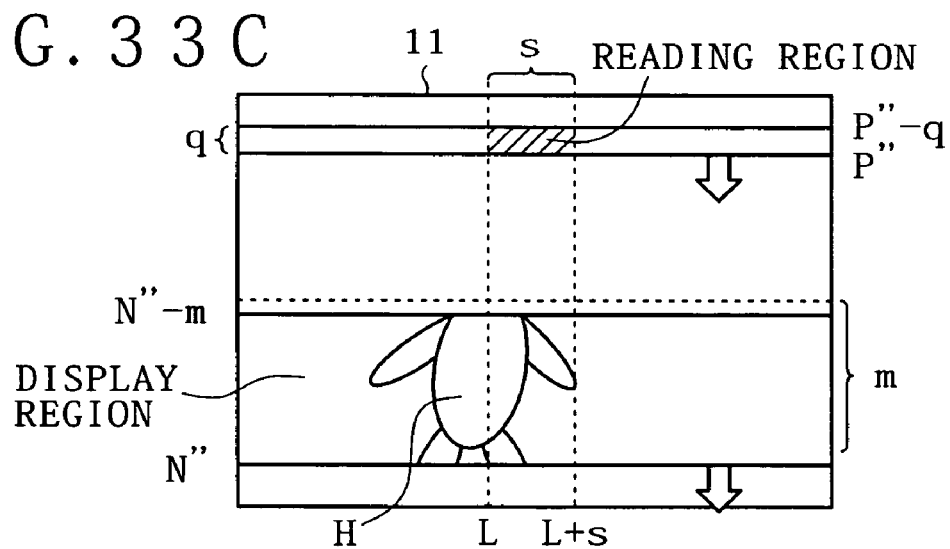
Figure 34:
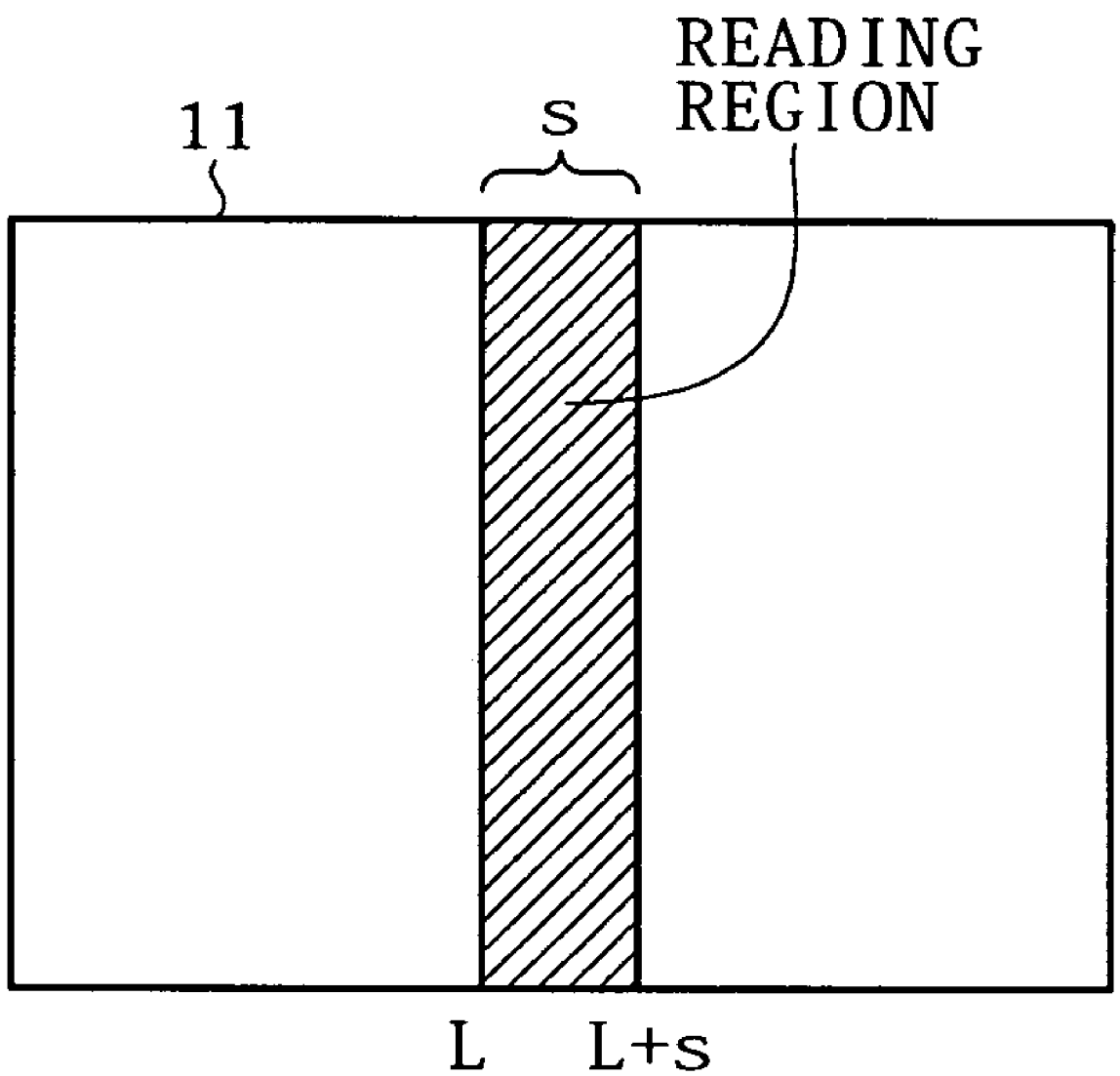
FIG. 34 is a schematic view showing a range of a reading region shown in FIGS. 33A to 33C.

FIGS. 33A to 33C show another example of a display region and a reading region formed by the process of FIG. 30.

In FIGS. 33A to 33C, a display region and a reading region are formed similarly as in FIGS. 31A to 31C except that the range of the reading region in the horizontal direction is limited. In particular, both the top (Nth row) of a display region and the top (Pth row) of a reading region successively move downwardly from above as indicated by void arrow marks while the distance therebetween is maintained and, after any of them comes to the lowermost Yth row, it repeats such downward movement beginning with the first row. Such movements of the tops of the display region and the reading region are repeated.

In FIGS. 33A to 33C, the reading region formed from those sub pixels, which are driven for light reception, is formed such that it ranges in a horizontal direction from the Lth column to the L+sth column of the display section 11. Since driving of each sub pixel can be controlled through a switching line, the range of the reading region in the horizontal direction can be limited in this manner.

Where the position of the reading region, which is limited in the horizontal direction, is successively moved in this manner, scanning is performed repetitively within the range from the Lth column to the L+sth column of the display section 11. Accordingly, in this instance, the user can input predetermined information to the display apparatus 1 by illuminating light upon the display section 11 within the range from the Lth column to the L+sth column from the outside. In other words, when not a certain period of 1/60 second but predetermined periods are considered as a whole, a reading region is formed equivalently over the range from the Lth column to the L+sth column of the display section 11.

Figure 35A:
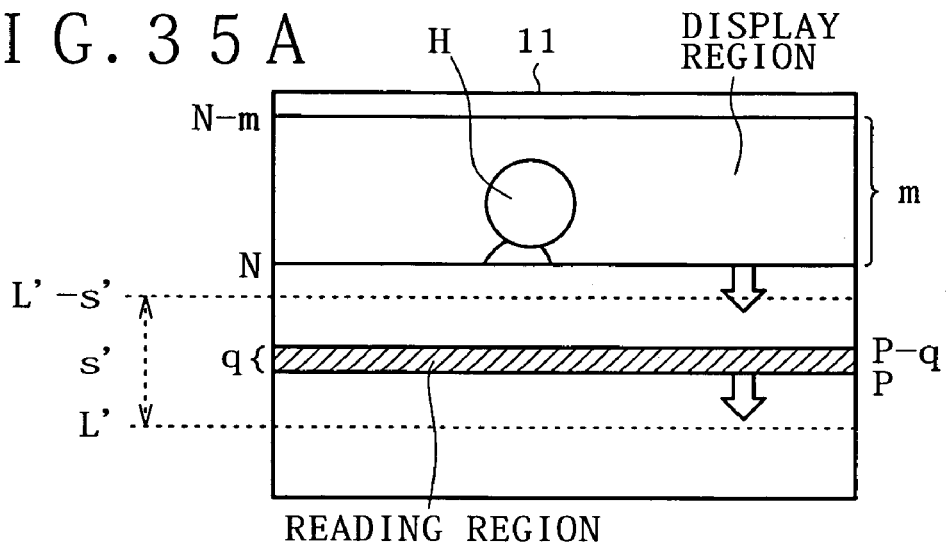
FIGS. 35A, 35B and 35C are schematic views showing a further example of regions formed by the process illustrated in FIG. 30.
Figure 35B:
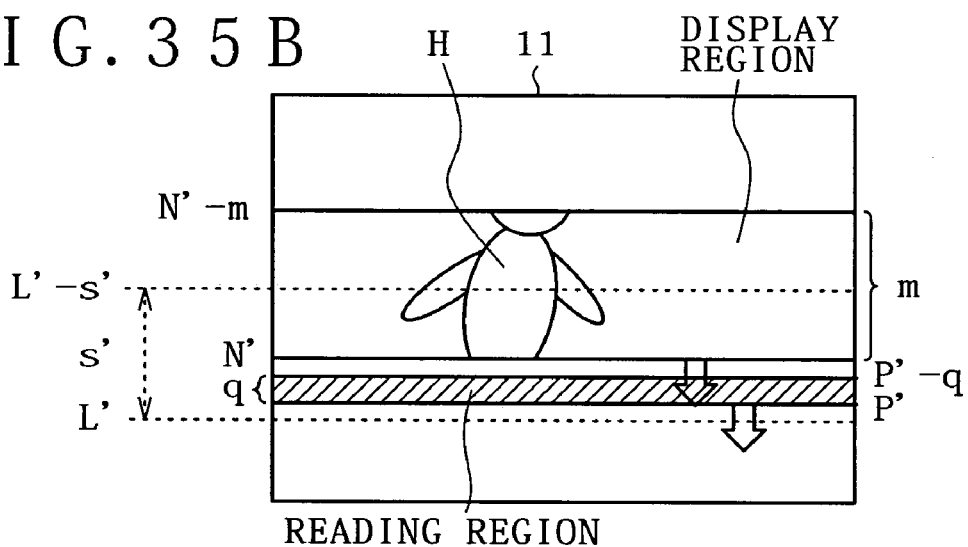
Figure 35C:
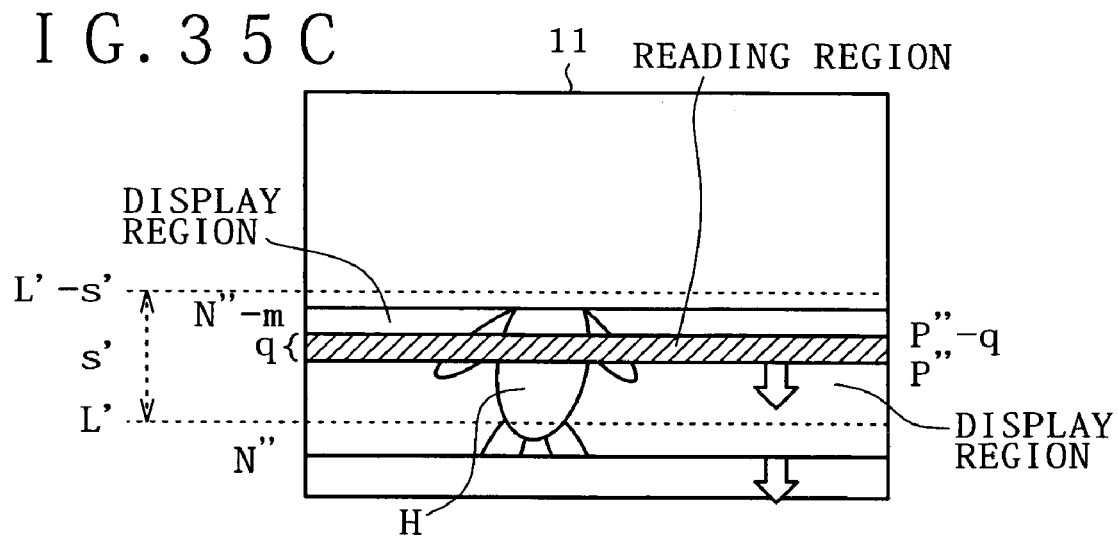
Figure 36:
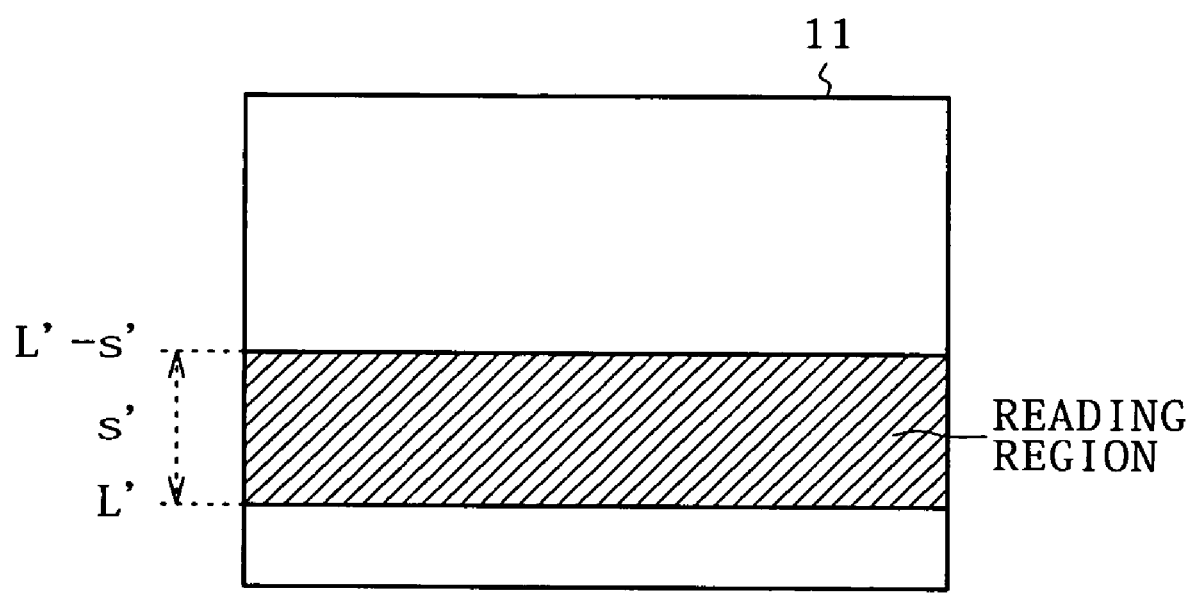
FIG. 36 is a schematic view showing a range of a reading region shown in FIGS. 35A to 35C.

FIGS. 35A to 35C show a further example of a display region and a reading region formed by the process of FIG. 30. In FIGS. 35A to 35C, a display region and a reading region are formed similarly as in FIGS. 31A to 31C except that the range of movement of the reading region in the vertical direction is limited to the L'th row to the L'-s'th row. In particular, in FIGS. 35A to 35C, at a moment when the top row of the reading region comes to the L'th row, a reading region whose top is the L'-s'th row is formed.

Where the range of movement of the reading region in the vertical direction is limited to the L'th row to the L'-s'th row in this manner, scanning is performed repetitively within the range from the L'th column to the L'-s'th column of the display section 11. Accordingly, in this instance, the user can input predetermined information to the display apparatus 1 by illuminating light upon the display section 11 within the range from the L'th column to the L'-s'th column. In other words, when not a certain period of 1/60 second but predetermined periods are considered as a whole, a reading region having a horizontal width equal to that of the display section 11 is formed equivalently over the range in the vertical direction from the L'th row to the L'-s'th row of the display section 11.

Figure 37A:
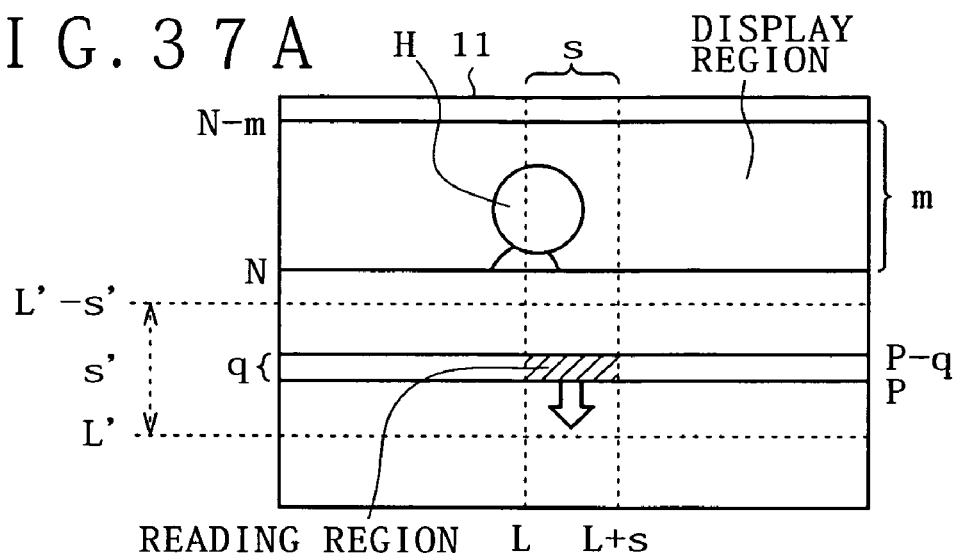
FIGS. 37A, 37B and 37C are schematic views showing still further different examples of regions formed by the process illustrated in FIG. 30.
Figure 37B:
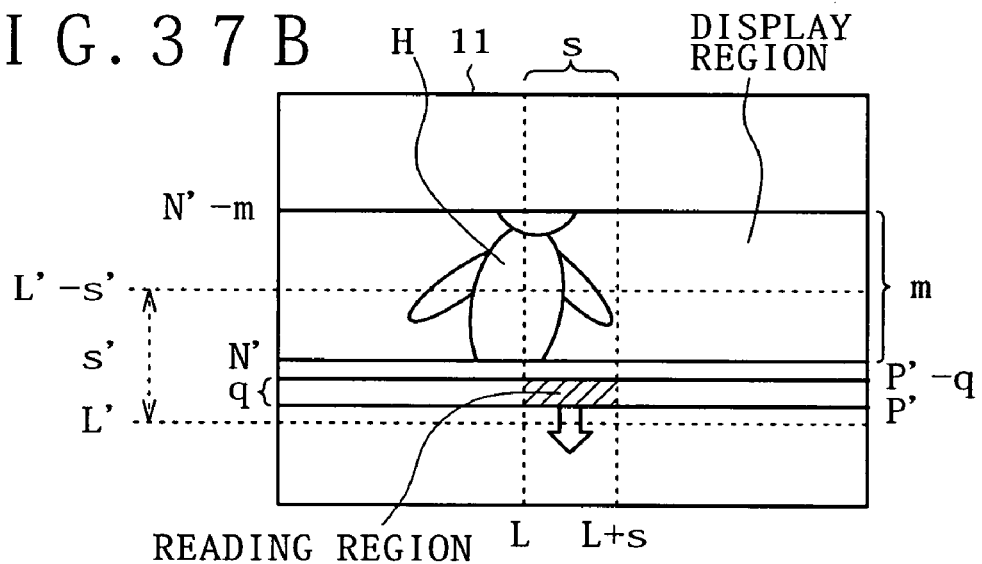
Figure 37C:
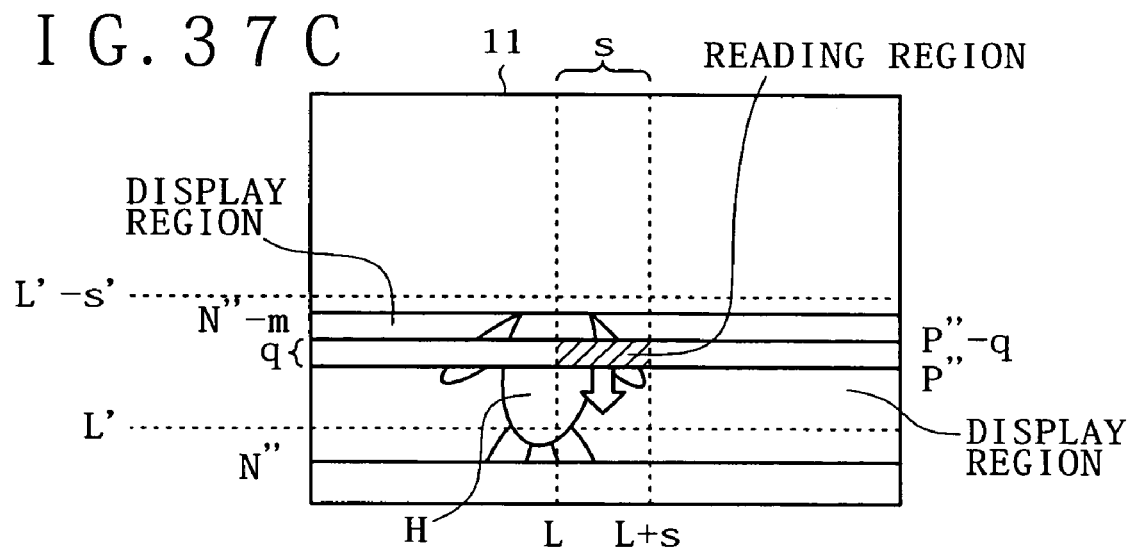

FIGS. 37A to 37C illustrate an example wherein a reading region is formed by a combination of operation of forming a reading region whose range in the horizontal direction is limited as seen in FIGS. 33A to 33C and operation of forming a reading region whose range of movement in the vertical direction is limited.

In particular, in the example of FIGS. 37A to 37C, the reading region is limited in the horizontal direction such that it ranges from the Lth column to the L+sth column of the display section 11 similarly as in the case of FIGS. 33A to 33C. Further, the movement of the reading region is further limited in the vertical direction such that it ranges from the L'th row to the L'-s'th row similarly as in the case of FIGS. 35A to 35C. The display region and the reading region are similar to those shown in FIGS. 31A to 31C except the limitations described above.

Where the range of movement in the vertical direction and the range in the horizontal direction of the reading region are limited in this manner, scanning is performed repetitively within the range of the Lth row to the L+sth row within the range of the L'th row to the L'-s'th row of the display section 11. Accordingly, in this instance, the user can input predetermined information to the display apparatus 1 by illuminating light upon the display section 11 within the range of the Lth row to the L+sth row within the range of the L'th row to the L'-s'th row. In other words, when not a certain period of 1/60 second but predetermined periods are considered as a whole, a rectangular reading region, which horizontally ranges from the Lth column to the L+sth column, is formed equivalently over the range from the L'th row to the L'+s'th row of the display section 11.

Figure 38:
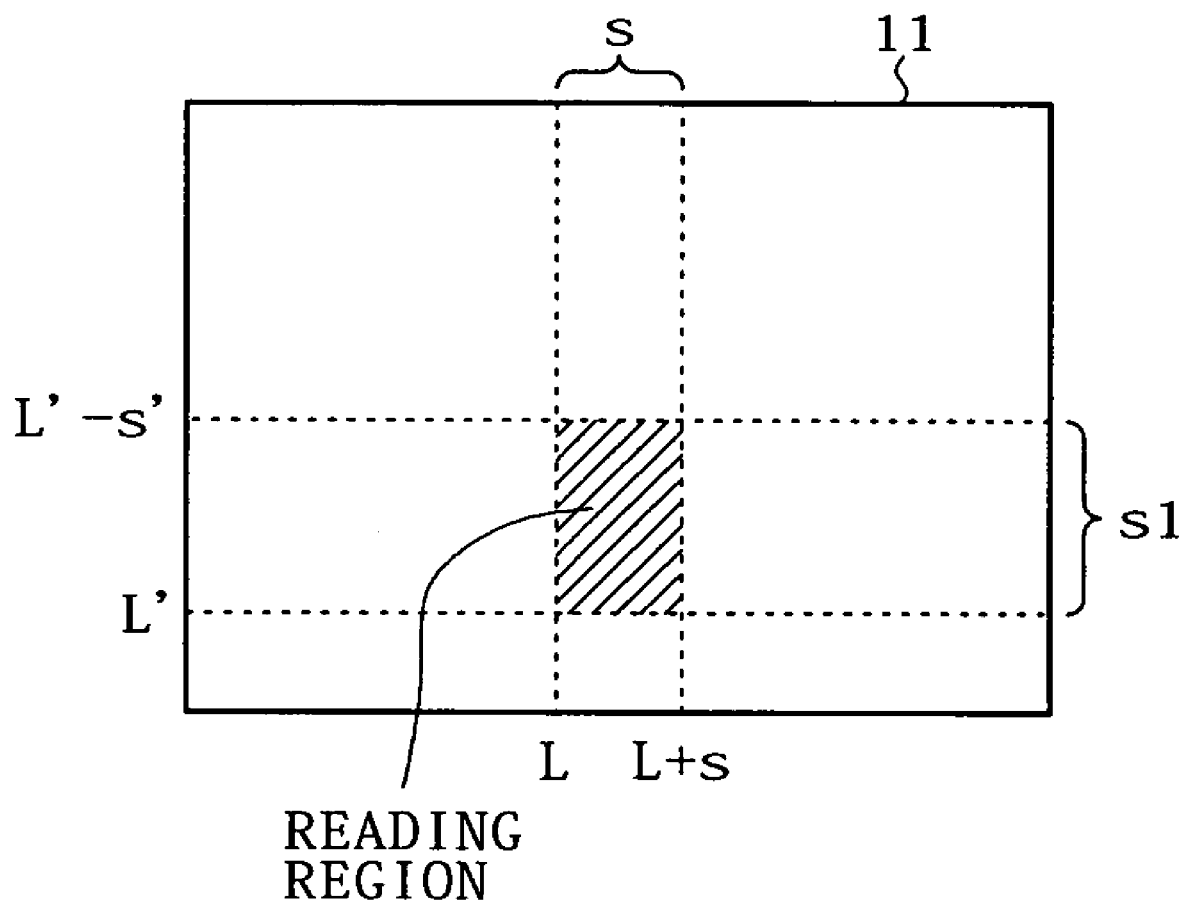
FIG. 38 is a schematic view showing a range of a reading region shown in FIG. 36.
Figure 39:
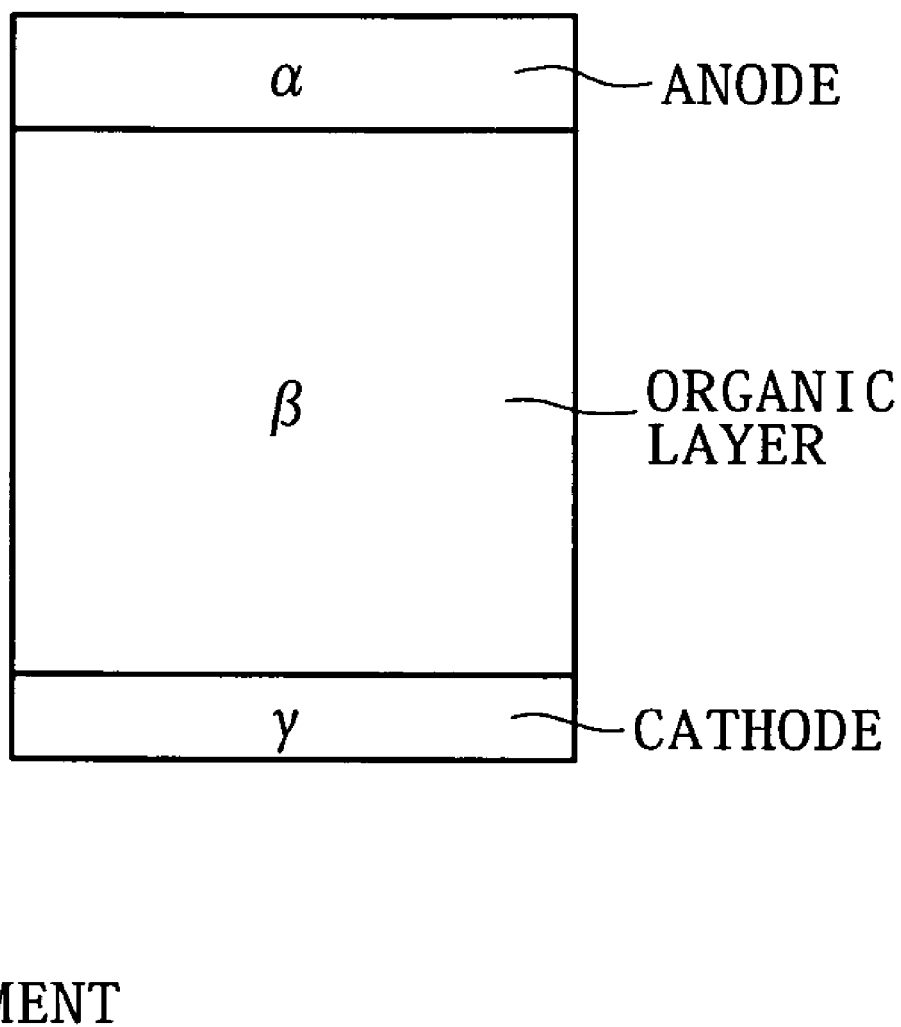
FIG. 39 is a view showing a cross section of an EL element.

It is to be noted that the reading region described hereinabove with reference to FIG. 20 (reading region, which moves over the overall area of the screen) is realized by successively changing over a formation range of a rectangular reading region of FIG. 38 through operations of the sub pixels.

Since light emission driving and light reception driving can be performed for each sub pixel as described above, a reading region can be formed by setting the position, range (size) and whether or not the reading region should be moved in accordance with an object then. Further, also the number of reading regions can be set suitably in accordance with an object according to an application such that, for example, a plurality of such rectangular reading regions shown in FIG. 38 may be formed simultaneously on the display section 11.

In the foregoing description, an input of predetermined information is detected through reception of light from the outside. However, the characteristic regarding such light reception differs depending upon the material and so forth of the EL elements.

Figure 40:
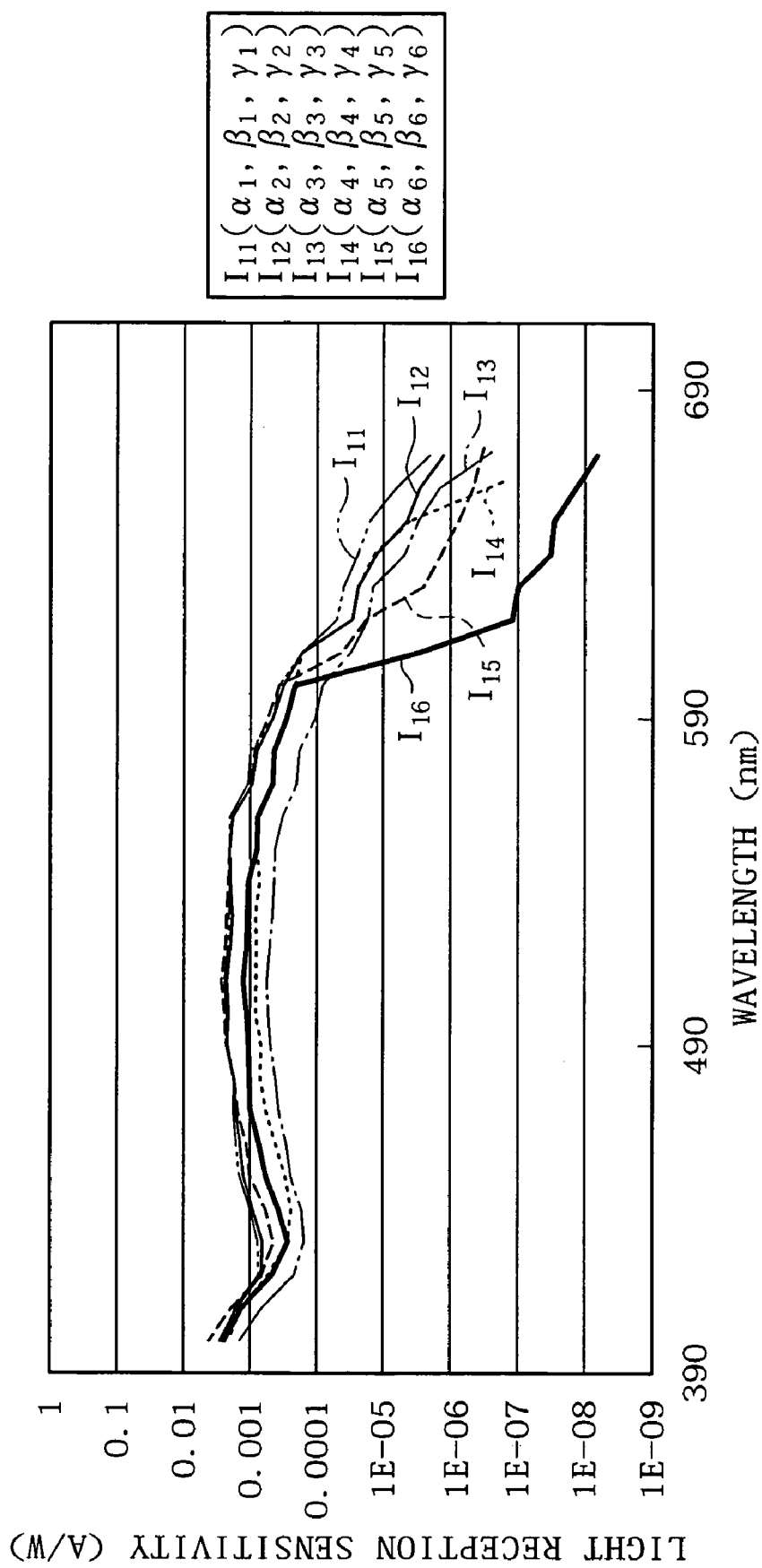
FIG. 40 is a diagram illustrating a light reception sensitivity characteristic of the EL element.

Here, a material and a characteristic of an EL element (organic EL element) are described.

Where an EL element is made of a material a used for the anode, another material β used for the organic layer including a light emitting layer, a hole transport layer and an electron transport layer and a further material γ used for the cathode, the light reception sensitivity of the EL element differs as seen in FIG. 40 depending upon the combination of the materials. It is to be noted that FIG. 40 illustrates a characteristic of an EL element which emits light of red (R) when it is driven for light emission. In FIG. 40, the axis of abscissa indicates the wavelength nm, and the axis of ordinate indicates the reception sensitivity A/W (photocurrent (A)/incoming light amount (W)).

Referring to FIG. 40, the characteristic curve $I_{11}$ indicates a characteristic of an EL element where the material of the anode is $a_1$ and the material of the organic layer is $\beta_1$ while the material of the cathode is $\gamma_1$. Similarly, the characteristic curve $I_{12}$ indicates a characteristic of an EL element where the material of the anode is $a_2$ and the material of the organic layer is $\beta_2$ while the material of the cathode is $\gamma_2$. The characteristic curve $I_{13}$ indicates a characteristic of an EL element where the material of the anode is $a_3$ and the material of the organic layer is $\beta_3$ while the material of the cathode is $\gamma_3$. The characteristic curve $I_{14}$ indicates a characteristic of an EL element where the material of the anode is $a_4$ and the material of the organic layer is $\beta_4$ while the material of the cathode is $\gamma_4$. The characteristic curve $I_{15}$ indicates a characteristic of an EL element where the material of the anode is $a_5$ and the material of the organic layer is $\beta_5$ while the material of the cathode is $\gamma_5$. The characteristic curve $I_{16}$ indicates a characteristic of an EL element where the material of the anode is $a_6$ and the material of the organic layer is $\beta_6$ while the material of the cathode is $\gamma_6$.

It can be seen that the characteristic of the light reception sensitivity of the EL element differs depending upon the combination of materials in this manner. Further, from FIG. 40, it can be seen that the EL element which emits red light has a high light reception sensitivity particularly to ultraviolet light of a wavelength in the proximity of 390 nm and light of green of a wavelength in the proximity of 500 nm.

Accordingly, preferably ultraviolet rays are used as light to be irradiated when predetermined information is inputted from the outside. For example, where the reader/writer 24 of the information processing terminal 21 is utilized to input information to the display apparatus 1, if a light source which emits ultraviolet rays is used as a light source for causing the reader/writer 24 to display a symbol (two-dimensional code), then information can be inputted with a higher degree of certainty to those EL elements which emit red light when they are driven for light emission (to EL elements having the light reception sensitivity of FIG. 40).

Figure 41:
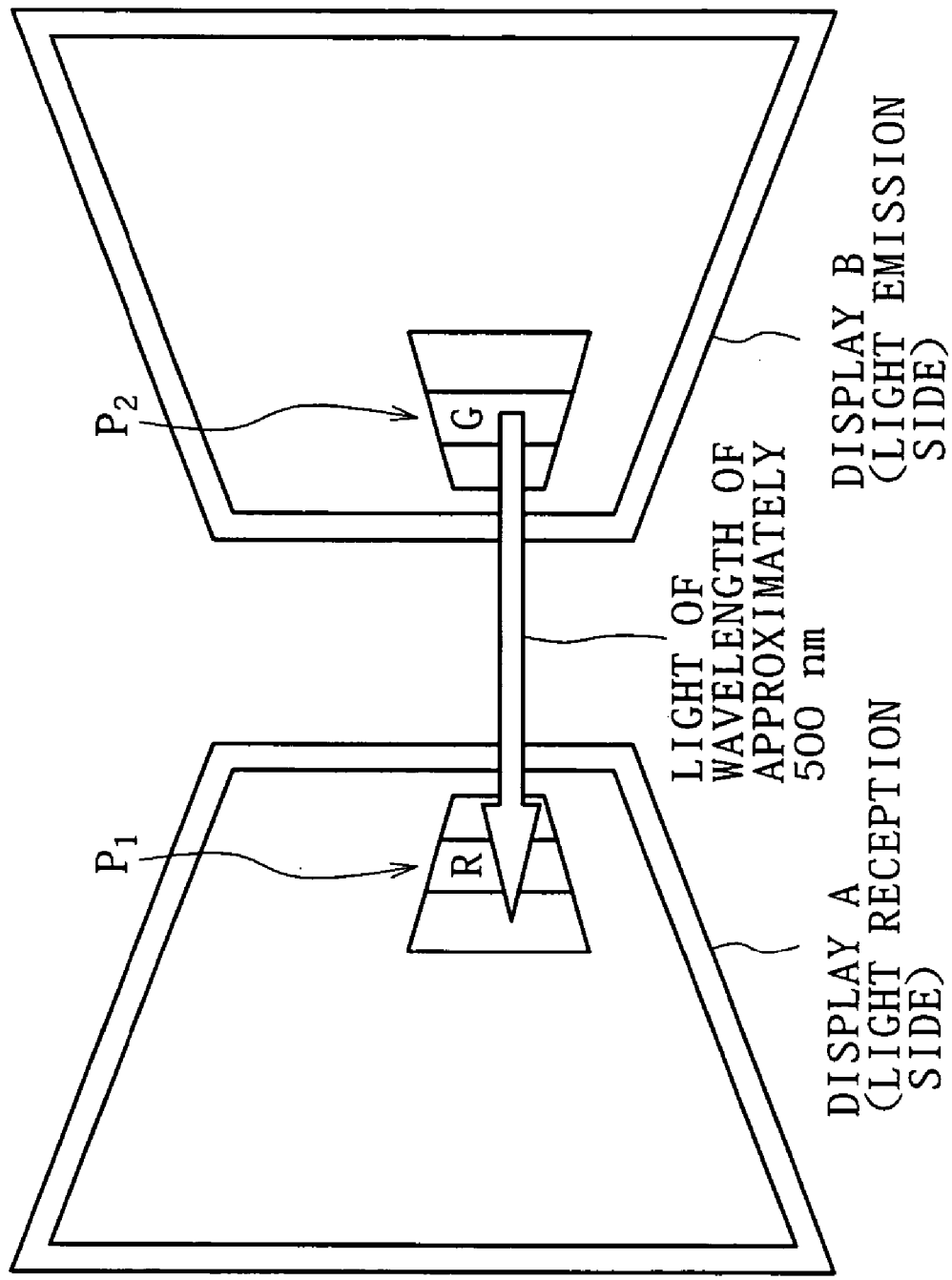
FIG. 41 is a schematic view showing a display apparatus which inputs data and another display apparatus which detects data.

On the other hand, where predetermined information is inputted using a display unit A of the light reception side and another display unit B of the light emission side disposed in an opposing relationship as seen in FIG. 41, if a sub pixel for R of a certain pixel $P_1$ is driven for light reception while a sub pixel for G of another pixel $P_2$ positioned in an opposing relationship to the pixel $P_1$ is driven for light emission, then it is possible to detect light from the outside, that is, to input information from the display unit B to the display unit A with a higher degree of certainty. The driving for light reception and emission as described above can be realized by changing over driving of each circuit for each display through the switching lines.

Further, where the display apparatus 1 is configured such that it detects reflected light originating light emitted from the display apparatus 1 itself to detect, for example, a finger of the user is positioned in the proximity of the surface of the display section 11 and performs a predetermined process based on the detection, preferably a sub pixel $SP_{11}$, which emits green (G) light is used as a sub pixel for illuminating light upon the finger F of the user while another sub pixel $SP_{12}$ for red (R) (a pixel which emits red light when it is driven for light emission) positioned in the proximity of the sub pixel $SP_{11}$, is used as a sub pixel for receiving reflected light (reflected by the finger F) originating from the light emitted from the sub pixel $SP_{11}$. In this instance, since the degree of certainty in detection that the finger F is positioned in the proximity increases as the distance between the sub pixel $SP_{11}$ and the sub pixel $SP_{12}$, the distance between the $Y_1$th row which includes the sub pixel $SP_{11}$ and the $Y_2$th row which includes the sub pixel $SP_{12}$ is set to several row spaces.

Figure 43:
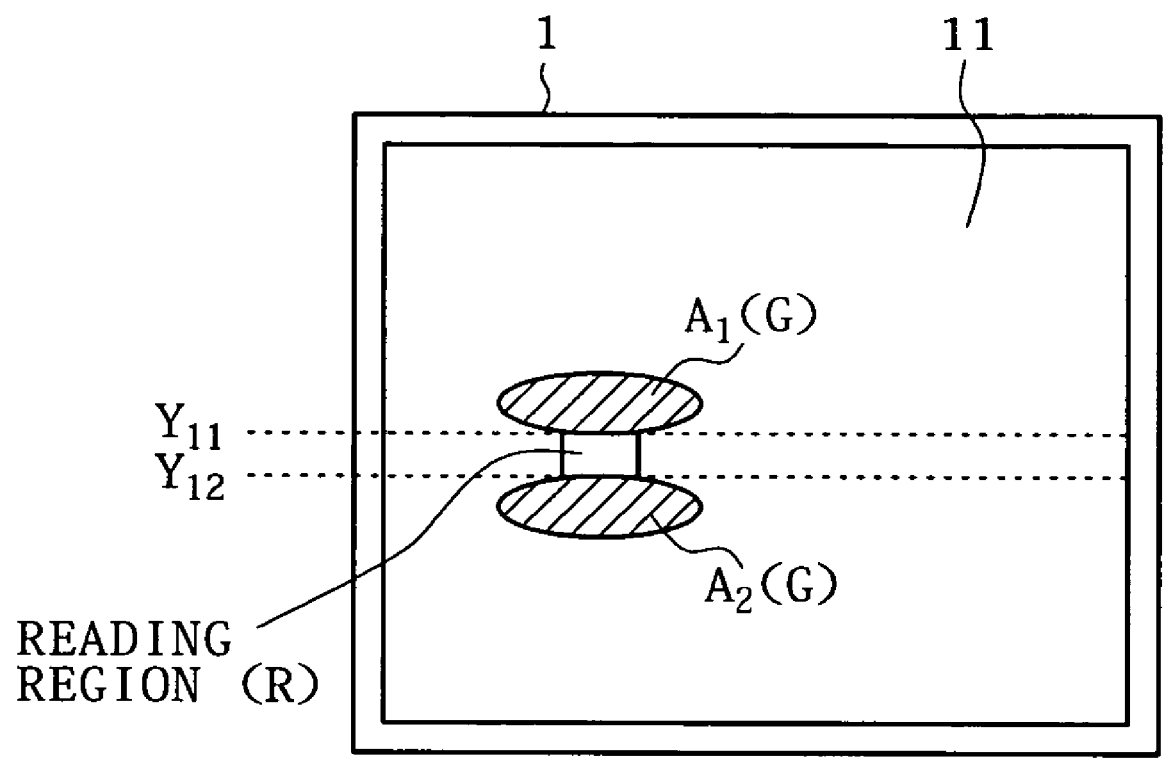
FIG. 43 is a schematic view showing a range of a preferable light emission region in the detection of FIG. 42.

On the other hand, where a rectangular reading region for detecting the finger F of the user is formed in a range from the $Y_{11}$th row to the $Y_{12}$th row from above on the display section 11 as seen in FIG. 43, for example, if pixels in ranges $A_1$ and $A_2$ indicated by slanting lines above and below the reading region operate to emit green light, then an input of a user (approach of the finger F) can be detected with a higher degree of certainty.

Figure 44:
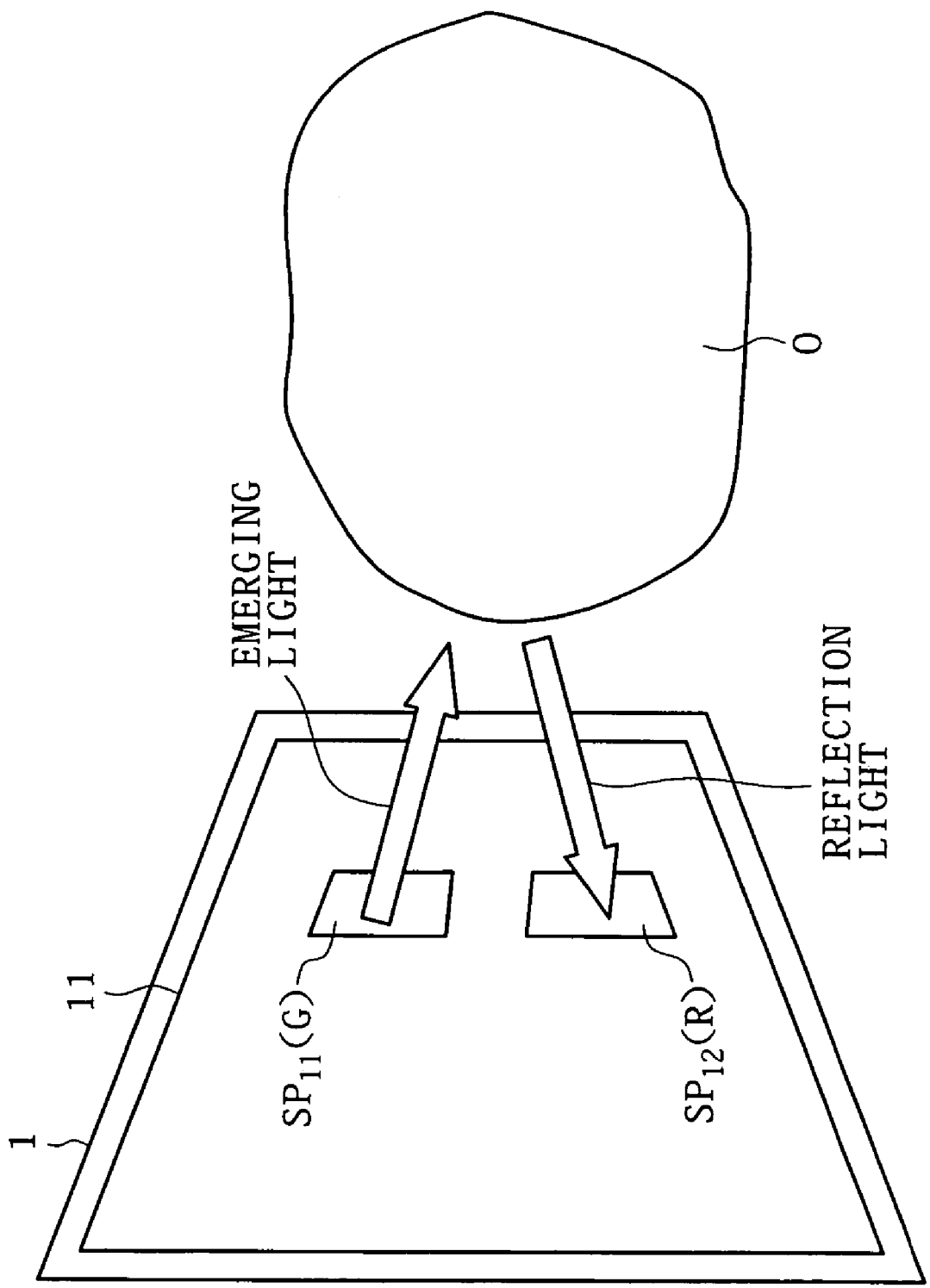
FIG. 44 is a schematic view illustrating another example of detection of an input.

It is to be noted that, even if not the finger F but an object O having a predetermined reflection factor is positioned in the proximity of the surface of the display section 11 as seen in FIG. 44, the user can input information to the display apparatus 1 (the display apparatus 1 can detect the object O positioned in the proximity thereof). Consequently, such an intuitive operation that information is inputted by moving an object similar to that displayed on the display section 11 near to the display section 11 is allowed.

Also detection of such an object positioned in the proximity as described above can be realized by changing over driving of the circuits through the switching lines such that sub pixels in a certain row are driven for light reception while sub pixels in the proximity of the row are driven for light emission.

Similarly, where reflected light originating from emitted light is detected by the display apparatus 1, the user can input not only information which can be detected at a point such as whether or not a finger is positioned in the proximity but also information on a certain plane such as a fingerprint of a finger contacting with the surface of the display section 11.

Figure 45:
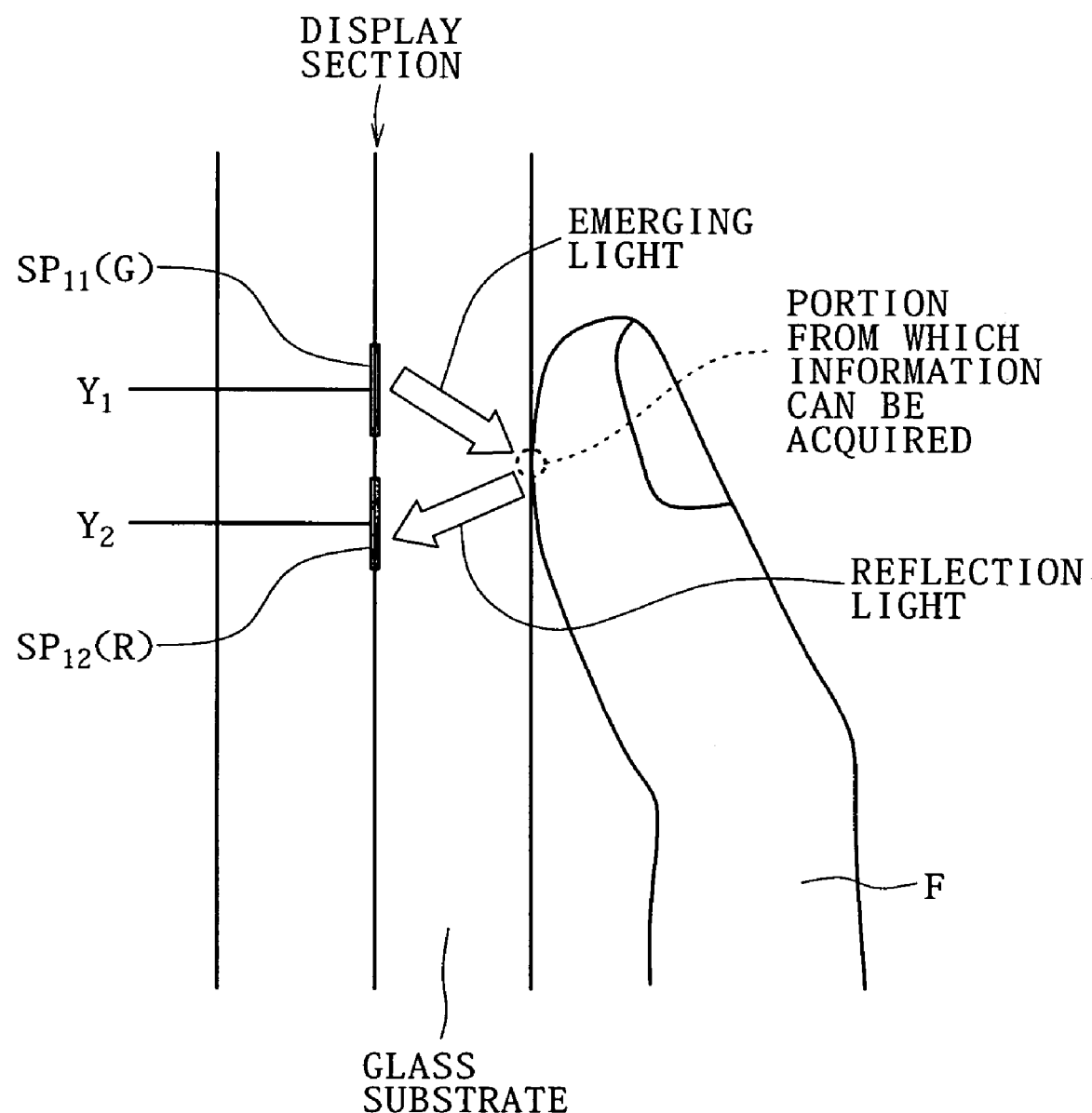
FIG. 45 is a schematic view illustrating detection of plane information.

FIG. 45 shows a cross section of the display section 11 (display unit) and a finger F of a user touching with the surface of the display section 11 at a certain timing. Meanwhile, FIG. 46 shows an appearance of the display section 11 and the finger F shown in FIG. 45.

Figure 46:
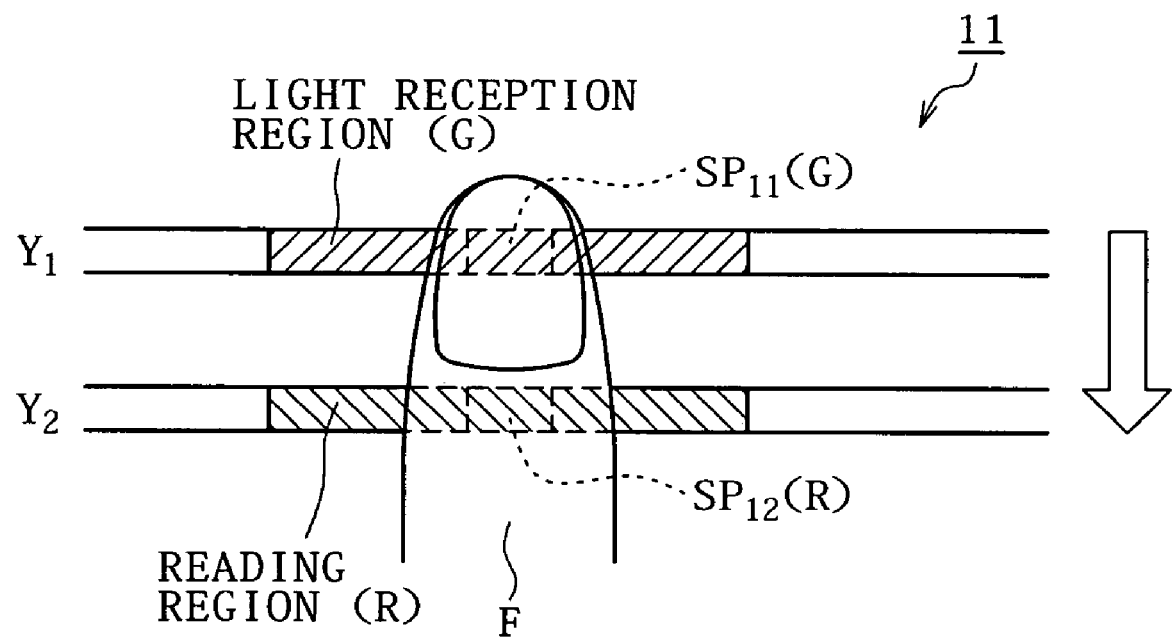
FIG. 46 is a schematic view showing an appearance of a glass substrate and a finger shown in FIG. 45.

Referring to FIGS. 45 and 46, it is illustrated that reflected light originating from light emitted from a light emitting area formed from sub pixels (G) in the $Y_1$th row driven for light emission including the sub pixel $SP_{11}$ is received by a reading region formed from sub pixels (R) in the $Y_2$th row driven for light reception including the sub pixel $SP_{12}$ positioned in the proximity of the sub pixel $SP_{11}$. Thus, the display apparatus 1 can acquire information in a horizontal direction of the finger F illuminated from the light emission region (information of whether or not there is a concave or convex portion in a direction parallel to the plane of FIG. 45 in a portion surrounded by broken lines in FIG. 45). Further, if the row of the sub pixels driven for light emission and the row of the sub pixels driven for light reception are both moved in the downward direction as indicated by a void arrow mark of FIG. 46 while the positional relationship between them is maintained and then information in the horizontal direction acquired at the individual timings (information acquired time-divisionally) is synthesized, then the display apparatus 1 can acquire information of the fingerprint of the entire finger F of the user contacting with the display section 11.

Figure 47A:
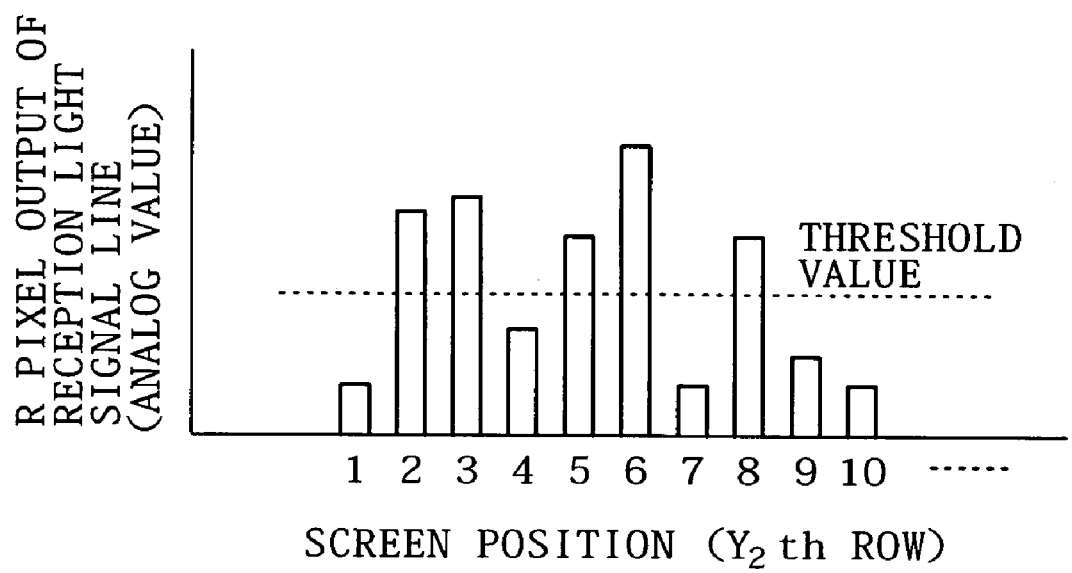
FIGS. 47A and 47B are graphs illustrating an output of an analog value in the detection illustrated in FIGS. 45 and 46.

FIG. 47A illustrates outputs (analog values) of reception light signals generated by the sub pixels driven for light reception when the sub pixels for G of the $Y_1$th row are driven for light emission while reflected light originating from the emitted light is received by the sub pixels for G of the $Y_2$th row as seen in FIGS. 45 and 46. Referring to FIG. 47A, the axis of abscissa corresponds to the position in the horizontal direction in FIG. 46 and indicates the positions of the sub pixels included in the $Y_2$th row. The axis of ordinate indicates the outputs of the light reception signal lines of the sub pixels included in the $Y_2$th row.

Figure 47B:
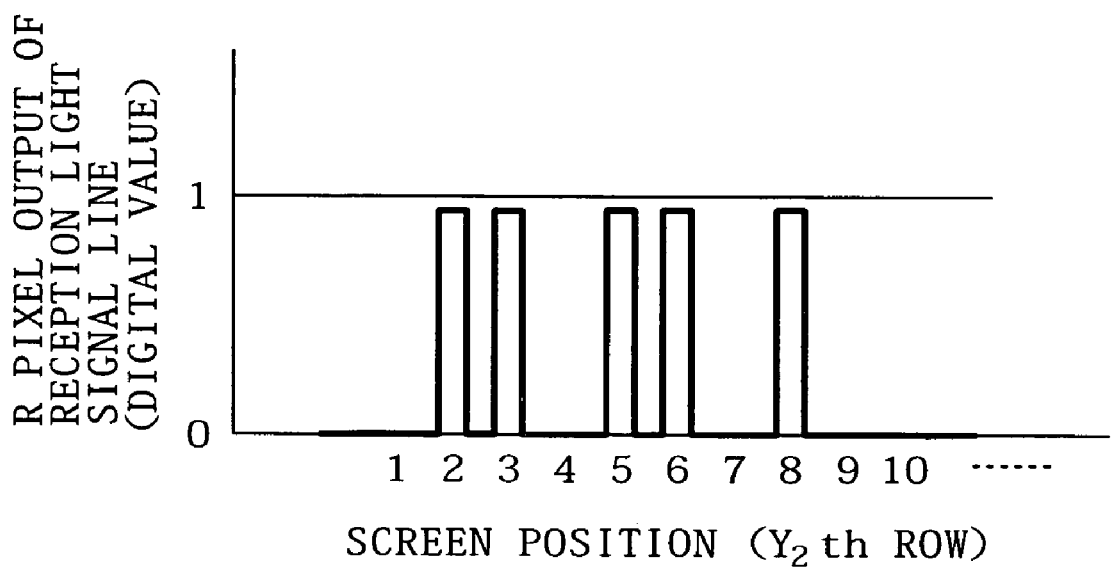

FIG. 47B indicates digital values of the outputs of the sub pixels of FIG. 47A where any output higher than a threshold value indicated by a broken line in FIG. 47A is represented as 1 while any output lower than the threshold value is represented as 0.

If both of the light emitting region and the reading region are moved in the downward direction as indicated by the void arrow mark in FIG. 46, such outputs as seen in FIGS. 47A and 47B are obtained individually at the positions at which the light emitting region illuminates light. Accordingly, if the outputs acquired at the individual positions are synthesized, then the display apparatus 1 can acquired concave/convex information of the entire surface of the finger F, and consequently, the fingerprint of the finger F can be detected.

Figure 48A:
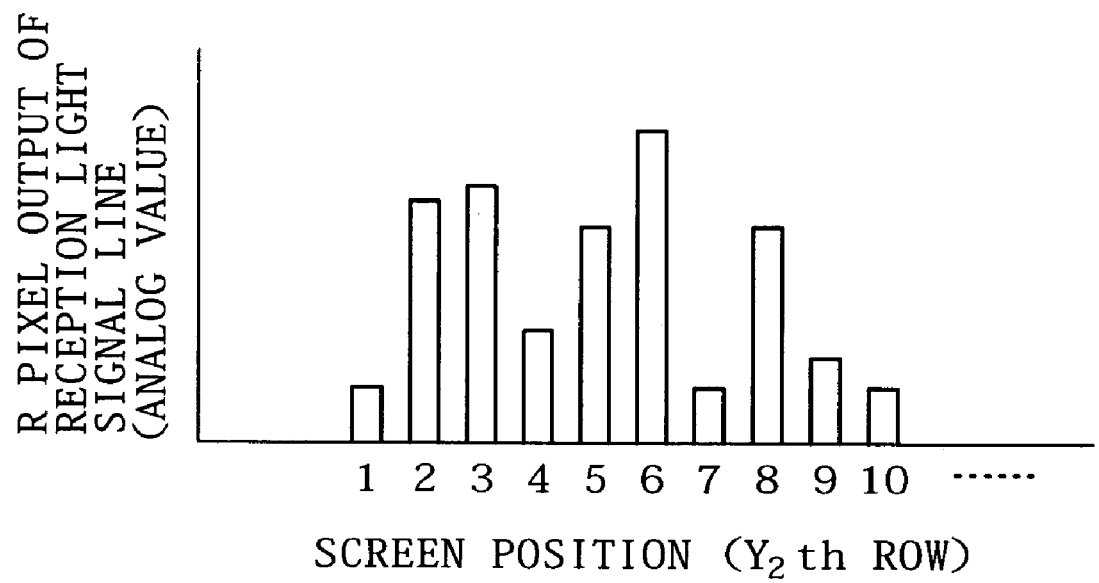
FIGS. 48A and 48B are graphs illustrating an output of a digital value in the detection illustrated in FIGS. 45 and 46.
Figure 48B:
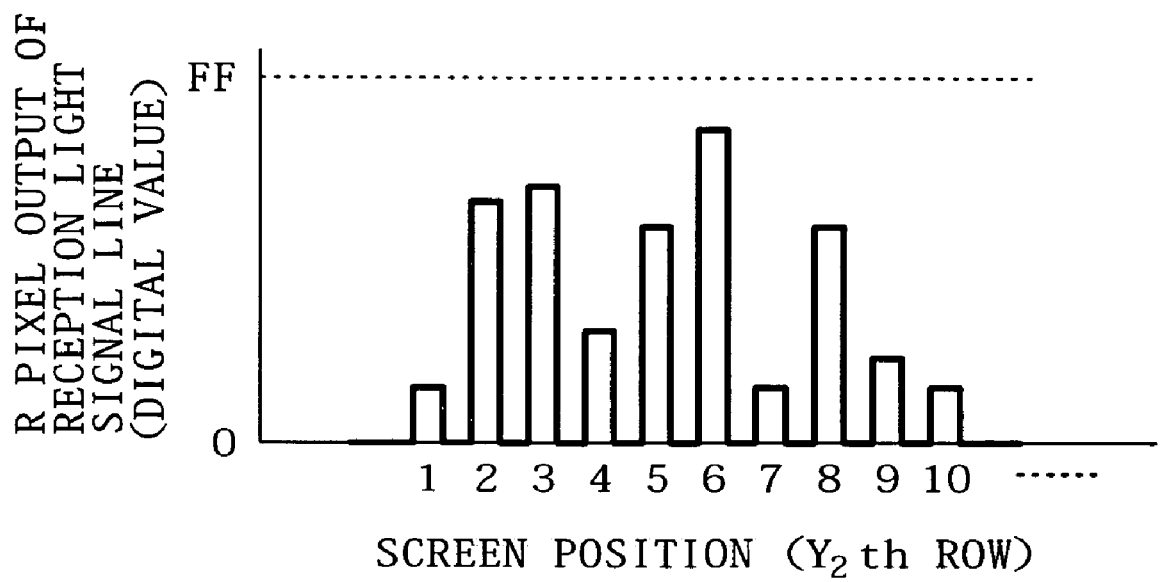

It is to be noted that, in place of digitizing fingerprint information into the two values of "1" and "0" as seen in FIG. 47B, it is possible to allocate, where outputs of FIG. 48A same as those of FIG. 47A are obtained, a predetermined number of bits to the output of each sub pixel so as to obtain an output having a gradation as seen in FIG. 48B.

Figure 49:
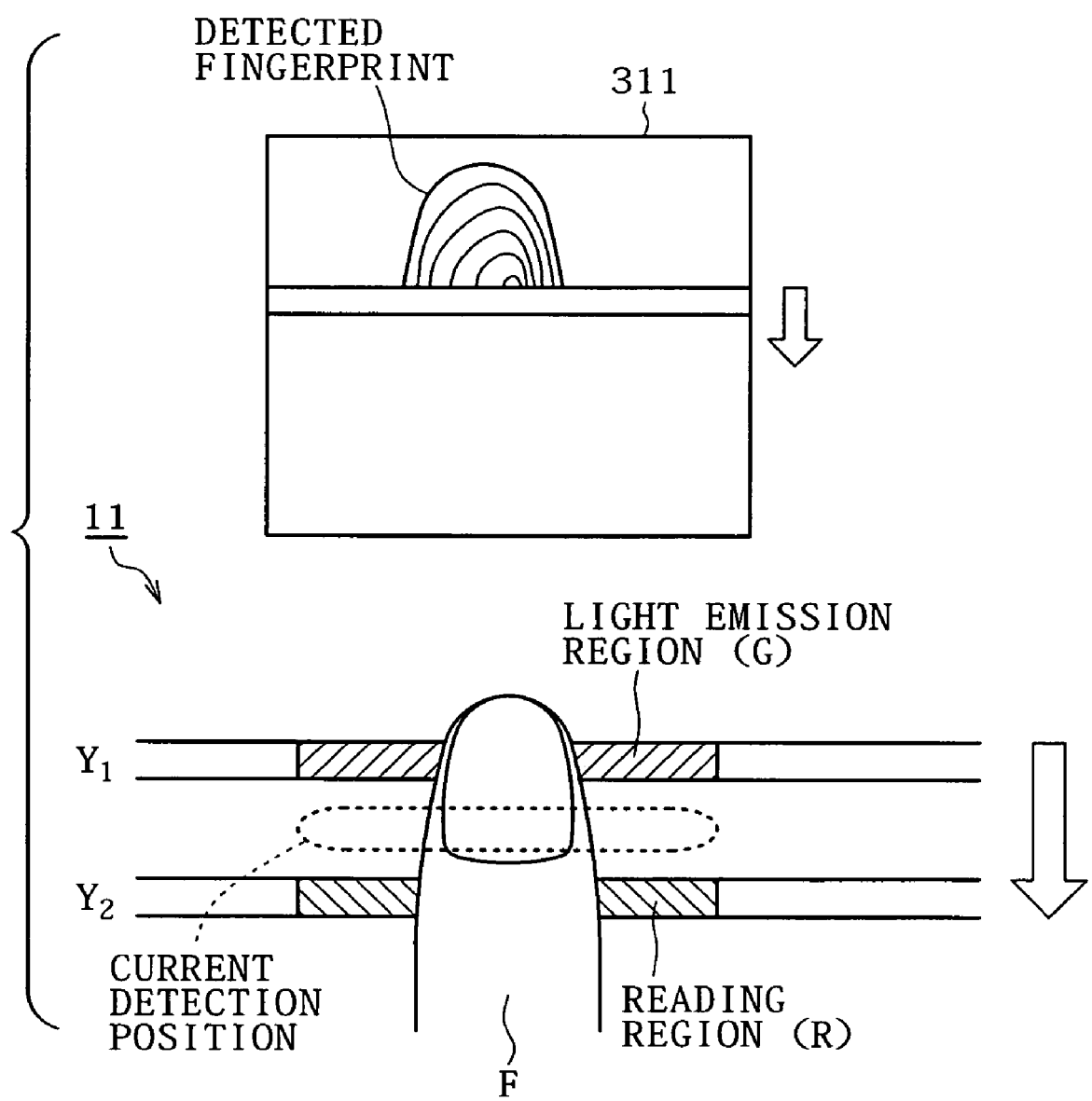
FIG. 49 is a schematic view showing an example of a display of detected data.

Since the display section 11 can change over the operation of each of the sub pixels thereof, for example, a fingerprint display region 311 may be formed in the proximity of a position at which a fingerprint is detected as seen in FIG. 49 such that an image of the fingerprint is displayed successively in order beginning with a fingerprint portion of a row or rows detected already as seen in FIG. 49. By the process of the displaying as described above, the user can confirm the finger detection intuitively.

Naturally, it is possible not to form the fingerprint display region 311 and display an image of a fingerprint detected already in the fingerprint display region 311 but to successively display an image of a fingerprint detected already at the position at which the user touches at the finger F thereof with the display section 11. If the sub pixels are first driven for light reception and then successively driven for display beginning with those sub pixels of a row or rows which have ended detection of a fingerprint so as to display an image of the fingerprint, then a result of the detection can be displayed at the position at which such detection is performed.

Further, it is possible to pick up an image of an object positioned in front of the display apparatus 1 by driving a predetermined number of sub pixels for light reception in a similar manner as in such a case wherein information of an object positioned in the proximity of or contacting with the display section 11 is acquired as described above.

Figure 50:
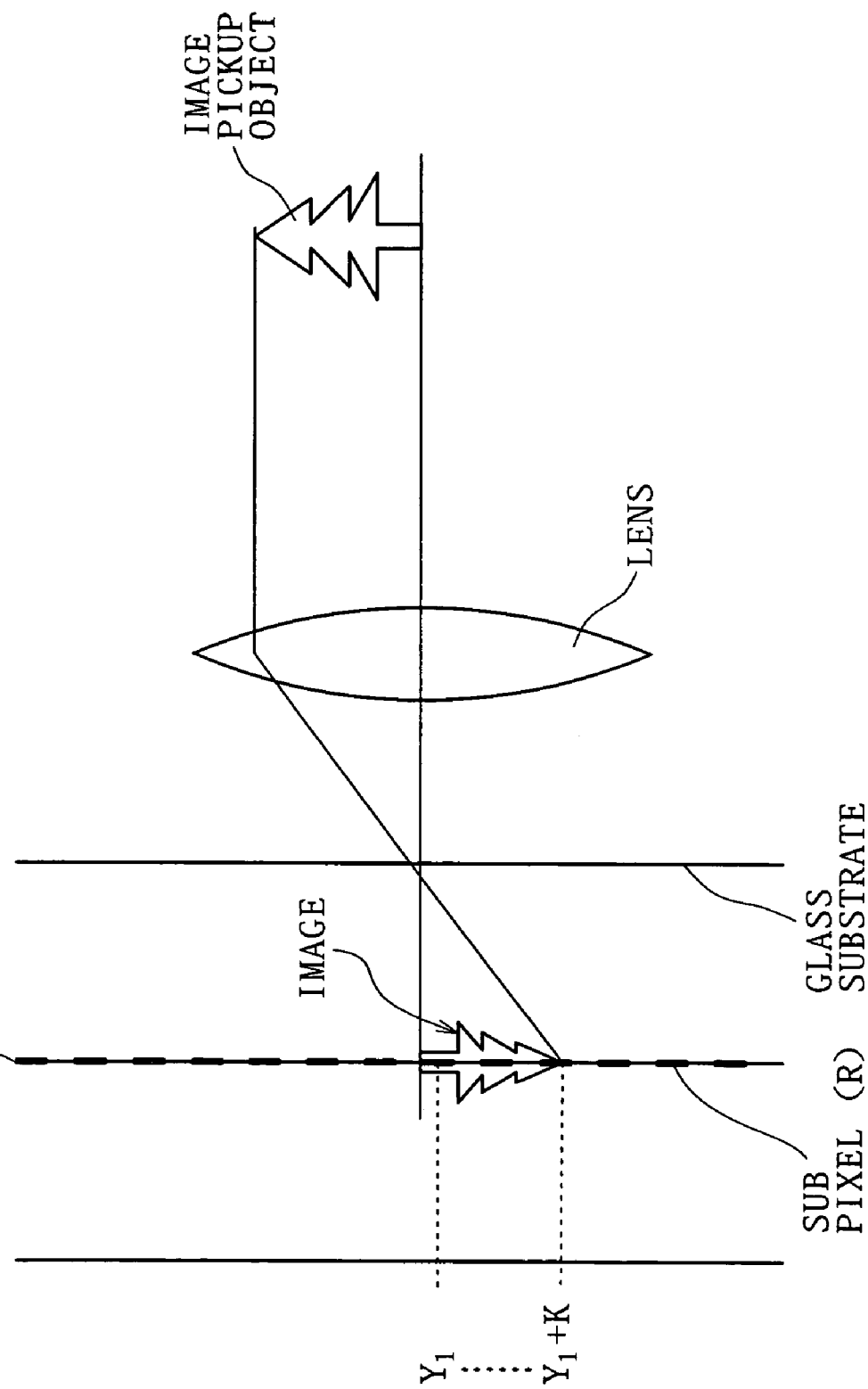
FIG. 50 is a schematic view illustrating image pickup using a display apparatus.

FIG. 50 illustrates a concept when an image is picked up with sub pixels which are driven for light reception. Referring to FIG. 50, for example, sub pixels for R of the $Y_1$th row to the $Y_1$+Kth row are driven for light reception through the respective switching lines, and a lens for forming an image of an image pickup object on the sub pixels is provided on the surface or some other portion of the display section 11 (display unit). Thus, an image of an image pickup object can be picked up using reception light signals of the sub pixels driven for light reception.

Figure 51A:
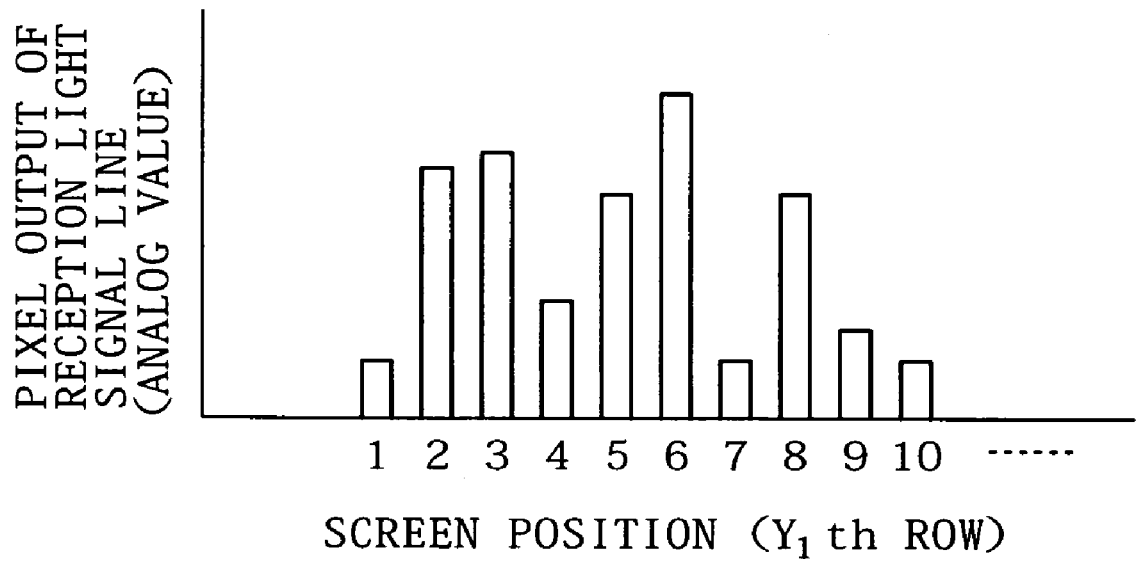
FIGS. 51A and 51B are graphs illustrating an output of an analog value in the image pickup illustrated in FIG. 50.
Figure 51B:
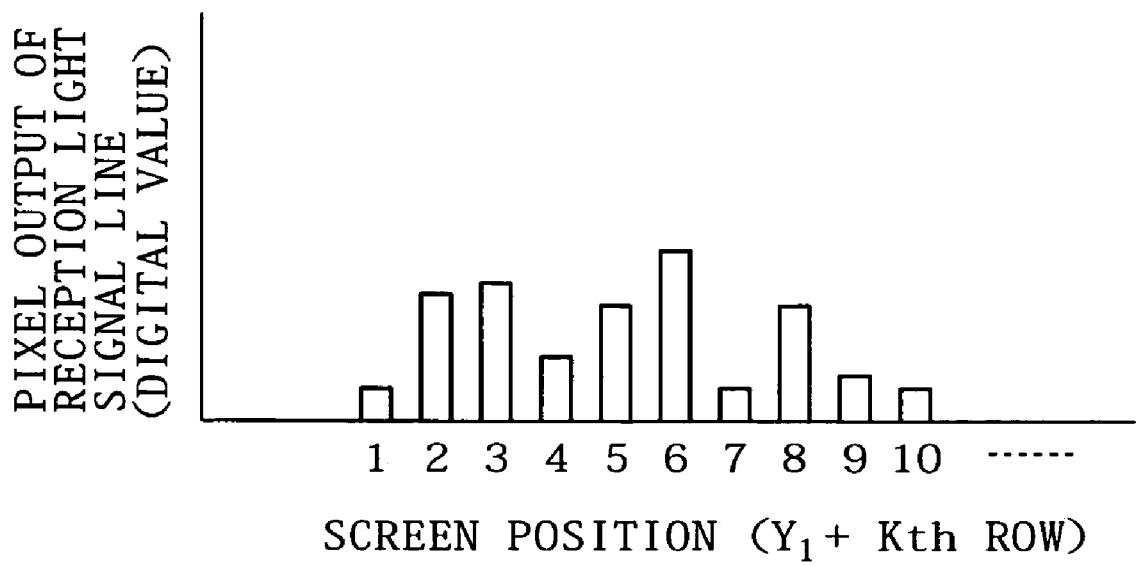
Figure 52A:
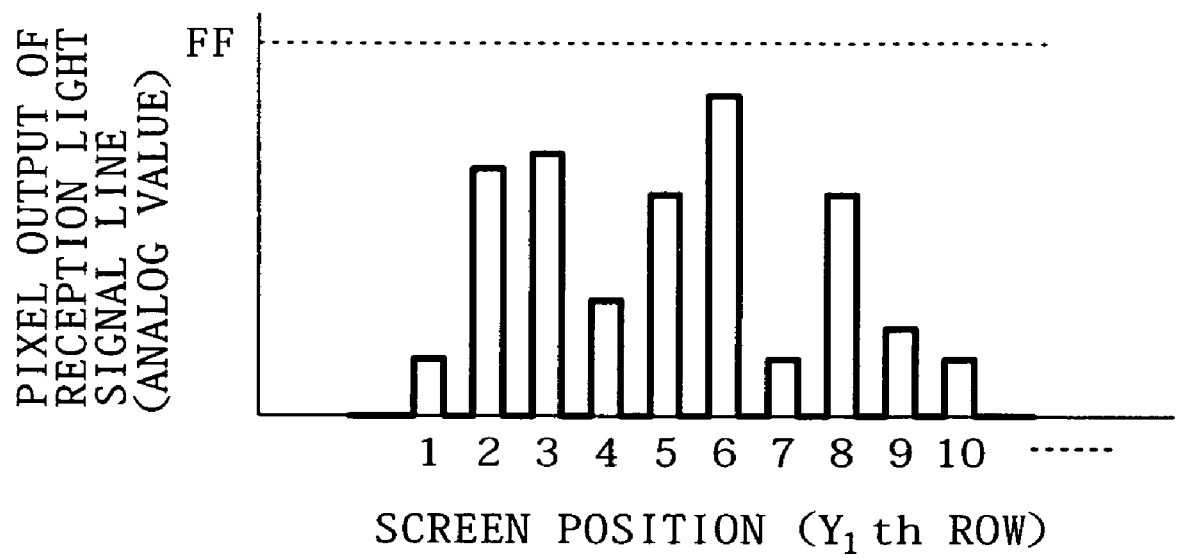
FIGS. 52A and 52B are graphs illustrating an output of a digital value in the detection illustrated in FIG. 50.
Figure 52B:
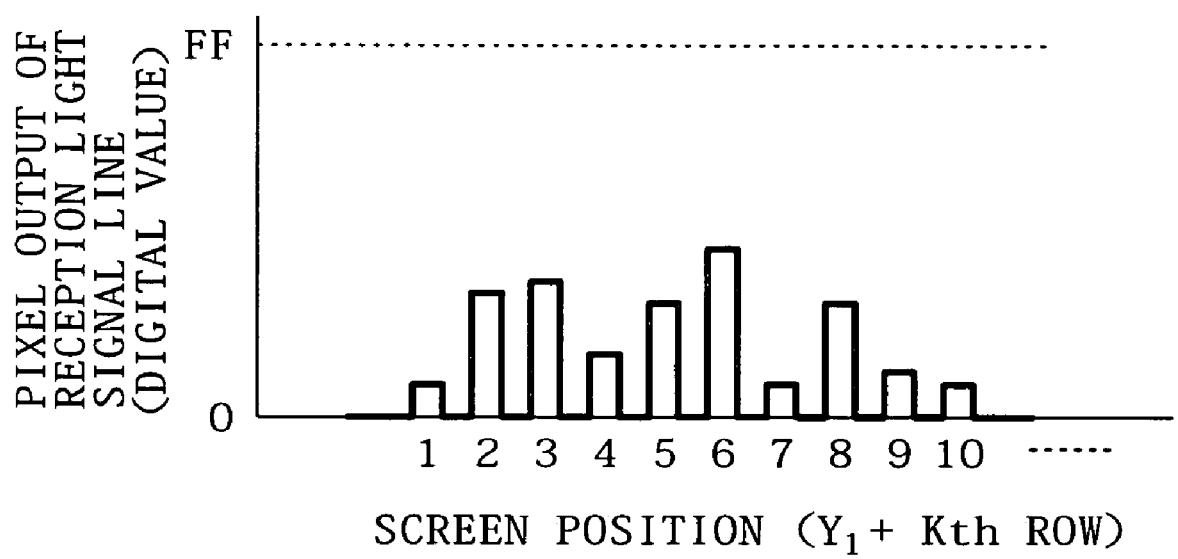

FIG. 51A shows an output in the form of analog value of a reception light signal detected by each of the sub pixels included in the $Y_1$th row of FIG. 50, and FIG. 51B shows an output in the form of an analog value of a reception light signal detected by each of the sub pixels included in the $Y_1$+Kth row of FIG. 50. FIG. 52A illustrates digital values obtained from the outputs illustrated in FIG. 51A, and FIG. 52B illustrates digital values obtained from the outputs illustrated in FIG. 51B. An image of an image pickup object positioned in front of the display apparatus 1 can be acquired by detecting such outputs individually from the $Y_1$th row to the $Y_1$+Kth row and synthesizing the detected outputs.

Further, if the results of the image pickup are displayed on the display section 11 immediately after the image pickup is performed, then the user can confirm the results of the image pickup quickly and readily.

As described above, those sub pixels which are driven for light reception can detect visible light. Accordingly, information can be inputted to the display apparatus 1 even where, for example, a laser pointer 321 (laser pointer widespread popularly) which can emit visible light such as red light is used as seen in FIG. 53.

Figure 53:
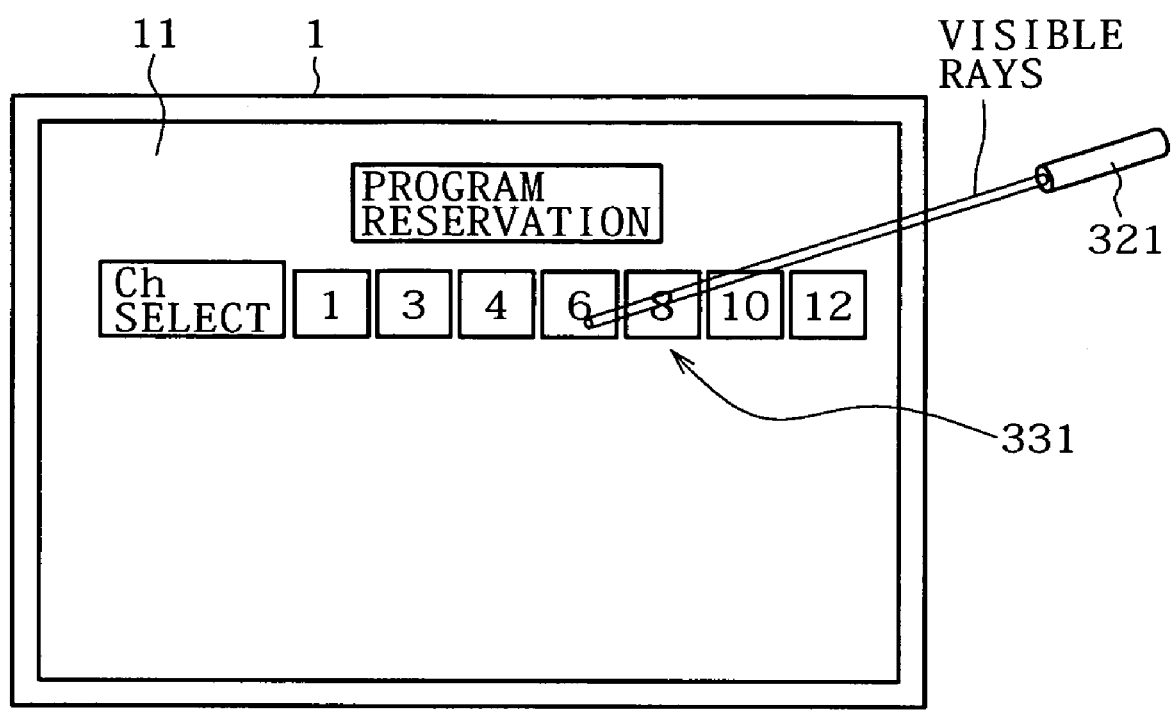
FIG. 53 is a schematic view illustrating an example of detection of an input.

A reservation screen for a television program is displayed on the display section 11 shown in FIG. 53, and channel selection buttons 331 are displayed on the reservation screen. The channel selection buttons 331 (buttons for channels 1, 3, 4, 6, 8, 10 and 12) are driven alternately for light emission and for light reception, for example, in accordance with a display frequency of the display section 11. If light from the laser pointer 321 is illuminated on any of the channel selection buttons 331 at an instant when it is driven for light reception, then the display apparatus 1 can detect an input from the laser pointer 321. In the example of FIG. 53, it is detected that the "channel 6" is selected. It is to be noted that, in this instance, the laser pointer 321 may be formed simply from a laser pointer which outputs an on signal when a button provided on the surface of the laser pointer 321 is depressed but outputs an off signal within any other period and thus can output such a signal as seen in FIG. 54.

Figures 54, 55, 56:
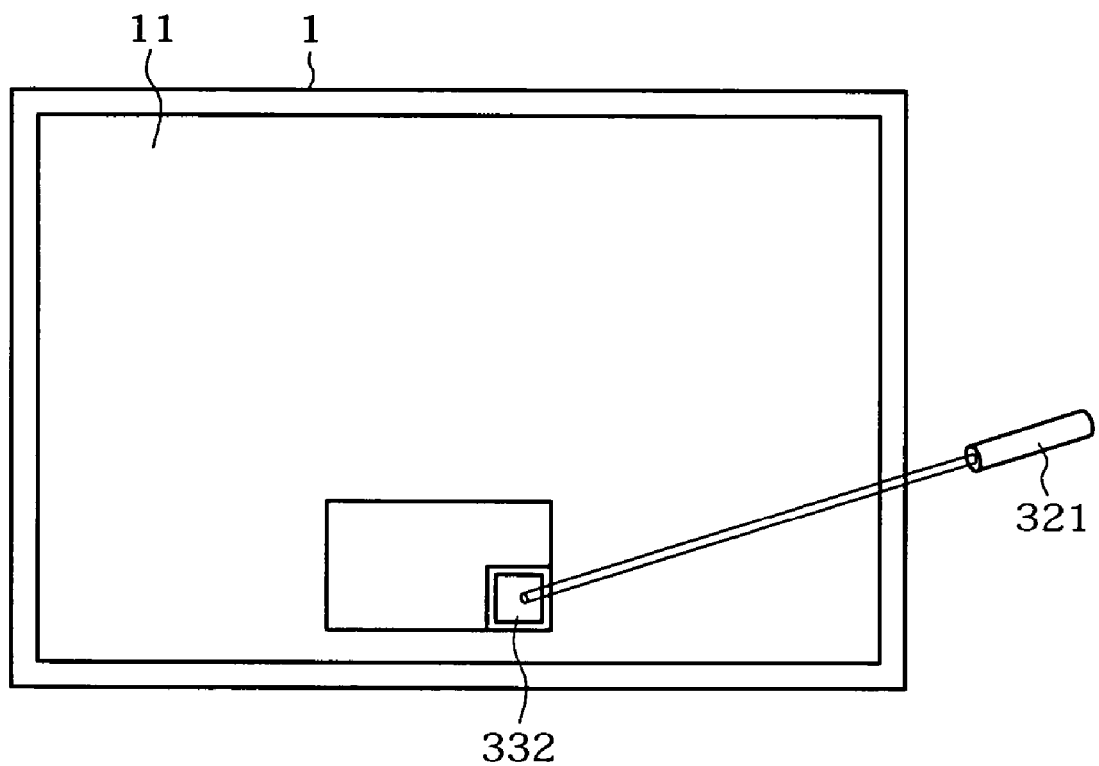
FIG. 54 is a waveform diagram illustrating an output of a laser pointer shown in FIG. 53.
FIG. 55 is a schematic view illustrating an example of detection of another example of an input.
FIG. 56 is a waveform diagram illustrating an output of a laser pointer shown in FIG. 55.

Alternatively where the laser pointer 321 of FIG. 55 is of the type which can emit visible light representing such predetermined data as seen in FIG. 56 (a laser pointer which can modulate data and output light (on/off) corresponding to the modulated data in a predetermined frequency), data can be inputted to a data inputting window 332 formed on the display section 11 using the laser pointer 321. The data inputting window 332 (reading region) is formed from those sub pixels which are driven for light reception.

The foregoing description is given principally of detection of presence or absence of an object in the proximity of the surface of the display section 11 which is performed by driving a sub pixel for G for light emission and driving a sub pixel for R in the proximity of the sub pixel for G for light reception. However, the combination of a sub pixel to be driven for light emission and a sub pixel to be driven for light reception is not limited to the combination described above (combination of sub pixels for G and R). In particular, since the characteristic of the light reception sensitivity of a sub pixel driven for light reception differs depending upon the materials of the electrodes and the organic layer of the EL element as described hereinabove, the combination of a sub pixel to be driven for light emission and a sub pixel to be driven for light reception may be any combination only if it is a combination of a sub pixel to be driven for light emission and another sub pixel having a high light reception sensitivity to light emitted from the former sub pixel.

While the series of processes described above can be executed by hardware, it may otherwise be executed by software.

Where the series of processes is executed by software, a program which constructs the software is installed from a network or a recording medium into a computer incorporated in hardware for exclusive use or, for example, a personal computer for universal use which can execute various functions by installing various programs.

The recording medium may be formed as a package medium such as, as shown in FIG. 8, a magnetic disk 131 (including a floppy disk), an optical disk 132 (including a CD-ROM (Compact Disc-Read Only Memory) and a DVD (Digital Versatile Disk)), a magneto-optical disk 133 (including an MD (registered trademark) (Mini-Disc)), or a semiconductor memory 134 which has the program recorded thereon or therein. The recording medium may otherwise be formed as a ROM or a hard disk included in the storage section 118 which has the program recorded therein or thereon and is provided to a user in a form wherein it is incorporated in an apparatus body in advance.

It is to be noted that, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While a preferred embodiments of the present invention has been described using specific terms, such description is for illustrative purpose only, and it is to be understood that changes and variations may be made without departing from the spirit or scope of the following claims.

What is claimed is:

1. An information processing apparatus, comprising:
   detection means for successively detecting a plurality of graphic images representative of input data inputted from a different information processing apparatus through successive display of the graphic images on said different information processing apparatus; and
   acquisition means for acquiring the input data based on the graphic images successively detected by said detection means, further comprising:
   display means for displaying a predetermined image; and
   formation means for forming, at a portion of a display region of said display means in which the predetermined image is displayed, a detection region in which the graphic images are successively detected by said detection means.

2. An information processing apparatus, comprising:
   detection means for successively detecting a plurality of graphic images representative of input data inputted from a different information processing apparatus through successive display of the graphic images on said different information processing apparatus; and
   acquisition means for acquiring the input data based on the graphic images successively detected by said detection means, further comprising:
   display means for displaying a predetermined image; and
   formation means for forming, at a portion of a display region of said display means in which the predetermined image is displayed, a detection region in which the graphic images are successively detected by said detection means, wherein said formation means forms the detection region by applying, to each of pixels in the display region in which the detection region is formed, a voltage reverse to a voltage which is applied to each of pixels which display the image.

3. An information processing apparatus, comprising:

detection means for successively detecting a plurality of graphic images representative of input data inputted from a different information processing apparatus through successive display of the graphic images on said different information processing apparatus; and acquisition means for acquiring the input data based on the graphic images successively detected by said detection means, further comprising:

display means for displaying a predetermined image; and formation means for forming, at a portion of a display region of said display means in which the predetermined image is displayed, a detection region in which the graphic images are successively detected by said detection means, wherein said detection means detects electric current generated in response to light from the outside in an active semiconductor layer of a transistor disposed in each of pixels which form the detection region.

4. An information processing apparatus, comprising:

detection means for successively detecting a plurality of graphic images representative of input data inputted from a different information processing apparatus through successive display of the graphic images on said different information processing apparatus; and acquisition means for acquiring the input data based on the graphic images successively detected by said detection means, further comprising:

display means for displaying a predetermined image; and formation means for forming, at a portion of a display region of said display means in which the predetermined image is displayed, a detection region in which the graphic images are successively detected by said detection means, wherein said detection means detects electric current generated in response to light from the outside in an electroluminescent element disposed in each of pixels which form the detection region.

5. An information processing apparatus, comprising:

detection means for successively detecting a plurality of graphic images representative of input data inputted from a different information processing apparatus through successive display of the graphic images on said different information processing apparatus; and acquisition means for acquiring the input data based on the graphic images successively detected by said detection means, further comprising:

display means for displaying a predetermined image; and formation means for forming, at a portion of a display region of said display means in which the predetermined image is displayed, a detection region in which the graphic images are successively detected by said detection means, wherein said formation means forms the detection region such that the detection region is successively moved in synchronism with scanning of a screen by said display means.

6. An information processing apparatus, comprising:

a display section including a plurality of pixels each including an electroluminescent element for emitting light to display an image;

changeover means for changing over direction of a voltage to be applied to each electroluminescent element to change over driving of the electroluminescent element between driving for light emission and driving for light reception; and detection means for detecting an input from the outside based on electric current generated in any electroluminescent element driven for light reception as a result of a changeover by said changeover means when an electroluminescent element receives light;

wherein said changeover means forms a detection region, including a plurality of pixels whose respective electroluminescent elements are driven for light reception, in a predetermined region of said display section; and wherein said changeover means forms a display region, including a plurality of pixels whose respective electroluminescent elements are driven for light emission, in a region of said display section separated from the detection region.

7. An information processing apparatus, comprising:

a display section including a plurality of pixels each including an electroluminescent element for emitting light to display an image;

changeover means for changing over direction of a voltage to be applied to each electroluminescent element to change over driving of the electroluminescent element between driving for light emission and driving for light reception; and detection means for detecting an input from the outside based on electric current generated in any electroluminescent element driven for light reception as a result of a changeover by said changeover means when an electroluminescent element receives light, wherein said changeover means forms, in proximity of a first pixel including a first electroluminescent element driven for light emission, a second pixel including a second electroluminescent element driven for light reception, and said detection means detects an input from the outside based on electric current generated when said second electroluminescent element receives reflected light originating from light emitted from said first electroluminescent element.

8. An information processing apparatus, comprising:

a display section including a plurality of pixels each including an electroluminescent element for emitting light to display an image;

changeover means for changing over direction of a voltage to be applied to each electroluminescent element to change over driving of the electroluminescent element between driving for light emission and driving for light reception; and detection means for detecting an input from the outside based on electric current generated in any electroluminescent element driven for light reception as a result of a changeover by said changeover means when an electroluminescent element receives light, wherein said changeover means forms, in proximity of a first pixel including a first electroluminescent element driven for light emission, a second pixel including a second electroluminescent element driven for light reception, and said detection means detects an input from the outside based on electric current generated when said second electroluminescent element receives reflected light originating from light emitted from said first electroluminescent element, wherein said detection means detects that a predetermined object is positioned in proximity of a surface of said display section as an input from the outside.

9. An information processing apparatus, comprising:

a display section including a plurality of pixels each including an electroluminescent element for emitting light to display an image;

changeover means for changing over direction of a voltage to be applied to each electroluminescent element to change over driving of the electroluminescent element between driving for light emission and driving for light reception; and detection means for detecting an input from the outside based on electric current generated in any electroluminescent element driven for light reception as a result of a changeover by said changeover means when an electroluminescent element receives light, wherein said changeover means forms, in proximity of a first pixel including a first electroluminescent element driven for light emission, a second pixel including a second electroluminescent element driven for light reception, and said detection means detects an input from the outside based on electric current generated when said second electroluminescent element receives reflected light originating from light emitted from said first electroluminescent element, wherein said detection means detects plane information of an object which contacts with or is positioned in the proximity of a surface of said display section as an input from the outside based on electric current generated when said second electroluminescent element receives reflected light originating from light emitted from said first electroluminescent element.

10. An information processing apparatus, comprising:

a display section including a plurality of pixels each including an electroluminescent element for emitting light to display an image;

changeover means for changing over direction of a voltage to be applied to each electroluminescent element to change over driving of the electroluminescent element between driving for light emission and driving for light reception; and detection means for detecting an input from the outside based on electric current generated in any electroluminescent element driven for light reception as a result of a changeover by said changeover means when an electroluminescent element receives light, wherein said changeover means forms, in proximity of a first pixel including a first electroluminescent element driven for light emission, a second pixel including a second electroluminescent element driven for light reception, and said detection means detects an input from the outside based on electric current generated when said second electroluminescent element receives reflected light originating from light emitted from said first electroluminescent element, wherein said first electroluminescent element emits light of a predetermined wavelength, and said second electroluminescent element has a high light reception sensitivity to light of the predetermined wavelength.

\* \* \* \* \*